United States Patent
Hwang et al.

(10) Patent No.: US 10,412,422 B2
(45) Date of Patent: Sep. 10, 2019

(54) APPARATUS FOR TRANSMITTING BROADCASTING SIGNAL, APPARATUS FOR RECEIVING BROADCASTING SIGNAL, METHOD FOR TRANSMITTING BROADCASTING SIGNAL, AND METHOD FOR RECEIVING BROADCASTING SIGNAL

(71) Applicant: LG Electronics Inc., Seoul (KR)

(72) Inventors: Soojin Hwang, Seoul (KR); Sejin Oh, Seoul (KR); Jongyeul Suh, Seoul (KR); Hyunmook Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/563,920

(22) PCT Filed: Apr. 25, 2016

(86) PCT No.: PCT/KR2016/004293
§ 371 (c)(1),
(2) Date: Oct. 2, 2017

(87) PCT Pub. No.: WO2016/171528
PCT Pub. Date: Oct. 27, 2016

(65) Prior Publication Data
US 2018/0131971 A1 May 10, 2018

Related U.S. Application Data

(60) Provisional application No. 62/151,999, filed on Apr. 23, 2015, provisional application No. 62/154,071, (Continued)

(51) Int. Cl.
*H04N 21/235* (2011.01)
*H04N 21/238* (2011.01)
(Continued)

(52) U.S. Cl.
CPC ......... *H04N 21/235* (2013.01); *H04N 21/238* (2013.01); *H04N 21/2353* (2013.01);
(Continued)

(58) Field of Classification Search
CPC ............ H04N 21/235; H04N 21/8456; H04N 21/2353; H04N 21/435; H04N 21/238; H04N 21/2362; H04N 21/434
See application file for complete search history.

(56) References Cited

U.S. PATENT DOCUMENTS

| | | | | |
|---|---|---|---|---|
| 2009/0080509 A1* | 3/2009 | Itoh | ...................... | G11B 27/034 375/240.01 |
| 2011/0074921 A1* | 3/2011 | Takiduka | ............... | G09G 5/006 348/43 |

(Continued)

FOREIGN PATENT DOCUMENTS

| | | | |
|---|---|---|---|
| KR | 10-2011-0053180 A | | 5/2011 |
| WO | 2012/030177 A2 | | 3/2012 |

(Continued)

*Primary Examiner* — Benjamin R Bruckart
*Assistant Examiner* — Aklil M Tesfaye
(74) *Attorney, Agent, or Firm* — Dentons US LLP

(57) ABSTRACT

The present invention suggests a method for transmitting a broadcasting signal. The method for transmitting a broadcasting signal, according to the present invention, suggests a system capable of supporting a next-generation broadcasting service in an environment which supports next-generation hybrid broadcasting, using a terrestrial broadcasting network and an Internet network. In addition, the present invention suggests an efficient signaling scheme which can cover both the terrestrial broadcasting network and the Internet network in an environment supporting next-generation hybrid broadcasting.

20 Claims, 54 Drawing Sheets

Related U.S. Application Data filed on Apr. 28, 2015, provisional application No. 62/211,886, filed on Aug. 31, 2015.

(51) Int. Cl.
*H04N 21/434* (2011.01)
*H04N 21/435* (2011.01)
*H04N 21/845* (2011.01)
*H04N 21/2362* (2011.01)

(52) U.S. Cl.
CPC ....... *H04N 21/2362* (2013.01); *H04N 21/434* (2013.01); *H04N 21/435* (2013.01); *H04N 21/8456* (2013.01)

(56) References Cited

U.S. PATENT DOCUMENTS

| | | | |
|---|---|---|---|
| 2016/0156949 A1* | 6/2016 | Hattori | H04N 21/234345 725/109 |
| 2016/0241808 A1* | 8/2016 | Hamada | H04N 5/765 |
| 2017/0188034 A1* | 6/2017 | Tsukagoshi | H04N 21/438 |

FOREIGN PATENT DOCUMENTS

| | | |
|---|---|---|
| WO | 2013/025035 A2 | 2/2013 |
| WO | 2013/077698 A1 | 5/2013 |
| WO | 2015/009036 A1 | 1/2015 |

\* cited by examiner

FIG. 3

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|        SLT | var | Sec. 6.3 |
|        break; | | |
|      case 0x02: | | |
|        RRT | var | See Annex F |
|        break; | | |
|      case 0x03: | | |
|        System Time | var | Sec. 6.4 |
|        break; | | |
|      case 0x04: | | |
|        CAP | var | Sec. 6.5 |
|        break; | | |
|      default: | | |
|        reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | Use | Data Type |
|---|---|---|
| bundleDescription | | |
|   userServiceDescription | | |
|     @globalServiceID | 1 | anyURL |
|     @serviceID | 1 | unsignedShort |
|     @serviceStatus | 0..1 | boolean |
|     @fullMPDUri | 1 | anyURL |
|     @sTSIDUri | 1 | anyURL |
|     name | 0..N | string |
|       @lang | 1 | language |
|     serviceLanguage | 0..N | language |
|     capabilityCode | 0..1 | string |
|     deliveryMethod | 1..N | |
|       broadcastAppService | 1..N | |
|         basePattern | 1..N | string |
|       unicastAppService | 0..N | |
|         basePattern | 1..N | string | t4010

| Element or Attribute Name | Use | Data Type |
|---|---|---|
| S-TSID | | |
|   @serviceID | 1 | unsignedShort |
|   RS | 1..N | |
|     @bsid | 0..1 | unsignedShort |
|     @sIpAddr | 0..1 | string |
|     @dIpAddr | 0..1 | string |
|     @dport | 0..1 | unsignedShort |
|     @PLPID | 0..1 | unsignedByte |
|     LS | 1..N | |
|       @tsi | 1 | unsignedInt |
|       @PLPID | 0..1 | unsignedByte |
|       @bw | 0..1 | unsignedInt |
|       @startTime | 0..1 | dateTime |
|       @endTime | 0..1 | dateTime |
|       SrcFlow | 0..1 | scrFlowType |
|       RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
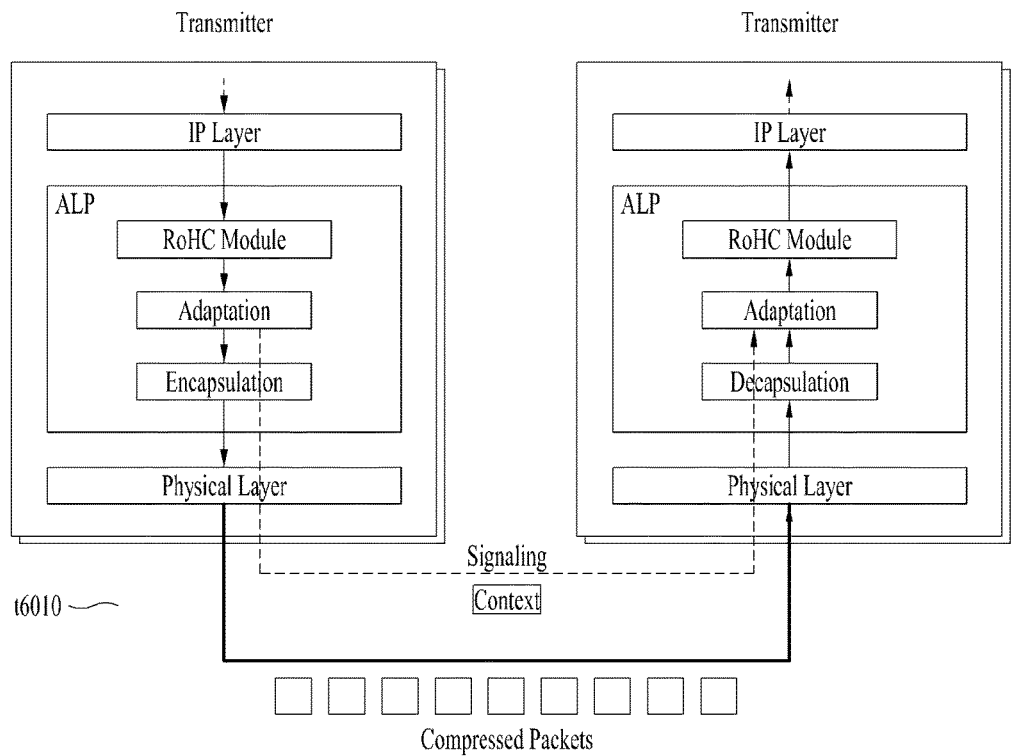
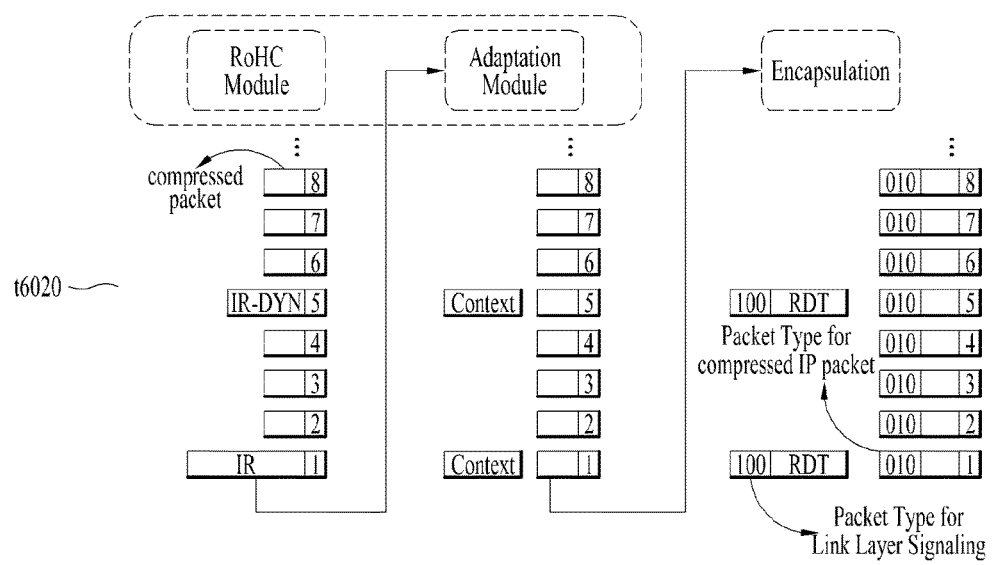

FIG. 7

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i++) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag == "1") { | | |
|             SID | 8 | uimsbf |
|         } | | |
|         if (compressed_flag == "1') { | | |
|             context_id | 8 | uimsbf |
|         } | | |
|     } | | |
| } | | |

FIG. 10

| Element or Attribute Name | Use | Description |
|---|---|---|
| ContentWCGConfiguration | | specifies content WCG configuration description. It has the color gamut information of the original source. |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |
| ContainerWCGConfiguration | | specifies container WCG configuration description. It indicates the color gamut information using encoding/reproduction. |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 11

| Element or Attribute Name | Use | Description |
|---|---|---|
| HFRConfiguration | | specifies high frame rate configuration description. It has the compatibility information of legacy frame rate. |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |
| PullDownRecoveryConfiguration | | specifies pull down recovery configuration. It has the original frame rate and pull-down type. |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 12

| Element or Attribute Name | Use | Description |
|---|---|---|
| HFRTemporalLayeringConfiguration | | specifies high frame rate with temporal layering configuration description. It indicates that the stream includes temporal layering to support temporal scalability. That is, this indicates a method for signaling the number of temporal id's and the frame rate that may be output. When there are three temporal id's, the temporal id's are 0, 1 and 3, and the corresponding frame rates are signaled in order (or reverse order). Alternatively, the temporal id and a frame rate for decoding only a stream containing the temporal id and child temporal id of the temporal id may be signaled. |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy. |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 13

```
<xs:element name="ContentWCGConfiguration" type="DescriptorType" minOccurs="0" maxOccurs="unbounded"/>
<!-- Descriptor -->
<xs:complexType name="DescriptorType">
  <xs:sequence>
    <xs:any namespace="##other" processContents="lax" minOccurs="0" maxOccurs="unbounded"/>
  </xs:sequence>
  <xs:attribute name="schemeIdUri" type="xs:anyURI" use="required"/>
  <xs:attribute name="value" type="xs:string"/>
  <xs:attribute name="id" type="xs:string"/>
  <xs:anyAttribute namespace="##other" processContents="lax"/>
</xs:complexType>
```
— L13010

```
<xs:element name="ContainerWCGConfiguration" type="DescriptorType" minOccurs="0" maxOccurs="unbounded"/>
<!-- Descriptor -->
<xs:complexType name="DescriptorType">
  <xs:sequence>
    <xs:any namespace="##other" processContents="lax" minOccurs="0" maxOccurs="unbounded"/>
  </xs:sequence>
  <xs:attribute name="schemeIdUri" type="xs:anyURI" use="required"/>
  <xs:attribute name="value" type="xs:string"/>
  <xs:attribute name="id" type="xs:string"/>
  <xs:anyAttribute namespace="##other" processContents="lax"/>
</xs:complexType>
```
— L13020

FIG. 14

```
<xs:element name="HRFConfiguration" type="DescriptorType" minOccurs="0" maxOccurs="unbounded"/>
<!-- Descriptor -->
<xs:complexType name="DescriptorType">
  <xs:sequence>
    <xs:any namespace="##other" processContents="lax" minOccurs="0" maxOccurs="unbounded"/>
  </xs:sequence>
  <xs:attribute name="schemeIdUri" type="xs:anyURI" use="required"/>
  <xs:attribute name="value" type="xs:string"/>
  <xs:attribute name="id" type="xs:string"/>
  <xs:anyAttribute namespace="##other" processContents="lax"/>
</xs:complexType>
```
— L14010

```
<xs:element name="PullDownRecoveryConfiguration" type="DescriptorType" minOccurs="0" maxOccurs="unbounded"/>
<!-- Descriptor -->
<xs:complexType name="DescriptorType">
  <xs:sequence>
    <xs:any namespace="##other" processContents="lax" minOccurs="0" maxOccurs="unbounded"/>
  </xs:sequence>
  <xs:attribute name="schemeIdUri" type="xs:anyURI" use="required"/>
  <xs:attribute name="value" type="xs:string"/>
  <xs:attribute name="id" type="xs:string"/>
  <xs:anyAttribute namespace="##other" processContents="lax"/>
</xs:complexType>
```
— L14020

FIG. 15

```
<xs:element name="HRFTemporalLayeringConfiguration" type="DescriptorType" minOccurs="0" maxOccurs="unbounded"/>
<!-- Descriptor -->
<xs:complexType name="DescriptorType">
  <xs:sequence>
    <xs:any namespace="##other" processContents="lax" minOccurs="0" maxOccurs="unbounded"/>
  </xs:sequence>
  <xs:attribute name="schemeIdUri" type="xs:anyURI" use="required"/>
  <xs:attribute name="value" type="xs:string"/>
  <xs:attribute name="id" type="xs:string"/>
  <xs:anyAttribute namespace="##other" processContents="lax"/>
</xs:complexType>
```

FIG. 16

| Scheme Identifier (@schmeIdUri) | Informative description |
|---|---|
| urn:mpeg:dash:wcg:content:201x | Scheme identifier for content WCG Configuration Description |

— L16010

| @value | Use | Description |
|---|---|---|
| contentColorGamutType | M | non-negative integer in decimal representation indicating the chromaticity coordinates of the source primaries.<br>e.g. 0: reserved, 1: BT.709-5, 2: unspecified, 3: reserved for future use by ITU-T, 4: BT.470-6 system M, ..., 9: BT.2020, 10: ST428-1, 11 - 255: reserved for future use by ITU-T.<br>If the value of the contentColorGamutType = 2, the parameters (such as contentColorPrimaryRx, contentColorPrimaryRy, contentColorPrimaryGx, contentColorPrimaryGy, contentColorPrimaryBx, contentColorPrimaryBy, contentWhtiePx, and contentWhtiePy) should have the values. |
| contentColorPrimaryRx | O | x-coordinate value of r-color for source in range of 0-1 |
| contentColorPrimaryRy | O | y-coordinate value of r-color for source in range of 0-1 |
| contentColorPrimaryGx | O | x-coordinate value of g-color for source in range of 0-1 |
| contentColorPrimaryGy | O | y-coordinate value of g-color for source in range of 0-1 |
| contentColorPrimaryBx | O | x-coordinate value of b-color for source in range of 0-1 |
| contentColorPrimaryBy | O | y-coordinate value of b-color for source in range of 0-1 |
| contentWhitePx | O | x-coordinate value of white point for source in range of 0-1 |
| contentWhitePy | O | y-coordinate value of white point for source in range of 0-1 |
| contentWCGTransition | OD default:false | If not present it is false. If present and set to true, it includes the end of WCG video media component or that includes the transition from WCG to SCG in video media component |
| contentSCGCompatibility | OD default:false | flag to indicate that the video media component can be compatible with SCG (standard color gamut) |
| Legend:<br>For attributes: M=Mandatory, O=Optional, OD=Optional with Default Value, CM=Conditionally Mandatory. | | |

— L16020

Ex.1
< ContentWCGConfiguration schemeIdUri="urn:mpeg:dash:wcg:content:201x" value="9,,,,,,,,, false, true"/>
Ex.2
< ContentWCGConfiguration schemeIdUri="urn:mpeg:dash:wcg:content:201x" value="2, 0.640, 0.330, 0.300, 0.600, 0.150, 0.060, 0.313, 0.329, false, true"/>

| Scheme Identifier (@schmeIdUri) | Informative description |
|---|---|
| urn:mpeg:dash:wcg:container:201x | Scheme identifier for container WCG Configuration Description |

L17010

| @value | Use | Description |
|---|---|---|
| containerColorGamutType | M | non-negative integer in decimal representation indicating the chromaticity coordinates of the encoding/or reproduction primaries. The values of container_color_gamut_type can be the same as colour_primaries in VUI parameters. When the colour_primaries syntax element in VUI parameters is not present, the value of colour_primaries is inferred to be equal to 2 (unspecified), and then the 8 below parameters (containerColorPrimaryRx, containerColorPrimaryRy, containerColorPrimaryGx, containerColorPrimaryGy, containerColorPrimaryBx, containerColorPrimaryBy, containerWhtiePx, containerWhtiePy) should have the values. |
| containerColorPrimaryRx | O | x-coordinate value of r-color for container in range of 0-1 |
| containerColorPrimaryRy | O | y-coordinate value of r-color for container in range of 0-1 |
| containerColorPrimaryGx | O | x-coordinate value of g-color for container in range of 0-1 |
| containerColorPrimaryGy | O | y-coordinate value of g-color for container in range of 0-1 |
| containerColorPrimaryBx | O | x-coordinate value of b-color for container in range of 0-1 |
| containerColorPrimaryBy | O | y-coordinate value of b-color for container in range of 0-1 |
| containerWhitePx | O | x-coordinate value of white point for container in range of 0-1 |
| containerWhitePy | O | y-coordinate value of white point for container in range of 0-1 |
| containerWCGTransition | OD default:false | If not present it is false. If present and set to true, it includes the end of WCG video media component of the container or that includes the transition from WCG to SCG in video media component of the container |
| containerSCGCompatibility | OD default:false | flag to indicate that the video media component of the container can be compatible with SCG (standard color gamut) |
| Legend: For attributes: M=Mandatory, O=Optional, OD=Optional with Default Value, CM=Conditionally Mandatory. | | |

L17020

Ex.1
< ContainerWCGConfiguration schemeIdUri="urn:mpeg:dash:wcg:container:201x" value="9,,,,,,,,, false, true"/>
Ex.2
< ContainerWCGConfiguration schemeIdUri="urn:mpeg:dash:wcg:container:201x" value="2, 0.640, 0.330, 0.300, 0.600, 0.150, 0.060, 0.313, 0.329, false, true"/>

| Scheme Identifier (@schmeIdUri) | Informative description |
|---|---|
| urn:mpeg:dash:hfr:201x | Scheme identifier for high frame rate Configuration Description |

~L18010

| @value | Use | Description |
|---|---|---|
| SFRCompatibility | OD default:false | flag to indicate that the video media component can be compatible with standard frame rate (SFR) or legacy frame rate |
| HFRTransition | OD default:false | Flag to indicate that it includes the end of HFR video media component or that includes the transition from HFR to normal frame rate (legacy frame rate) in video media component |
| Legend: For attributes: M=Mandatory, O=Optional, OD=Optional with Default Value, M=Conditionally Mandatory. | | |

~L18020

Ex.1
< HFRConfiguration schemeIdUri="urn:mpeg:dash:HFR:201x" value="true, false"/>

| Scheme Identifier (@schmeIdUri) | Informative description |
|---|---|
| urn:mpeg:dash:hfr-temporal-layering:201x | Scheme identifier for high frame rate with temporal scalability Configuration Description |

~L19010

Table — @value attributes for HFR Temporal Layering element

| @value | Use | Description |
|---|---|---|
| scanType | O | Indicates the scan type<br>0: progressive, 1: interlaced |
| numOfTemporalLayers | O | 0: non-specified, 1: not use temporal scalability, 2: 2 temporal layers → temporal ID 0 + temporal ID 1, 3: 3 temporal layers → temporal ID 0 + 1 + 2, ... |
| frameRateOfTemporalID | O | indicates the supportable frame rate based on the value of temporal id. This field can be included repeatedly as many as the value of @NumOfTemporalLayers.<br>That is, this field indicates a frame rate for reproduction for each temporal id. This field may be repeated as many times as the number of the temporal layers and signaled.<br>0 = 23.976 Hz, 1 = 24 Hz, 2 = 29.97 Hz, 3 = 30 Hz, 4 = 59.94 Hz, 5 = 60 Hz, 6 = 25 Hz, 7 = 50 Hz, 8 = 100 Hz, 9 = 120/1.001 Hz, 10 = 120 Hz, ...<br>In here, this field signals displayable frame rate in order from temopral ID 0 to maximum temporal ID. |
| Legend: | | |
| For attributes: M=Mandatory, O=Optional, OD=Optional with Default Value, M=Conditionally Mandatory. | | |

~L19020

Ex.1 An example of a 120 Hz stream encoded without a temporal layer
<HFRTemporalLayeringConfiguration schemeIdUri="urn:mpeg:dash:hfr-temporal-layering:201x"
value="0 1 10"> ~L19030

If there is no temporal scalability,
   the frame rate of the stream
      may be signaled.

Ex.2 An example of a 120 Hz stream configured with numOfTemporalLayers set to 3 and temporal layers indicated by 0, 1 and 2
<HFRTemporalLayeringConfiguration schemeIdUri="urn:mpeg:dash:hfr-temporal-layering:201x"
value="0 3 3, 5, 10"> ~L19040 frame Rate Of Temporal IDs
as many as the number of numOfTemporal
    Layers may be included.

FIG. 20

| Element or Attribute Name | Use | Description |
|---|---|---|
| FRTemporalIDConfiguration | | Specifies frame rate based on the value of temporal id. It includes the information of the supportable frame rate based on the value of temporal id. However, it does not inform how many temporal layers are included. Namely, an element that may signal only the frame rate that is supportable for each temporal id without signaling the number of temporal layers |
| @schemeIdUri | M | specifies a URI to identify the scheme. The semantics of this element are specific to the scheme specified by this attribute. The @schemeIdUri may be a URN or URL. When a URL is used, it can also contain a month-date in the form mmyyyy; |
| @value | O | specifies the value for the descriptor element. The value space and semantics must be defined by the scheme identified in the @schemeIdUri attribute. |
| @id | O | specifies an identifier for the descriptor. Descriptors with identical values for this attribute shall be synonymous, i.e. the processing of one of the descriptors with an identical value is sufficient. |
| Legend: For attributes: M=Mandatory, O=Optional, OD=Optional with Default Value, CM=Conditionally Mandatory. For elements: <minOccurs>...<maxOccurs> (N=unbounded) Elements are bold; attributes are non-bold and preceded with an @. | | |

— L20010

```
<xs:element name="FRTemporalIDConfiguration" type="DescriptorType" minOccurs="0" maxOccurs="unbounded"/>
 <!-- Descriptor -->
 <xs:complexType name="DescriptorType">
  <xs:sequence>
   <xs:any namespace="##other" processContents="lax" minOccurs="0" maxOccurs="unbounded"/>
  </xs:sequence>
  <xs:attribute name="schemeIdUri" type="xs:anyURI" use="required"/>
  <xs:attribute name="value" type="xs:string"/>
  <xs:attribute name="id" type="xs:string"/>
  <xs:anyAttribute namespace="##other" processContents="lax"/>
 </xs:complexType>
```

| Scheme Identifier (@schmeIdUri) | Informative description |
|---|---|
| urn:mpeg:dash:frame-rate-temporal-id:201x | Specifies frame rate based on the value of temporal id. It includes the information of the supportable frame rate based on the value of temporal id. |

~L21010

| @value | Use | Description |
|---|---|---|
| contentColorGamutType | O | Indicates the scan type<br>0: progressive, 1: interlaced |
| maxTemporalID | O | Signals the maximum temporal id for outputting a frame rate corresponding to the value of frameRateOfTemporalID.<br>Ex. When there are three temporal id's (0:30Hz, 1:60Hz, 2:120Hz),<br>1. maxTemporalID is 1 if frameRateOfTemporalID is set to 6 (60 Hz is output).<br>2. maxTemporalID is 2 if frameRateOfTemporalID is set to 10 (120 Hz is output). |
| frameRateOfTemporalID | O | indicates the supportable frame rate based on the value of temporal id. This field can be included repeatedly as many as the value of @NumOfTemporalLayers.<br>That is, this field indicates a frame rate for reproduction for each temporal id. This field may be repeated as many times as the number of the temporal layers and signaled.<br>0 = 23.976 Hz, 1 = 24 Hz, 2 = 29.97 Hz, 3 = 30 Hz,<br>4 = 59.94 Hz, 5 = 60 Hz, 6 = 25 Hz, 7 = 50 Hz, 8 = 100 Hz, 9 = 120/1.001 Hz, 10 = 120 Hz, ... |
| Legend:<br>For attributes: M=Mandatory, O=Optional, OD=Optional with Default Value, M=Conditionally Mandatory. | | |

~L21020

Ex.1 An example of a 120 Hz stream encoded without a temporal layer
< FRTemporalIDConfiguration schemeIdUri="urn:mpeg:dash:frame-rate-temporal-id:201x" value="0, 0, 10"/>   ~L21030

Ex.2 An example of a 120 Hz stream configured with numOfTemporalLayers set to 3 and temporal layers indicated by 0, 1 and 2
< FRTemporalIDConfiguration schemeIdUri="urn:mpeg:dash:frame-rate-temporal-id:201x" value="0, 0, 3"/>
< FRTemporalIDConfiguration schemeIdUri="urn:mpeg:dash:frame-rate-temporal-id:201x" value="0, 1, 5"/>   ~L21040
< FRTemporalIDConfiguration schemeIdUri="urn:mpeg:dash:frame-rate-temporal-id:201x" value="0, 2, 10"/>

FIG. 22

| Element or Attribute Name | | | Use | Description |
|---|---|---|---|---|
| HFRTLConfiguration | | | | |
| | @scanType | | O | Indicates the scan type<br>0: progressive, 1: interlaced |
| | @numOfTemporalLayers | | O | 0: non-specified, 1: not use temporal scalability, 2: 2 temporal layers → temporal ID 0 + temporal ID 1, 3: 3 temporal layers → temporal ID 0 + 1 + 2, .... |
| | FRTIDConfiguration | | 0..N | Specifies frame rate based on the value of temporal id. It includes the information of the supportable frame rate based on the value of temporal id.<br>FRTIDConfiguration may be repeatedly included according to the value of @numOfTemporalLayers. |
| | | @maxTemporalID | O | Signals the maximum temporal id for outputting a frame rate corresponding to the value of frameRateOfTemporalID.<br>Ex. When there are three temporal id's (0:30Hz, 1:60Hz, 2:120Hz),<br>1. maxTemporalID is 1 if frameRateOfTemporalID is set to 6 (60 Hz is output).<br>2. maxTemporalID is 2 if frameRateOfTemporalID is set to 10 (120 Hz is output). |
| | | @frameRateOfTemporalID | O | indicates the supportable frame rate based on the value of the temporal id.<br>This field can be included repeatedly as many as the value of @NumOfTemporalLayers.<br>That is, this field indicates a frame rate for reproduction for each temporal id. This field may be repeated as many times as the number of the temporal layers and signaled.<br>0 = 23.976 Hz, 1 = 24 Hz, 2 = 29.97 Hz, 3 = 30 Hz, 4 = 59.94 Hz, 5 = 60 Hz, 6 = 25 Hz, 7 = 50 Hz, 8 = 100 Hz, 9 = 120/1.001 Hz, 10 = 120 Hz, ... |
| ... | | | | ... |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

An example for HFRTLConfiguration having FRTIDConfiguration as an element is given below.
<HFRTLConfiguration scanType="0" numOfTemporalLayers="3">
    <FRTIDConfiguration maxTemporalID="0" frameRateOfTemporalID="3">
    <FRTIDConfiguration maxTemporalID="1" frameRateOfTemporalID="5">
    <FRTIDConfiguration maxTemporalID="2" frameRateOfTemporalID="10">

</HFRTLConfiguration>

FRTIDConfiguration may be included as many as the number f numOfTemporalLayers.

FIG. 23

| Scheme Identifier (@schmeIdUri) | Informative description |
|---|---|
| urn:mpeg:dash:pulldown:201x | Scheme identifier for Pull Down Recovery Configuration Description |

— L23010

| @value | Use | Description |
|---|---|---|
| PullDownType | M | non-negative integer in decimal representation indicating the type of pull-down that is applied to the encoded video stream.<br><br>0- reserved, 1- 2:2 pull-down, 2- 2:3 pull down 3- 3:2 pull-down, 4- 4:4 pull-down 5- 5:5 pull-down, 6: 6:4 pull-down, ... |
| PullDownTransition | OD default:false | Flag to indicate that it includes the end of pull-downed video media component or that includes the transition from pull-downed to original frame rate in video media component |
| OriginalFrameRate | O | non-negative integer in decimal representation indicating the original frame rate (captured frame rate) to recover it from encoding frame rate.<br><br>0- reserved, 1- 120, 2. 120/1.001, 3- 100, 4- 60, 5- 60/1.001, 6- 50, 7- 30, 8- 30/1.001, 9- 25, 10- 24, 11- 24/1.001, 12 ~ 14- reserved |
| OriginalScanType | O | non-negative integer in decimal representation indicating the scanning type of original video<br><br>0- reserved, 1- interlaced, 2- progressive, 3- unspecified |
| Legend:<br>For attributes: M=Mandatory, O=Optional, OD=Optional with Default Value, M=Conditionally Mandatory. | | |

— L23020

< PullDownRecoveryConfiguration schemeIdUri="urn:mpeg:dash:pulldown:201x" value="3, false, 10, 2"/>  — L23030

FIG. 24

| Element or Attribute Name | Use | Description |
|---|---|---|
| Common attributes and elements | | |
| @profile | O | specifies the profiles which the associated Representation(s) conform to of the list of Media Presentation profiles as described in 8. The value shall be a subset of the respective value in any higher level of the document hierarchy (Representation, Adaptation Set, MPD). |
| ... | . | ... |
| @contentWCGFlag | O | Flag to indicate that the video media component supports WCG of the content |
| @contentWCGTransition | O | Flag to indicate that it includes the end of WCG video media component of the source or that includes the transition from WCG to SCG in video media component of the source |
| @contentSCGCompatibility | O | Flag to indicate that the video media component of the source can be compatible with SCG |
| @containerWCGFlag | O | Flag to indicate that the video media component supports WCG of the container |
| @containerWCGTransition | O | Flag to indicate that it includes the end of WCG video media component of the container or that includes the transition from WCG to SCG in video media component of the container |
| @containerSCGCompatibility | O | Flag to indicate that the video media component of the container can be compatible with SCG |
| FramePacking | 0..N | specifies frame-packing arrangement information of the video media component type. |
| ... | . | ... |
| ContentWCGConfiguration | 0..N | specifies content WCG configuration information of video media component |
| ContainerWCGConfiguration | 0..N | specifies container WCG configuration information of video media component |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 25

| Element or Attribute Name | Use | Description |
|---|---|---|
| Common attributes and elements | | |
| @profile | O | specifies the profiles which the associated Representation(s) conform to of the list of Media Presentation profiles as described in 8. The value shall be a subset of the respective value in any higher level of the document hierarchy (Representation, Adaptation Set, MPD). |
| ... | . | ... |
| @ContentWCGFlag | O | Flag to indicate that the video media component supports WCG of the Content |
| @ContentWCGTransition | O | Flag to indicate that it includes the end of WCG video media component of the content or that includes the transition from WCG to SCG in video media component of the content |
| @ContentSCGCompatibility | O | Flag to indicate that the video media component can be compatible with SCG of the content |
| @ContentColorPrimaryRx | O | x-coordinate value of r-color for Content in range of 0-1 |
| @ContentColorPrimaryRy | O | y-coordinate value of r-color for Content in range of 0-1 |
| @ContentColorPrimaryGx | O | x-coordinate value of g-color for Content in range of 0-1 |
| @ContentColorPrimaryGy | O | y-coordinate value of g-color for Content in range of 0-1 |
| @ContentColorPrimaryBx | O | x-coordinate value of b-color for Content in range of 0-1 |
| @ContentColorPrimaryBy | O | y-coordinate value of b-color for Content in range of 0-1 |
| @ContentWhitePx | O | x-coordinate value of white point for Content in range of 0-1 |
| @ContentWhitePy | O | y-coordinate value of white point for Content in range of 0-1 |
| @ContainerWCGFlag | O | Flag to indicate that the video media component supports WCG of the Container |
| @ContainerWCGTransition | O | Flag to indicate that it includes the end of WCG video media component of the container or that includes the transition from WCG to SCG in video media component of the container |
| @ContainerSCGCompatibility | O | Flag to indicate that the video media component can be compatible with SCG of the container |
| @ContainerColorPrimaryRx | O | x-coordinate value of r-color for container in range of 0-1 |
| @ContainerColorPrimaryRy | O | y-coordinate value of r-color for container in range of 0-1 |
| @ContainerColorPrimaryGx | O | x-coordinate value of g-color for container in range of 0-1 |
| @ContainerColorPrimaryGy | O | y-coordinate value of g-color for container in range of 0-1 |
| @ContainerColorPrimaryBx | O | x-coordinate value of b-color for container in range of 0-1 |
| @ContainerColorPrimaryBy | O | y-coordinate value of b-color for container in range of 0-1 |
| @ContainerWhitePx | O | x-coordinate value of white point for container in range of 0-1 |
| @ContainerWhitePy | O | y-coordinate value of white point for container in range of 0-1 |

FIG. 26

| Element or Attribute Name | Use | Description |
|---|---|---|
| Common attributes and elements | | |
| @profile | O | specifies the profiles which the associated Representation(s) conform to of the list of Media Presentation profiles as described in 8. The value shall be a subset of the respective value in any higher level of the document hierarchy (Representation, Adaptation Set, MPD). |
| ... | . | ... |
| @HFRFlag | O | Flag to indicate that the video media component supports HFR |
| @SFRCompatibility | O | Flag to indicate that the video media component can be compatible with legacy/normal frame rate |
| @HFRTransition | O | Flag to indicate that it includes the end of HFR video media component or that includes the transition from HFR to normal frame rate (legacy frame rate) in video media component |
| @TemporalLayeringFlag | O | Flag to indicate that the structure of the video media component uses temporal layering. @SFRCompatibility and @TemporalLayeringFlag can be similar, but @TemporalLayeringFlag is more specific. It can indicate the number of temporal layers. It means if there is @TemporalLayeringFlag, @SFRCompatiblity don't need to be included. |
| @PullDownFlag | O | Flag to indicate the video media component made by pull down processing or not |
| @PullDownTransition | O | Flag to indicate that it includes the end of pull-downed video media component or that includes the transition from pull-downed to original frame rate in video media component |
| FramePacking | 0..N | specifies frame-packing arrangement information of the video media component type. |
| ... | . | ... |
| HFRTemporalLayeringConfiguration | 0..N | specifies HFRTemporalLayering configuration of video media component |
| FRTemporalIDConfiguration | 0..N | Specifies FRTemporalID configuration of video media component |
| HFRTLConfiguration | 0..N | specifies HFRTLConfiguration of video media component. It includes FRTIDConfiguration as an element. |
| PullDownRecoveryConfiguration | 0..N | specifies pull down recovery configuration of video media component |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 27

| Element or Attribute Name | Use | Description |
|---|---|---|
| Common attributes and elements | | |
| @profile | O | specifies the profiles which the associated Representation(s) conform to of the list of Media Presentation profiles as described in 8. The value shall be a subset of the respective value in any higher level of the document hierarchy (Representation, Adaptation Set, MPD). |
| ... | · | ... |
| @HFRFlag | O | Flag to indicate that the video media component supports HFR |
| @SFRCompatibility | O | Flag to indicate that the video media component can be compatible with legacy/normal frame rate |
| @HFRTransition | O | Flag to indicate that it includes the end of HFR video media component or that includes the transition from HFR to normal frame rate (legacy frame rate) in video media component |
| @TemporalLayeringFlag | O | Flag to indicate that the structure of the video media component uses temporal layering. @SFRCompatibility and @TemporalLayeringFlag can be similar, but @TemporalLayeringFlag is more specific. It can indicate the number of temporal layers. It means if there is @TemporalLayeringFlag, @SFRCompatibility don't need to be included. |
| @scanType | O | Indicates the scan type<br>0: progressive, 1: interlaced |
| @numOfTemporalLayers | O | 0: non-specified, 1: not use temporal scalability, 2: 2 temporal layers → temporal ID 0 + temporal layers 1, 3: 3 temporal layers → temporal ID 0 + 1 + 2, .... |
| @maxTemporalID | O | Signals the maximum temporal id for outputting a frame rate corresponding to the value of frameRateOfTemporalID.<br>Ex. When there are three temporal id's (0:30Hz, 1:60Hz, 2:120Hz),<br>1. maxTemporalID is 1 if frameRateOfTemporalID is set to 6 (60 Hz is output).<br>2. maxTemporalID is 2 if frameRateOfTemporalID is set to 10 (120 Hz is output). |
| @frameRateOfTemporalID | O | indicates the supportable frame rate based on the value of temporal id.<br>This field can be included repeatedly as many as the value of @NumOfTemporalLayers.<br>That is, this field indicates a frame rate for reproduction for each temporal id. This field may be repeated as many times as the number of the temporal layers and signaled.<br>0 = 23.976 Hz, 1 = 24 Hz, 2 = 29.97 Hz, 3 = 30 Hz, 4 = 59.94 Hz, 5 = 60 Hz, 6 = 25 Hz, 7 = 50 Hz, 8 = 100 Hz, 9 = 120/1.001 Hz, 10 = 120 Hz, ... |
| @PullDownFlag | O | Flag to indicate the video media component made by pull down processing or not |
| @PullDownTransition | O | Flag to indicate that it includes the end of pull-downed video media component or that includes the transition from pull-downed to original frame rate in video media component |
| @PullDownType | O | non-negative integer in decimal representation indicating the type of pull-down that is applied to the encoded video stream. |
| @OriginalFrameRate | O | non-negative integer in decimal representation indicating the original frame rate (captured frame rate) to recover it from encoding frame rate. |
| @OriginalScanType | O | non-negative integer in decimal representation indicating the scanning type of original video |

FIG. 28

```
<EssentialProperty schemeIdUri="urn:mpeg:dash:wcg:content:201x" value="9,,,,,,,,, false, true"/>       ~L28010

<xs:attribute name="contentColorGamutType" type="xs:anyURI" use="required"/>
<xs:attribute name="contentColorPrimaryRx" type="xs:float"/>
<xs:attribute name="contentColorPrimaryRy" type="xs:float"/>
<xs:attribute name="contentColorPrimaryGx" type="xs:float"/>
<xs:attribute name="contentColorPrimaryGy" type="xs:float"/>                                            ~L28020
<xs:attribute name="contentColorPrimaryBx" type="xs:float"/>
<xs:attribute name="contentColorPrimaryBy" type="xs:float"/>
<xs:attribute name="contentWhitePx" type="xs:float"/>
<xs:attribute name="contentWhitePy" type="xs:float"/>
<xs:attribute name="contentWCGTransition" type="xs:boolean"/>
<xs:attribute name="contentSCGCompatibility" type="xs:boolean"/>

<EssentialProperty schemeIdUri="urn:mpeg:dash:wcg:content:201x" value="1" contentColorGamutType="9"
contentColorPrimaryRx =" " contentColorPrimaryRy =" " contentColorPrimaryGx =" " contentColorPrimaryGy =" "   ~L28030
contentColorPrimaryBx =" " contentColorPrimaryBy =" " contentWhitePx =" " contentWhitePy =" " contentWCGTransition="false"
contentSCGCompatibility ="true"/>
```

FIG. 29

```
<EssentialProperty schemeIdUri="urn:mpeg:dash:wcg:container:201x" value="9,,,,,,,,false, true"/>
```
— L29010

```
<xs:attribute name="containerColorGamutType" type="xs:anyURI" use="required"/>
<xs:attribute name="containerColorPrimaryRx" type="xs:float"/>
<xs:attribute name="containerColorPrimaryRy" type="xs:float"/>
<xs:attribute name="containerColorPrimaryGx" type="xs:float"/>
<xs:attribute name="containerColorPrimaryGy" type="xs:float"/>
<xs:attribute name="containerColorPrimaryBx" type="xs:float"/>
<xs:attribute name="containerColorPrimaryBy" type="xs:float"/>
<xs:attribute name="containerWhitePx" type="xs:float"/>
<xs:attribute name="containerWhitePy" type="xs:float"/>
<xs:attribute name="containerWCGTransition" type="xs:boolean"/>
<xs:attribute name="containerSCGCompatibility" type="xs:boolean"/>
```
— L29020

```
<EssentialProperty schemeIdUri="urn:mpeg:dash:wcg:container:201x" value="1" containerColorGamutType="9"
containerColorPrimaryRx =" " containerColorPrimaryRy =" " containerColorPrimaryGx =" " containerColorPrimaryGy =" "
containerColorPrimaryBx =" " containerColorPrimaryBx =" " containerWhitePx =" " containerWhitePy =" "
containerWCGTransition="false" containerSCGCompatibility ="true"/>
```
— L29030

FIG. 30

[HFR]
<EssentialProperty schemeIdUri="urn:mpeg:dash:HFR:201x" value="true, false"/> ~L30010

[HFR]
<xs:attribute name="SFRCompatibility" type="xs:boolean" />
<xs:attribute name="HFRTransition" type="xs:boolean"/>

<EssentialProperty schemeIdUri="urn:mpeg:dash:HFR:201x" value="1" SFRCompatibility="true" HFRTransition ="false"/> ~L30020

[PullDownRecovery]
<EssentialProperty schemeIdUri="urn:mpeg:dash:pulldown:201x" value="3, false, 10, 2"/> ~L30030

[PullDownRecovery]
<xs:attribute name="PullDownType" type=" xs:anyURI " use="required"/>
<xs:attribute name="PullDownTransition" type="xs:boolean"/>
<xs:attribute name="OriginalFrameRate" type="xs:anyURI" />
<xs:attribute name="OriginalScanType" type=" xs:anyURI "/>

<EssentialProperty schemeIdUri="urn:mpeg:dash:pulldown:201x" value="1" PullDownType= "3" PullDownTransition="false" OriginalFrameRate="10" OriginalScanType = "2" /> ~L30040

FIG. 31

[HFRTemporalLayering]
<EssentialProperty schemeIdUri="urn:mpeg:dash:hfr-temporal-layering:201x" value="0,3,5,10"/> ~L31010 frameRateOfTemporalIDs as many as the number of numOfTemporalLayers may be included.

[HFRTemporalLayering]
<xs:attribute name="scanType" type="xs:anyURI"/>
<xs:attribute name="numOfTemporalLayers" type="xs:anyURI"/>
<xs:attribute name="frameRateOfTemporalID" type="xs:anyURI"/>

<EssentialProperty schemeIdUri="urn:mpeg:dash:hfr-temporal-layering:201x" value="1" scanType="0" numOfTemporalLayers="3" frameRateOfTemporalID = "3" frameRateOfTemporalID = "5" frameRateOfTemporalID = "10"/> ~L31020

FIG. 32

@value = content_color_gamut_type [","content_color_Primary_Rx][","content_color_Primary_Ry] [","content_color_Primary_Gx] [",
content_color_Primary_Gy] [","content_color_Primary_Bx] [","content_color_Primary_By] [","content_white_Point_x] [",
content_white_point_y] [","content_WCG_transition] [","content_SCG_compatibility]
content_color_gamut = "content_color_gamut:" content_color_gamut_type
content_color_gamut_type = (%d1 -%d255) ;decimal numbers 1 through 255
content_color_primary_Rx = "content_color_primary_Rx" ",": 1*digit "." 4*digit
content_color_primary_Ry = "content_color_primary_Ry" ",": 1*digit "." 4*digit
content_color_primary_Gx = "content_color_primary_Gx" ",": 1*digit "." 4*digit
content_color_primary_Gx = "content_color_primary_Gx" ",": 1*digit "." 4*digit
content_color_primary_Bx = "content_color_primary_Bx" ",": 1*digit "." 4*digit
content_color_primary_Bx = "content_color_primary_Bx" ",": 1*digit "." 4*digit
content_white_point_x = "content_white_point_x" ",": 1*digit "." 4*digit
content_white_point_y = "content_white_point_y" ",": 1*digit "." 4*digit
content_WCG_transition = "content_WCG_trans" ",": BIT; default value 0
content_SCG_compatibility = "content_SCG_com" ",": BIT; default value 0
BIT = "0" | "1"
digit = "0" | "1" | "2" | "3" | "4" | "5" | "6" | "7" | "8" | "9"

~ L32010

<Accessibility schemeIdUri="urn:mpeg:dash:wcg:content:201x" value="content_color_gamut_type: 2, content_color_primary_Rx: 0.6400,
content_color_primary_Ry: 0.3300, content_color_primary_Gx: 0.3000, content_color_primary_Gy: 0.6000, content_color_primary_Bx: 0.1500,
content_color_primary_By: 0.0600, content_white_point_x: 0.3127, content_white_point_y: 0.3290, content_WCG_trans:0,
content_SCG_com:1"/>

@value = container_color_gamut_type ["," container_color_Primary_Rx] ["," container_color_Primary_Ry] ["," container_color_Primary_Gx] ["," container_color_Primary_Gy] ["," container_color_Primary_Bx] ["," container_color_Primary_By] ["," container_white_Point_x] ["," container_white_point_y] ["," container_SCG_compatibility] ["," container_WCG_ttransition] ~L33010
container_color_gamut = "container_color_gamut:" container_color_gamut_type
container_color_gamut_type = (%d1 -%d255) ,decimal numbers 1 through 255
container_color_primary_Rx ="container_color_primary_Rx" "," 1*digit "." 3*digit
container_color_primary_Ry ="container_color_primary_Ry" "," 1*digit "." 3*digit
container_color_primary_Gx ="container_color_primary_Gx" "," 1*digit "." 3*digit
container_color_primary_Gx ="container_color_primary_Gx" "," 1*digit "." 3*digit
container_color_primary_Bx ="container_color_primary_Bx" "," 1*digit "." 3*digit
container_color_primary_Bx ="container_color_primary_Bx" "," 1*digit "." 3*digit
container_white_point_x ="container_white_point_x" "," 1*digit "." 3*digit
container_white_point_y ="container_white_point_y" "," 1*digit "." 3*digit
container_WCG_transition="WCG_trans" "," BIT; default value 0
container_SCG_compatibility="SCG_com" "," BIT; default value 0
BIT = "0" | "1"
digit = "0" | "1" | "2" | "3" | "4" | "5" | "6" | "7" | "8" | "9"

<Accessibility schemeIdUri="urn:mpeg:dash:wcg:container:201x" value="container_color_gamut_type: 2, container_color_primary_Rx: 0.6400, container_color_primary_Ry: 0.3300, container_color_primary_Gx: 0.3000, container_color_primary_Gy: 0.6000, container_color_primary_Bx: 0.1500, container_color_primary_By: 0.0600, container_white_point_x: 0.3130, container_white_point_y: 0.3290, container_WCG_trans:0 , container_SCG_com:1"/> ~L33020

FIG. 34

@value = HFR_comtibility "," HFR_transition  
SFR_compatibility = "SFR_compatibility" ","; BIT; default value 0  
HFR_transition = "HFR_transition" ","; BIT; default value 0  
BIT = "0" | "1"  
digit = "0" | "1" | "2" | "3" | "4" | "5" | "6" | "7" | "8" | "9"  
 ~L34010

<Accessibility schemeIdUri="urn:mpeg:dash:HFR:201x" value="SFR_compatibility=1, HFR_transition =0"/>  
 ~L34020

@value = pull_down_type "," pull_down_transition "," orignal_frame_rate "," origitnal_scan_type  
pull_down_type = (%d1 -%d15) ;decimal numbers 1 through 15  
pull_down_transition = "pull_down_transition" ","; BIT; default value 0  
orignal_frame_rate = (%d1 -%d15) ;decimal numbers 1 through 15  
orignal_scan_type = (%d1 -%d3) ,decimal numbers 1 through 3  
BIT = "0" | "1"  
digit = "0" | "1" | "2" | "3" | "4" | "5" | "6" | "7" | "8" | "9"  
 ~L34030

<Accessibility schemeIdUri="urn:mpeg:dash:pulldown:201x" value="pull_down_type=3, pull_down_transition =1, original_frame_rate=10, original_scan_type=2"/>  
 ~L34040

FIG. 35

@value = num_of_temporal_layers "," scan_type "," frame_rate_of_temporal_id
scan_type = "scan_type" ":" BIT; default value 0
num_of_temporal_layers = "num_of_temporal_layers" ":" BIT; default value 0
frame_rate_of_temporal_id = "frame_rate_of_temporal_id" ":" BIT; default value 0
BIT = "0" | "1"
digit = "0" | "1" | "2" | "3" | "4" | "5" | "6" | "7" | "8" | "9"    ~L35010

<Accessibility schemeIdUri="urn:mpeg:dash:hfr-temporal-layering:201x" value="scan_type=0, num_of_temporal_layers=3, frame_rate_of_temporal_id=3, frame_rate_of_temporal_id=5, frame_rate_of_temporal_id=10"/>    ~L35020

FIG. 36

| Element or Attribute Name | Use | Description |
|---|---|---|
| ContentComponent | | description of a content component |
| @id | O | specifies an identifier for this media component. The attribute shall be unique in the scope of the containing Adaptation Set. |
| ... | . | ... |
| @contentWCGFlag | O | Flag to indicate that the video media component supports WCG of the Content |
| @contentWCGTransition | O | Flag to indicate that it includes the end of WCG video media component of the content or that includes the transition from WCG to SCG in video media component of the content |
| @contentSCGCompatibility | O | Flag to indicate that the video media component can be compatible with SCG of the content |
| @containerWCGFlag | O | Flag to indicate that the video media component supports WCG of the Container |
| @containerWCGTransition | O | Flag to indicate that it includes the end of WCG video media component of the container or that includes the transition from WCG to SCG in video media component of the container |
| @containerSCGCompatibility | O | Flag to indicate that the video media component can be compatible with SCG of the container |
| Accessibility | O..N | specifies information about accessibility scheme |
| ... | . | ... |
| ContentWCGConfiguration | O..N | specifies content WCG configuration information of video media component |
| ContainerWCGConfiguration | O..N | specifies container WCG configuration information of video media component |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 37

| Element or Attribute Name | Use | Description |
|---|---|---|
| SegmentBase | | |
| Segment Base Information | | specifies Segment base element |
| | | This element also specifies the type for the Segment base information that is the base type for other elements. |
| @timescale | O | specifies the timescale in units per seconds to be used for the derivation of different real-time duration values in the Segment Information. |
| ... | . | ... |
| @contentWCGFlag | O | Flag to indicate that the video media component supports WCG of the Content |
| @contentWCGTransition | O | Flag to indicate that it includes the end of WCG video media component of the content or that includes the transition from WCG to SCG in video media component of the content |
| @contentSCGCompatibility | O | Flag to indicate that the video media component can be compatible with SCG of the content |
| @containerWCGFlag | O | Flag to indicate that the video media component supports WCG of the Container |
| @containerWCGTransition | O | Flag to indicate that it includes the end of WCG video media component of the container or that includes the transition from WCG to SCG in video media component of the container |
| @containerSCGCompatibility | O | Flag to indicate that the video media component can be compatible with SCG of the container |
| Initialization | 0..1 | specifies the URL including a possible byte range for the Initialization Segment. |
| ... | . | ... |
| ContentWCGConfiguration | 0..N | specifies content WCG configuration information of video media component |
| ContainerWCGConfiguration | 0..N | specifies container WCG configuration information of video media component |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 38

| Element or Attribute Name | Use | Description |
|---|---|---|
| ContentComponent | | description of a content component |
| @id | O | specifies an identifier for this media component. The attribute shall be unique in the scope of the containing Adaptation Set. |
| ... | . | ... |
| @HFRFlag | O | Flag to indicate that the video media component supports HFR |
| @SFRCompatibility | O | Flag to indicate that the video media component can be compatible with legacy/normal frame rate |
| @HFRTransition | O | Flag to indicate that it includes the end of HFR video media component or that includes the transition from HFR to normal frame rate (legacy frame rate) in video media component |
| @TemporalLayeringFlag | O | Flag to indicate that the structure of the video media component uses temporal layering. @SFRCompatibility and @TemporaLayeringFlag can be similar, but @TemporalLayeringFlag is more specific. It can indicate the number of temporal layers. It means if there is @TemporalLayeringFlag, @SFRCompatibility don't need to be included. |
| @PullDownFlag | O | Flag to indicate the video media component made by pull down processing or not |
| @PullDownTransition | O | Flag to indicate that it includes the end of pull-downed video media component or that includes the transition from pull-downed to original frame rate in video media component |
| Accessibility | 0..N | specifies information about accessibility scheme |
| ... | . | ... |
| HFRTemporalLayeringConfiguration | 0..N | specifies HFRTemporalLayering configuration of video media component |
| FRTemporalIDConfiguration | 0..N | Specifies FRTemporalID configuration of video media component |
| HFRTLConfiguration | 0..N | specifies HFRTLConfiguration of video media component. It includes FRTIDConfiguration as an element. |
| PullDownRecoveryConfiguration | 0..N | specifies pull down recovery configuration of video media component |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

FIG. 39

| Element or Attribute Name | Use | Description |
|---|---|---|
| SegmentBase | | specifies Segment base element |
| Segment Base Information | | This element also specifies the type for the Segment base information that is the base type for other elements. |
| @timescale | O | specifies the timescale in units per seconds to be used for the derivation of different real-time duration values in the Segment Information. |
| ... | . | ... |
| @HFRFlag | O | Flag to indicate that the video media component supports HFR |
| @SFRCompatibility | O | Flag to indicate that the video media component can be compatible with SFR |
| @HFRTransition | O | Flag to indicate that it includes the end of HFR video media component or that includes the transition from HFR to normal frame rate (legacy frame rate) in video media component |
| @TemporalLayeringFlag | O | Flag to indicate that the structure of the video media component uses temporal layering. @SFRCompatibility and @TemporaLayeringFlag can be similar, but @TemporalLayeringFlag is more specific. It can indicate the number of temporal layers. It means if there is @TemporalLayeringFlag, @SFRCompatibility don't need to be included. |
| @PullDownFlag | O | Flag to indicate the video media component made by pull down processing or not |
| @PullDownTransition | O | Flag to indicate that it includes the end of pull-downed video media component or that includes the transition from pull-downed to original frame rate in video media component |
| Initialization | 0..1 | specifies the URL including a possible byte range for the Initialization Segment. |
| ... | . | ... |
| HFRTemporalLayeringConfiguration | 0..N | specifies HFRTemporalLayering configuration of video media component |
| FRTemporalIDConfiguration | 0..N | Specifies FRTemporalID configuration of video media component |
| HFRTLConfiguration | 0..N | specifies HFRTLConfiguration of video media component. It includes FRTIDConfiguration as an element. |
| PullDownRecoveryConfiguration | 0..N | specifies pull down recovery configuration of video media component |

Legend:
For attributes: M=Mandatory, O=Optional, OD=Optional with Default Value, CM=Conditionally Mandatory.
For elements: <minOccurs>...<maxOccurs> (N=unbounded)
Elements are bold; attributes are non-bold and preceded with an @.

APPARATUS FOR TRANSMITTING BROADCASTING SIGNAL, APPARATUS FOR RECEIVING BROADCASTING SIGNAL, METHOD FOR TRANSMITTING BROADCASTING SIGNAL, AND METHOD FOR RECEIVING BROADCASTING SIGNAL

This application is a National Stage Application of International Application No. PCT/KR2016/004293 filed on Apr. 25, 2016, and claims priority to U.S. Provisional Application No. 62/151,999 filed on Apr. 23, 2015, U.S. Provisional Application No. 62/154,071 filed on Apr. 28, 2015 and U.S. Provisional Application No. 62/211,886 filed on Aug. 31, 2015, all of which are hereby incorporated by reference in their entireties as if fully set forth herein.

TECHNICAL FIELD

The present invention relates to an apparatus for transmitting a broadcast signal, an apparatus for receiving a broadcast signal, a method for transmitting a broadcast signal, and a method for receiving a broadcast signal.

BACKGROUND ART

With the end of analog broadcasting, various technologies for transmitting and receiving digital broadcast signals have been developed. The digital broadcast signal may contain a larger amount of video/audio data than the analog broadcast signal, and may further contain various kinds of additional data as well as video/audio data.

DISCLOSURE

Technical Problem

That is, the digital broadcasting system may provide a high definition (HD) image, multi-channel audio, and various additional services. However, to implement digital broadcasting, data transmission efficiency for transmission of a large amount of data, robustness of the transmission/reception network, and network flexibility for mobile receivers should be improved.

Technical Solution

According to an aspect of the present invention, provided herein are a system for effectively supporting a next-generation broadcast service in an environment in which next-generation hybrid broadcasting employing a terrestrial broadcast network and an Internet protocol network is supported and a related signaling method.

Advantageous Effects

The present invention may provide a method for processing WCG content in an MPEG DASH-based broadcast system and signaling for the same.

The present invention may provide a method for processing HFR content in an MPEG DASH-based broadcast system and signaling for the same.

The present invention may provide a method for processing pulled-down content in an MPEG DASH-based broadcast system and signaling for the same.

The present invention may provide a method for processing temporal-layered content in an MPEG DASH-based broadcast system and signaling for the same.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram showing a low level signaling (LLS) table and a service list table (SLT) according to one embodiment of the present invention;

FIG. 4 is a diagram showing a USBD and an S-TSID delivered through ROUTE according to one embodiment of the present invention;

FIG. 5 is a diagram showing a USBD delivered through MMT according to one embodiment of the present invention;

FIG. 6 is a diagram showing link layer operation according to one embodiment of the present invention;

FIG. 7 is a diagram showing a link mapping table (LMT) according to one embodiment of the present invention;

FIG. 10 shows configuration of a ContentWCGConfiguration element and a ContainerWCGConfiguration element according to an embodiment of the present invention;

FIG. 11 shows configuration of an HFRConfiguration element and a PullDownRecoveryConfiguration element according to an embodiment of the present invention;

FIG. 12 shows configuration of an HFRTemporalLayeringConfiguration element according to an embodiment of the present invention;

FIG. 13 illustrates an XML schema of a ContentWCGConfiguration element and a ContainerWCGConfiguration element according to an embodiment of the present invention;

FIG. 14 illustrates an XML schema of an HFRConfiguration element and a PullDownRecoveryConfiguration element according to an embodiment of the present invention;

FIG. 15 illustrates an XML schema of an HFRTemporalLayeringConfiguration element according to an exemplary embodiment of the present invention;

FIG. 16 shows description of @schemeIdUri and @value of the ContentWCGConfiguration element according to an embodiment of the present invention;

FIG. 17 shows description of @schemeIdUri and @value of the ContainerWCGConfiguration element according to an embodiment of the present invention;

FIG. 18 shows description of @schemeIdUri and @value of the HFRConfiguration element according to an embodiment of the present invention;

FIG. 19 shows description of @schemeIdUri and @value of the HFRTemporalLayeringConfiguration element according to an embodiment of the present invention;

FIG. 20 shows configuration of an FRTemporalIDConfiguration element according to an embodiment of the present invention;

FIG. 21 shows description of @schemeIdUri and @value of the FRTemporalIDConfiguration element according to an embodiment of the present invention;

FIG. 22 shows configuration of an HFRT configuration element according to an embodiment of the present invention;

FIG. 23 shows description of @schemeldUri and @value of the PullDownRecoveryConfiguration element according to an embodiment of the present invention;

FIG. 24 shows configuration of common attributes and elements according to an embodiment of the present invention;

FIG. 25 shows configuration of common attributes and elements according to another embodiment of the present invention;

FIG. 26 shows configuration of common attributes and elements according to another embodiment of the present invention;

FIG. 27 shows configuration of common attributes and elements according to another embodiment of the present invention;

FIG. 28 shows configuration of an EssentialProperty descriptor and a SupplementaryProperty descriptor according to an embodiment of the present invention;

FIG. 29 shows configuration of an EssentialProperty descriptor and a SupplementaryProperty descriptor according to another embodiment of the present invention;

FIG. 30 shows configuration of an EssentialProperty descriptor and a SupplementaryProperty descriptor according to another embodiment of the present invention;

FIG. 31 shows configuration of an EssentialProperty descriptor and a SupplementaryProperty descriptor according to another embodiment of the present invention;

FIG. 32 shows configuration of an Accessibility Descriptor according to an embodiment of the present invention;

FIG. 33 shows configuration of an Accessibility Descriptor according to another embodiment of the present invention;

FIG. 34 shows configuration of an Accessibility Descriptor according to another embodiment of the present invention;

FIG. 35 shows configuration of an Accessibility Descriptor according to another embodiment of the present invention;

FIG. 36 shows configuration of a ContentComponent element according to an embodiment of the present invention;

FIG. 37 shows configuration of a SegmentBase element according to an embodiment of the present invention;

FIG. 38 shows configuration of a ContentComponent element according to another embodiment of the present invention;

FIG. 39 shows configuration of a SegmentBase element according to another embodiment of the present invention;

BEST MODE

Reference will now be made in detail to the preferred embodiments of the present invention, examples of which are illustrated in the accompanying drawings. The following detailed description with reference to the accompanying drawings is intended to explain preferred embodiments of the invention rather than merely presenting examples that can be implemented according to embodiments of the present invention. The following detailed description includes details in order to provide a thorough understanding of the present invention. It will be apparent, however, to one skilled in the art that the present invention can be practiced without these details.

Although most of the terms used in the present invention are selected from common ones widely used in the field, some terms are arbitrarily selected by the applicant and the meaning thereof will be described in detail in the following description as necessary. Accordingly, the invention should be understood based on the intended meaning of the term rather than the mere name or meaning of the term.

The present invention provides apparatuses and methods for transmitting and receiving broadcast signals for future broadcast services. Future broadcast services according to an embodiment of the present invention include a terrestrial broadcast service, a mobile broadcast service, and an ultra-high-definition television (UHDTV) service. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
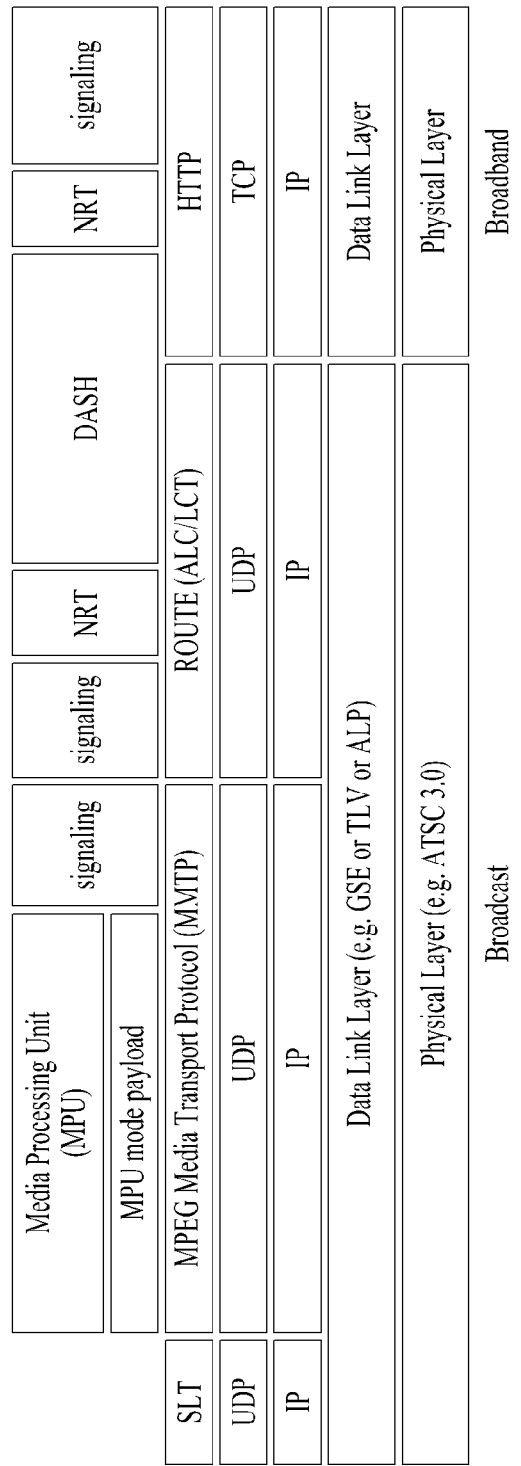
FIG. 1 is a diagram showing a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non-real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non-real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or a closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
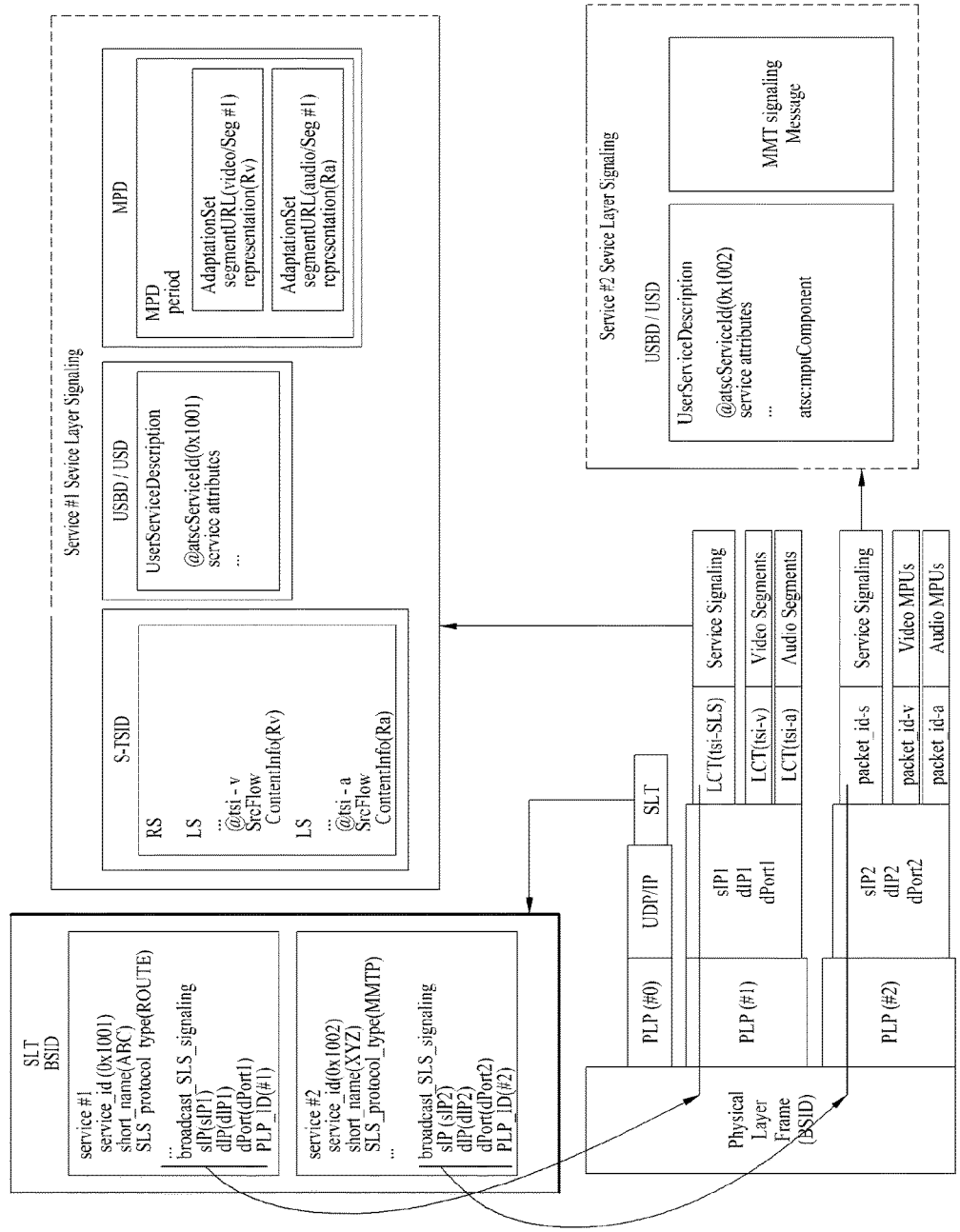
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried in payloads of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet _id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the Asset is a multimedia data entity, which is associated with one unique ID, and may be used to generate one multimedia presentation. The Asset may correspond to service components configuring one service. A streaming service component (MPU) corresponding to a desired service may be accessed using the MP table. The MP table may be referenced by the USBD as described above.

Other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, and a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccess Required attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with a capability information format provided in a service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channels, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, an mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with the content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further include an @fullMPDUri attribute. This attribute may reference the MPD describing the service component delivered over broadband. In addition to hybrid service delivery, the broadcast signal may be weakened due to traveling in a tunnel and thus this element may be necessary to support handoff between a broadcast band and a broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset _id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide options for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signal transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may also be referred to as multicast.

Information on IP streams or transport sessions transmitted through a specific PLP may be acquired through the LMT. In contrast, information on through which PLP a specific transport session is delivered may be acquired.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the illustrated embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments.

The signaling_type field may indicate the type of signaling information delivered by the table. The value of the signaling_type field for the LMT may be set to 0x01. The signaling_type field may be omitted. The PLP_ID field may identify a PLP corresponding to the LMT. The num_session field may indicate the number of higher layer sessions delivered through the PLP identified by the corresponding PLP_ID field.

According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_ID field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. The SID field may indicate the SIDs (sub stream IDs) of the link layer packets delivering the transport session.

The context_id field may provide a reference for a context id (CID) in the RDT. The CID information of the RDT may indicate the context ID of the compressed IP packet stream. The RDT may provide context information of the compressed IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by a plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
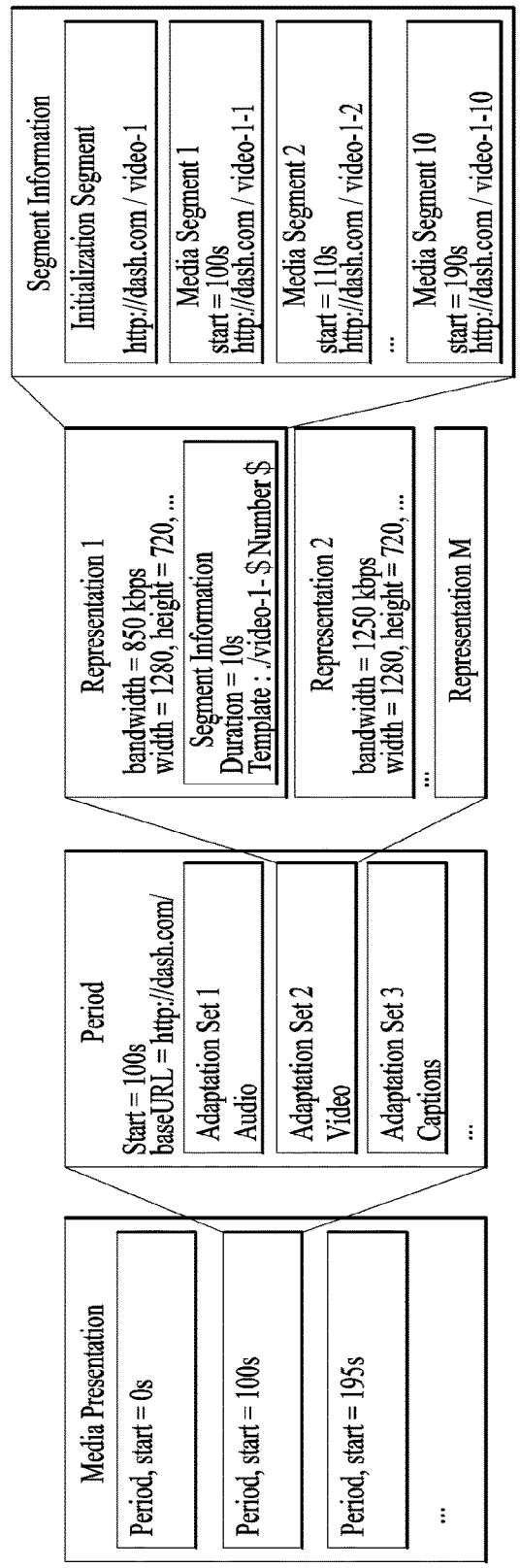
FIG. 8 is a diagram illustrating a Dynamic Adaptive Streaming over HTTP (DASH) data model according to an embodiment of the present invention.

FIG. 8 is a diagram illustrating a dynamic adaptive streaming over HTTP (DASH) data model according to an embodiment of the present invention.

According to the DASH data model according to an embodiment of the present invention, a Media Presentation may include one or more Periods. A Period may include one or more Adaptation Sets. An Adaptation Set may include one or more Representations. A Representation may include one or more Segment Information. One Segment Information may include an Initialization Segment and one or more Media Segments.

Referring to this figure, the Period starting from a media time of 100 seconds has as a baseURL and includes Adaptation Set 1 for an audio component, Adaptation Set 2 for a video component, and/or Adaptation Set 3 for a caption component. Here, Adaptation Set 2 includes Representation 1 and Representation 2. Representation 1 represents a video component with specifications such as bandwidth=850 kbps, width=1280 and height=720, and Representation 2 represents a video component with specifications such as bandwidth=1250 kbps, width=1280, and height=720. Representation 1 includes Segment Information that contains information about a segment that delivers the video component represented by Representation 1. The Segment Information includes the duration and/or template information on the segment. In this figure, the segment for the video component represented by Representation 1 has a duration of 10 seconds and has ./video-1-$Number$ as a Template. In this figure, Representation 1 includes Initialization Segment and Media Segment 1 to Media Segment 10. The Segment Information includes information about the Segment for Representation 1. In this figure, the Segment Information includes template information ( ) of Initialization Segment, presentation start time information (start=100 s) and template information ( ) of Media Segment 1, presentation start time information (start=110 s) and template information ( ) of Media Segment 2, and presentation start time information (start=190s) and template information ( ) of Media segment 10.

In accordance with an embodiment of the present invention, the terms color gamut, color space, and color primaries may be used interchangeably herein.

Figure 9:
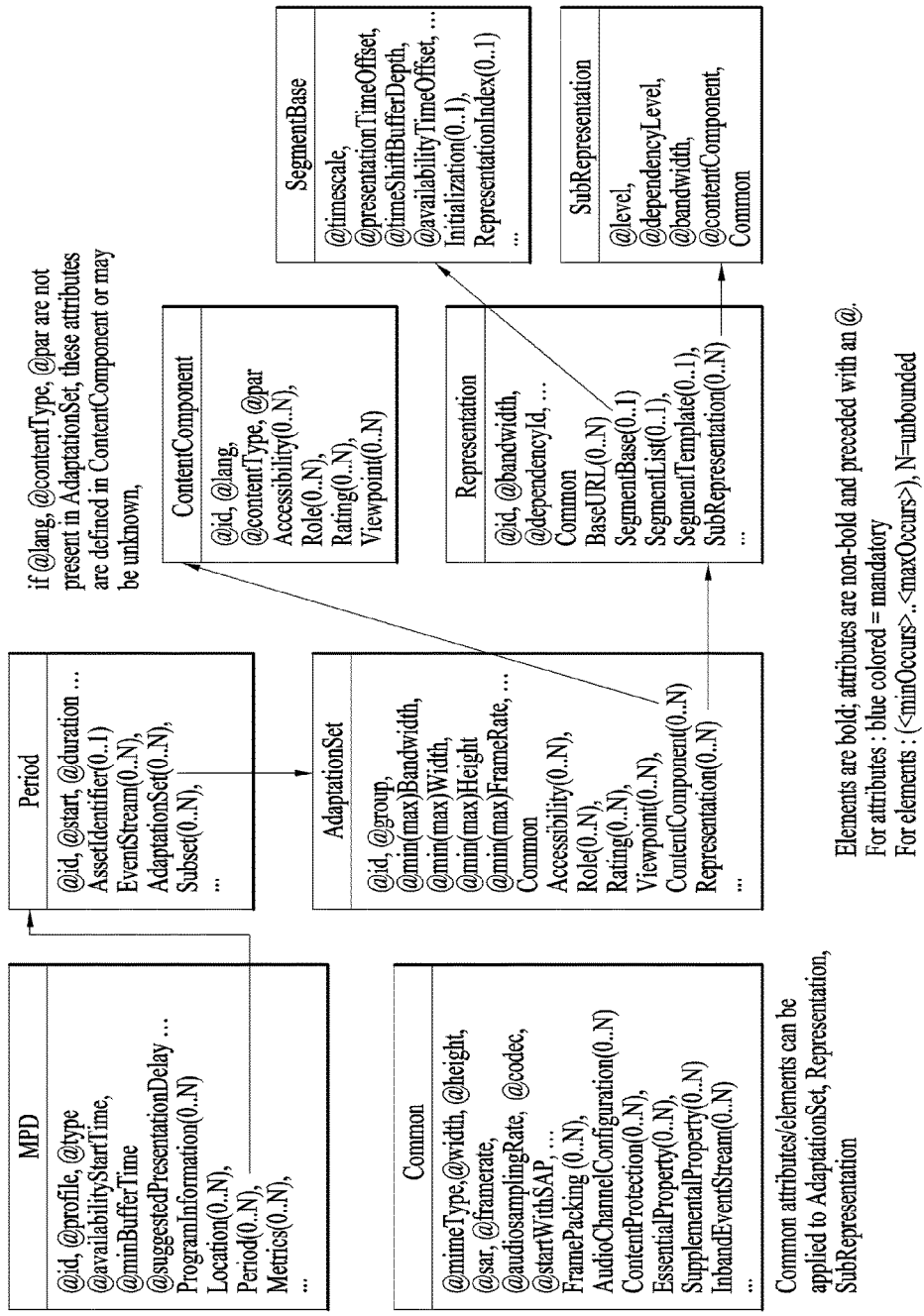
FIG. 9 specifically illustrates a DASH data model according to an embodiment of the present invention.

FIG. 9 specifically illustrates a DASH data model according to an embodiment of the present invention.

A DASH data model according to an embodiment of the present invention may be expressed by a relation among the MPD element, Period element, AdaptationSet element, Representation element, SubRepresentation element, ContentComponent element, and/or SegmentBase element.

The MPD element includes @id, @profile, @type @availabilityStartTime, @minBufferTime @suggestedPresentationDelay, ProgramInformation(0 . . . N), Location (0 . . . N), Period(0 . . . N) and/or Metrics(0 . . . N). Here, @profile and/or @minBufferTime may be mandatory fields.

The Period element includes @id, @start, @duration, AssetIdentifier(0 . . . 1), EventStream(0 . . . N), AdaptationSet(0 . . . N) and/or Subset(0 . . . N).

The AdaptationSet element includes @id, @group, @min(max)Bandwidth, @min(max)Width, @min(max)Height, @min(max)FrameRate, Common, Accessibility(0 . . . N), Role (0 . . . N), Rating(0 . . . N), Viewpoint(0 . . . N), ContentComponent(0 . . . N) and/or Representation(0 . . . N).

The Representation element includes @id, @bandwidth, @dependencyId, Common, BaseURL(0 . . . N), SegmentBase(0 . . . 1), SegmentList(0 . . . 1), SegmentTemplate(0 . . . 1) and/or SubRepresentation(0 . . . N). Here, @id and/or @bandwidth may be mandatory fields.

The SubRepresentation element includes @level, @dependencyLevel, @bandwidth, @contentComponent and/or Common.

The ContentComponent element includes @id, @lang, @contentType, @par, Accessibility(0 . . . N), Role(0 . . . N), Rating(0 . . . N) and/or Viewpoint(0 . . . N). If AdaptationSet does not include @lang, @contentType, and/or @par, these fields may or may not be defined in ContentComponent.

The SegmentBase element includes @timescale, @presentationTimeOffset, @timeShiftBufferDepth, @availabilityTime Offset, Initialization (0 . . . 1) and/or RepresentationIndex(0 . . . 1).

The DASH data model according to an embodiment of the present invention includes Common attributes and elements.

The Commmon attributes and elements include @mimeType, @width, @height, @sar, @framerate, @audiosamplingRate, @codec, @startWithS AP, FramePacking (0 . . . N), AudioChannelConfiguration (0 . . . N), ContentProtection (0 . . . N), EssentialProperty (0 . . . N), SupplementalProperty (0 . . . N) and/or InbandEventStream (0 . . . N).

The above-described Common attributes and elements may be included in AdaptationSet, Representation, and/or SubRepresentation.

In this figure and the above description, fields preceded by @denote attributes, and fields without @denote elements. In addition, (0 . . . N) following element names indicates that there are at least 0 and at most N corresponding elements. Here, N indicates no upper limit is set.

According to one embodiment of the present invention, the description of the elements or attributes in the MPD conforms to definitions in the DASH standard.

MPD is a description of a media presentation for providing a streaming service.

Period represents an interval of the media presentation. The consecutive sequence of all periods constitutes a media presentation.

Segment represents the unit of data associated with the URL and byte range described by the MPD.

The Adaptation Set represents a set of interchangeable encoded versions of one or more media content components.

The Representation represents a set of one or more media streams and their encapsulation in a transport format.

The Sub-Representation represents part of the Representation described by the MPD.

FIG. 10 shows configuration of a ContentWCGConfiguration element and a ContainerWCGConfiguration element according to an embodiment of the present invention.

A transmitting apparatus according to an embodiment of the present invention may signal WCG configuration, HFR configuration, HFRTemporalLayering configuration, FRTemporalID configuration, HFRTL configuration and/or pull down recovery configuration information in the MPEH DASH system such that a DASH client provides WCG, HFR, HFR with Temporal Layering and/or pull down recovery services. Here, the HFRTL configuration may include the FRTID configuration as a child element.

According to an embodiment of the present invention, signaling of the above-mentioned information in the MPEG DASH may be applied to a DASH-based system. For example, it may be applied to ATSC 3.0, DVB IPTV, a DASG based streaming system, and the like.

According to one embodiment of the present invention, the Content gamut represents a specific complete subset of colors when the camera captures video (the original source). This content gamut may affect rendering. Container gamut also represents a specific complete subset of colors. However, the Container gamut is intended for encoding and reproduction, and may affect decoding.

According to another embodiment, instead of including the Content WCG Configuration description in the MPD, the transmitting apparatus may include, in the MPD, only a flag indicating whether the Content WCG information is included in the video data, thereby signaling the same content.

The Content WCG Configuration description according to an embodiment of the present invention is included and described in the ContentWCGConfiguration element. The Content WCG Configuration description according to an exemplary embodiment of the present invention includes color gamut information on an original source.

The Container WCG Configuration description according to an embodiment of the present invention is included and described in the ContainerWCGConfiguration element. The Container WCG Configuration description according to an embodiment describes color gamut information for encoding and/or reproduction.

The ContentWCGConfiguration element and/or ContainerWCGConfiguration element according to an embodiment of the present invention include @schemeIdUri, @value, and/or @id. Here, @schemeIdUri may be a mandatory field, @value and @id may be optional fields.

@schemeIdUri indicates a URI that identifies the schema. The semantics of this element may be specified to a schema described by this attribute. This attribute may be a URN or a URL. If a URL is used as this attribute, this attribute may contain date information in the form of mmyyyy.

@value indicates a value for this element. The space and semantics for this value may be defined by the schema identified by @schemeIdUri described above.

@id represents an identifier for this element. Elements having the same value for this attribute may be identical to each other. In other words, if there are elements with the same attribute value, only one of these elements needs to be processed, and the other elements need not be processed.

FIG. 11 shows configuration of an HFRConfiguration element and a PullDownRecoveryConfiguration element according to an embodiment of the present invention.

The HFR configuration description according to an embodiment of the present invention is included and described in the HFRConfiguration element. The HFR Configuration description includes compatibility information on an existing frame rate.

The PullDownRecovery Configuration description according to an embodiment is included and described in the PullDownRecoveryConfiguration element. The PullDownRecovery Configuration description indicates an original frame rate and pull-down type.

The HPRConfiguration element and/or the PullDownRecoveryConfiguration element according to an embodiment includes @schemeIdUri, @value, and/or @id. Here @schemeIdUri may be a mandatory field, @value and @id may be optional fields.

@schemeIdUri indicates a URI that identifies the schema. The semantics of this element may be specified to a schema described by this attribute. This attribute may be a URN or a URL. If a URL is used as this attribute, this attribute may contain date information in the form of mmyyyy.

@value indicates a value for this element. The space and semantics for this value may be defined by the schema identified by @schemeIdUri described above.

@id represents an identifier for this element. Elements having the same value for this attribute may be identical to each other. In other words, if there are elements with the same attribute value, only one of these elements needs to be processed, and the other elements need not be processed.

According to one embodiment of the present invention, when the original source is in a film mode (for example, 24 p), the original source may be converted into another frame rate (e.g., 60 i) for encoding. This operation is called pull-down, in which case dirty frames may be generated. These dirty frames may be generated by the following procedure.

All original film frames consist of two fields. One of the two fields is a field for odd-numbered lines of an image, and the other field is a field for even-numbered lines of the image. Thus, there are eight fields for every four film frames A, B, C, D. These eight fields must be reconstructed into ten fields. In this case, two of the eight fields may be repeated. That is, frame A is composed of three fields At, Ab, Ab, frame B is composed of two fields Bt and Bb, frame C is composed of three fields Ct, Ct and Cb, and frame D is composed of two fields Dt and Db. The above operation is called At-Ab-Ab-Bt-Bb-Ct-Ct-Cb-Dt-Db, 3-2-3-2 pull down or 3-2 pull down. Here, "At" denotes the top field of frame A, and "Bb" denotes the bottom field of frame B. In Ab-Ab-Bt-Bb-Ct-Ct-Cb-Dt-Db, the third field Ab, fourth field Bt, fifth field Bb, and sixth field Ct are dirty frames.

According to an embodiment of the present invention, when the receiver is aware of the original frame rate using the PullDownRecovery Configuration description, the receiver may recover the original frame rate stream from the transmitted encoded frame rate stream. The recovered frame rate stream does not include a dirty frame.

FIG. 12 shows configuration of an HFRTemporalLayeringConfiguration element according to an embodiment of the present invention.

The HFRTemporalLayering Configuration description according to an embodiment is included and described in the HFRTemporalLayeringConfiguration element. The HFR Configuration description indicates that the stream includes temporal layering to support temporal scalability.

A transmitter according to an embodiment of the present invention may signal the number of temporal id's and/or frame rate that may be output, using the HFRTemporalLayering Configuration description. For example, if there are three temporal id's, the transmitter may signal frame rates for the respective streams with each temporal id in order (or in reverse order). According to another embodiment of the present invention, the transmitter may signal a frame rate for a stream having the temporal id and child temporal id of the temporal id.

According to an embodiment, the HFRTemporalLayeringConfiguration element includes @schemeIdUri, @value, and/or @id. Here, @schemeIdUri may be a mandatory field, while @value and @id may be optional fields.

@schemeIdUri indicates a URI that identifies the schema. The semantics of this element may be specified to a schema described by this attribute. This attribute may be a URN or a URL. If a URL is used as this attribute, this attribute may contain date information in the form of mmyyyy.

@value indicates a value for this element. The space and semantics for this value may be defined by the schema identified by @schemeIdUri described above.

@id represents an identifier for this element. Elements having the same value of this attribute may be identical to each other. In other words, if there are elements with the same attribute value, only one of these elements needs to be processed, and the other elements need not be processed.

FIG. 13 illustrates an XML schema of a ContentWCGConfiguration element and a ContainerWCGConfiguration element according to an embodiment of the present invention.

The ContentWCGConfiguration element may be expressed as L13010.

The ContainerWCGConfiguration element may be expressed as L13020.

FIG. 14 illustrates an XML schema of an HFRConfiguration element and a PullDownRecoveryConfiguration element according to an embodiment of the present invention.

The HFRConfiguration element may be expressed as L14010.

The PullDownRecoveryConfiguration element may be expressed as L14020.

FIG. 15 illustrates an XML schema of an HFRTemporalLayeringConfiguration element according to an exemplary embodiment of the present invention.

The HFRTemporalLayeringConfiguration element may be expressed as shown in this figure.

FIG. 16 shows description of @schemeIdUri and @value of the ContentWCGConfiguration element according to an embodiment of the present invention.

According to an embodiment, @schemeIdUri of the ContentWCGConfiguration element may have urn:mpeg:dash:wcg:content:201× (L16010).

According to an embodiment, @value of the ContentWCGConfiguration element may include contentColorGamutType, contentColorPrimaryRx, contentColorPrimaryRy, contentColorPrimaryGx, contentColorPrimaryGy, contentColorPrimaryBx, contentColorPrimaryBy, contentWhitePx, contentWhitePy, contentWCGTransition and/or contentSCGCompatibility (L16020).

The contentColorGamutType represents the chromaticity coordinates of the source primaries. This attribute indicates the type of a color gamut applied to the content. Among the values of this attribute, 0 indicates reserved, 1 indicates BT.709-5, 2 indicates unspecified, 3 indicates reserved for future use by ITU-T, 4 indicates the BT.470-6 system, 9 indicates BT.2020, 10 indicates ST428-1, and 11 to 255 indicate reserved for future use by ITU-T. According to an embodiment, if the value of this attribute is 2, the contentColorPrimaryRx, contentColorPrimaryRy, contentColorPrimaryGx, contentColorPrimaryGy, contentColorPrimaryBx, contentColorPrimaryBy, contentWhtiePx and/or contentWhtiePy attributes shall have a value. On the other hand, if the value of this attribute is not 2, the coordinates of the primaries may not be signaled since the color gamut specified in the standard is used. This attribute may be represented by a nonnegative integer in decimal notation. This attribute may be a mandatory field.

The contentColorPrimaryRx, contentColorPrimaryRy, contentColorPrimaryGx, contentColorPrimaryGy, contentColorPrimaryBx and contentColorPrimaryBy have values in a range from 0 to 1, and represent x-coordinate values and y-coordinate values of red, green and blue colors of the source in the chromaticity plane. These attributes may be optional fields. Here, source may have the same meaning as content.

The contentWhitePx and contentWhitePy have values in a range from 0 to 1, and represent the x-coordinate values and the y-coordinate values of the white color of the source in the chromaticity plane. These attributes may be optional fields.

The contentWCGTransition indicates the end of a WCG video media component or transition from the wide color gamut (WCG) to the standard color gamut (SCG) within the video media component. This attribute may be an optional field with a default value. If this attribute does not exist, the value of this attribute may be "false", which is the default value. If this attribute exists and is set to "true", this attribute will have the aforementioned meaning.

The contentSCGCompatibility indicates whether the video media component is compatible with the SCG. This attribute may be an optional field with a default value. If this attribute does not exist, the value of this attribute may be "false", which is the default value. If this attribute exists and is set to "true", this attribute will have the aforementioned meaning.

The ContentWCGConfiguration element according to an embodiment may be expressed as L16030 in this figure.

FIG. 17 shows description of @schemeIdUri and @value of the ContainerWCGConfiguration element according to an embodiment of the present invention.

According to an embodiment, @schemeIdUri of the ContainerWCGConfiguration element may have urn:mpeg:dash:wcg:container:201× (L17010).

According to an embodiment, @value of the ContentWCGConfiguration element may include containerColorGamutType, containerColorPrimaryRx, containerColorPrimaryRy, containerColorPrimaryGx, containerColorPrimaryGy, containerColorPrimaryBx, containerColorPrimaryBy, containerWhitePx, containerWhitePy, containerWCGTransition and/or containerSCGCompatibility (L17020).

Teh containerColorGamutType represents the chromaticity coordinates of the encoding or reproduction primaries. This attribute indicates the type of the color gamut of the container. Among the values of this attribute, 0 indicates reserved, 1 indicates BT.709-5, 2 indicates unspecified, 3 indicates reserved for future use by ITU-T, 4 indicates the BT.470-6 system, 9 indicates BT.2020, 10 indicates ST428-1, and 11 to 255 indicate reserved for future use by ITU-T. According to an embodiment, if the value of this attribute is 2, the containerColorPrimaryRx, containerColorPrimaryRy, containerColorPrimaryGx, containerColorPrimaryGy, containerColorPrimaryBx, containerColorPrimaryBy, containerWhtiePx and/or containerWhtiePy attributes shall have a value. On the other hand, if the value of this attribute is not 2, the coordinates of the primaries may not be signaled since the color gamut specified in the standard is used. This attribute may be represented by a nonnegative integer in decimal notation. This attribute may be a mandatory field. The value of this attribute may be the same as the value of colour_primaries in the VUI. According to an embodiment, when the colour_primaries syntax element of the VUI parameter does not exist, the value of colour_primaries or containerColorGamutType may be 2 (unspecified). In this case, the containerColorPrimaryRx, containerColorPrimaryRy, containerColorPrimaryGx, containerColorPrimaryGy, containerColorPrimaryBx, containerColorPrimaryBy, containerWhtiePx and/or containerWhtiePy attributes shall have values.

The containerColorPrimaryRx, containerColorPrimaryRy, containerColorPrimaryGx, containerColorPrimaryGy, containerColorPrimaryBx and containerColorPrimaryBy have values in a range from 0 to 1, and represent x-coordinate values and y-coordinate values of red, green and blue colors of the container in the chromaticity plane. These attributes may be optional fields.

The containerWhitePx and containerWhitePy have values in a range from 0 to 1, and represent the x-coordinate value and the y-coordinate value of the white color of the container in the chromaticity plane. These attributes may be optional fields.

The containerWCGTransition represents the end of a WCG video media component of the container or transition from the wide color gamut (WCG) to the standard color gamut (SCG) within the video media component of the container. This attribute may be an optional field with a default value. If this attribute does not exist, the value of this attribute may be "false", which is the default value. If this attribute exists and is set to the "true" value, this attribute will have the aforementioned meaning.

The containerSCGCompatibility indicates whether the video media component of the container is compatible with the SCG. This attribute may be an optional field with a default value. If this attribute does not exist, the value of this attribute may be "false", which is the default value. If this attribute exists and is set to "true", this attribute will have the aforementioned meaning.

The ContainerWCGConfiguration element according to an embodiment may be expressed as L17030 in this figure.

FIG. 18 shows description of @schemeIdUri and @value of the HFRConfiguration element according to an embodiment of the present invention.

According to an embodiment, @schemeIdUri of the HFRConfiguration element may have urn:mpeg:dash:wcg:container:201× (L18010).

According to an embodiment, @value of the HFRConfiguration element may include SFRCompatibility and/or HFRTransition (L18020).

SFRCompatibility indicates whether a video media component is compatible with the standard frame rate (SFR) or an existing frame rate. This attribute may be an optional field with a default value. If this attribute does not exist, the value of this attribute may be "false", which is the default value. If this attribute exists and is set to the "true" value, this attribute will have the aforementioned meaning.

HFRTransition indicates the end of a high frame rate (HFR) video media component or transition from the HFR to the normal frame rate (existing frame rate) within the video media component. This attribute may be an optional field with a default value. If this attribute does not exist, the value of this attribute may be "false", which is the default value. If this attribute exists and is set to the "true" value, this attribute will have the aforementioned meaning.

The HFRConfiguration element according to an embodiment may be expressed as L18020 in this figure.

FIG. 19 shows description of @schemeIdUri and @value of the HFRTemporalLayeringConfiguration element according to an embodiment of the present invention.

According to one embodiment, @schemeIdUri of the HFRTemporalLayeringConfiguration element may have urn mpeg:dash:hfr-temporal-layering:201× (L19010).

According to an embodiment, @value of the HFRTemporalLayeringConfiguration element may include scanType, numOfTemporalLayers, and/or frameRateOfTemporalID.

scanType indicates the scan type. Of the values of this attribute, 0 indicates progressive, and 1 indicates interlaced.

numOfTemporalLayer indicates the number of temporal layers. The value 0 of this attribute is non-specified, 1 means that no temporal scalability is used, 2 means that there are 2 temporal layers (temporal ID=0, temporal ID=1) (Temporal ID=0, temporal ID=1, temporal ID=2).

frameRateOfTemporalID indicates supported frame rate according to the temporal ID value. This attribute may be repeated as many times as the number of @NumOfTemporalLayers. This attribute is an attribute that indicates the frame rate for reproduction per temporal ID, and may be signaled repeatedly as many times as the number of temporal layers. Among the values of this attribute, 0 may indicate 23.976 Hz, 1 may indicate 24 Hz, 2 may indicate 29.97 Hz, 3 may indicate 30 Hz, 4 may indicate 59.94 Hz, 5 may indicate 60 Hz, 6 may indicate 25 Hz, 7 may indicate 50 Hz, 8 may indicate 100 Hz, 9 may indicate 120/1.001 Hz, and 10 may indicate 120 Hz. This attribute may signal a frame rate for reproduction in order (or in reverse order) from temporal ID 0 to the maximum temporal ID (L19020).

According to an embodiment, the HFRTemporalLayeringConfiguration element may be expressed as L9030 and L9040 in this figure. For example, for a 120 Hz stream encoded without a temporal layer, the value of @NumOfTemporalLayers may be 1 and the value of @frameRateOfTemporalID may be 10. That is, if there is no temporal scalability (@NumOfTemporalLayers=1), frameRateOfTemporalID may signal the frame rate of the stream. As another example, for a 120 Hz stream encoded with three temporal layers (temporal ID=0, temporal ID=1 and temporal ID=2), the value of @NumOfTemporalLayers may be 3 and @frameRateOfTemporalID may have 3 values. @frameRateOfTemporalID may have a value of 3 as a frame rate for temporal ID=0, a value of 5 as a frame rate for temporal ID=1, and a value of 10 as a frame rate for temporal ID=2.

According to an embodiment, @value may be expressed as a list of values separated by a comma.

FIG. 20 shows configuration of an FRTemporalIDConfiguration element according to an embodiment of the present invention.

According to an embodiment, the FRTemporalID Configuration description is included and described in the FRTemporalIDConfiguration element. The FRTemporalID Configuration description describes frame rates according to the temporal ID values. That is, the frame rate information includes supportable frame rates according to the temporal ID values. According to an embodiment, the FRTemporalIDConfiguration element may not signal the number of temporal layers and may signal only the frame rate that is supportable for each temporal ID.

According to an embodiment, the FRTemporalIDConfiguration element includes @schemeIdUri, @value and/or @id. Here, @schemeIdUri may be a mandatory field, @value and @id may be optional fields (L20010).

@schemeIdUri indicates a URI that identifies the schema. The semantics of this element may be specified to a schema described by this attribute. This attribute may be a URN or a URL. If a URL is used as this attribute, this attribute may contain date information in the form of mmyyyy.

@value indicates a value for this element. The space and semantics for this value may be defined by the schema identified by @schemeIdUri described above.

@id represents an identifier for this element. Elements having the same value for this attribute may be identical to each other. In other words, if there are elements with the same attribute value, only one of these elements needs to be processed, and the other elements need not be processed.

According to an embodiment, the FRTemporalIDConfiguration element may be expressed as L20020.

FIG. 21 shows description of @schemeIdUri and @value of the FRTemporalIDConfiguration element according to an embodiment of the present invention.

According to one embodiment, @schemeIdUri of the FRTemporalIDConfiguration element may have urn:mpeg:dash:frame-rate-temporal-id:201× (L21010).

According to an embodiment, @value of the FRTemporalIDConfiguration element may include scanType, maxTemporalID, and/or frameRateOfTemporalID.

scanType indicates the scan type. Of the values of this attribute, 0 indicates the progressive type, and 1 indicates the interlaced type.

maxTemporalID indicates the maximum temporal ID for outputting a frame rate corresponding to the value of @frameRateOfTemporalID. For example, when there are three temporal IDs (temporal ID 0:30 Hz, temporal ID 1:60 Hz, temporal ID 2:120 Hz), the value of @maxTemporalID may be 1 if the value of @frameRateOfTemporalID is set to 6 (60 Hz is output), and may be 2 if the value of @frameRateOfTemporalID is 10 (120 Hz is output). This field may be an optional field.

frameRateOfTemporalID indicates a supported frame rate according to the temporal ID value. This attribute may be repeated as many times as the number of @NumOfTemporalLayers. This attribute is an attribute that indicates the frame rate for reproduction per temporal ID, and may be signaled repeatedly as many times as the number of temporal layers. Among the values of this attribute, 0 may indicate 23.976 Hz, 1 may indicate 24 Hz, 2 may indicate 29.97 Hz, 3 may indicate 30 Hz, 4 may indicate 59.94 Hz, 5 may indicate 60 Hz, 6 may indicate 25 Hz, 7 may indicate 50 Hz, 8 may indicate 100 Hz, 9 may indicate 120/1.001 Hz, and 10 may indicate 120 Hz. This attribute may signal a frame rate for reproduction in order (or in reverse order) from temporal ID 0 to the maximum temporal ID (L19020).

According to an embodiment, the FRTemporalIDConfiguration element may be expressed as L21030 and L21040 in this figure. For example, for a 120 Hz stream encoded without a temporal layer, the value of @maxTemporalID may be 0, and the value of @frameRateOfTemporalID may be 10. As another example, for a 120 Hz stream encoded with three temporal layers (temporal ID=0, temporal ID=1 and temporal ID=2), the value of @NumOfTemporalLayers may be 3 and the FRTemporalIDConfiguration element may be signaled 3 times. In this case, for a layer with Temporal ID=0, the value of @frameRateOfTemporalIDsms may be 3 and the value of @maxTemporalID may be 0. For a layer with Temporal ID=1, the value of @frameRateOfTemporalIDsms may be 5 and the value of @maxTemporalID may be 1. For a layer with Temporal ID=2, the value of @frameRateOfTemporalIDsms may be 10 and the value of @maxTemporalID may be 2.

FIG. 22 shows configuration of an HFRT configuration element according to an embodiment of the present invention.

According to an embodiment, the HFRTLConfiguration element may include an FRTIDConfiguration element as a child element. The HFRTLConfiguration element includes attributes and/or elements that may be applied to the AdaptationSet element, Representation element and/or SubRepresentation element.

According to an embodiment, the HFRTLConfiguration element may include @scanType, @numOfTemporalLayers, and/or FRTIDConfiguration. The FRTIDConfiguration may include @maxTemporalID and/or @frameRateOfTemporalID (L22010).

scanType indicates the scan type. Of the values of this attribute, 0 indicates the progressive type, and 1 indicates the interlaced type.

numOfTemporalLayer indicates the number of temporal layers. The value 0 of this attribute is non-specified, 1 means that no temporal scalability is used, 2 means that there are 2 temporal layers (temporal ID=0, temporal ID=1) (Temporal ID=0, temporal ID=1, temporal ID=2).

FRTIDConfiguration describes a frame rate according to the temporal ID value. This element may be repeatedly included according to the value of @numOfTemporalLayers.

maxTemporalID indicates the maximum temporal ID for outputting a frame rate corresponding to the value of @frameRateOfTemporalID. For example, when there are three temporal IDs (temporal ID 0:30 Hz, temporal ID 1:60 Hz, temporal ID 2:120 Hz), the value of @maxTemporalID may be 1 if the value of @frameRateOfTemporalID is set to 6 (60 Hz is output), and may be 2 if the value of @frameRateOfTemporalID is 10 (120 Hz is output). This field may be an optional field.

frameRateOfTemporalID indicates a supported frame rate according to the temporal ID value. This attribute may be repeated as many times as the number of @NumOfTemporalLayers. This attribute is an attribute that indicates the frame rate for reproduction per temporal ID, and may be signaled repeatedly as many times as the number of temporal layers. Among the values of this attribute, 0 may indicate 23.976 Hz, 1 may indicate 24 Hz, 2 may indicate 29.97 Hz, 3 may indicate 30 Hz, 4 may indicate 59.94 Hz, 5 may indicate 60 Hz, 6 may indicate 25 Hz, 7 may indicate 50 Hz, 8 may indicate 100 Hz, 9 may indicate 120/1.001 Hz, and 10 may indicate 120 Hz. This attribute may signal a frame rate for reproduction in order (or in reverse order) from temporal ID 0 to the maximum temporal ID.

According to an embodiment, the HFRTLConfiguration element may be expressed as L222020 in this figure. Here, since the value of @NumOfTemporalLayers is 3, the FRTIDConfiguration element is repeated three times.

FIG. 23 shows description of @schemeIdUri and @value of the PullDownRecoveryConfiguration element according to an embodiment of the present invention.

According to an embodiment, @schemeIdUri of the PullDownRecoveryConfiguration element may have urn:mpeg:dash:pulldown: 201× (L23010).

According to an embodiment, @value of the PullDownRecoveryConfiguration element may include PullDownType, PullDownTransition, OriginalFrameRate and/or OriginalScanType (L23020).

PullDownType indicates a pull-down type applied to the encoded video stream. Of the values of this attribute, 0 may indicate reserved, 1 may indicate 2:2 pull-down, 2 may indicate 2:3 pull-down, 3 may indicate 3:2 pull-down, 4 may indicate 4:4 pull-down, and 6 may indicate 6:4 pull-down. This attribute may be represented by a nonnegative integer in decimal notation. This attribute may be a mandatory field.

PullDownTransition indicates the end of a pulled-down video media component or transition from a pulled down frame rate to an original frame rate within the video media component. This attribute may be an optional field with a default value. If this attribute does not exist, the value of this attribute may be "false", which is the default value. If this attribute exists and is set to "true", this attribute will have the aforementioned meaning.

The OriginalFrameRate indicates an original frame rate (captured frame rate) for return from the encoded frame rate to the original frame rate. Among the values of this attribute, 0 indicates reserved, 1 indicates 120 Hz, 2 indicates 120/1.001 Hz, 3 indicates 100 Hz, 4 indicates 60 Hz, 5 indicates 60/1.001 Hz, 6 indicates 50 Hz, 7 indicates 30 Hz, 8 indicates 30/1.001 Hz, 9 indicates 25 Hz, 10 indicates 24 Hz, 11 indicates 24/1.001 Hz, and 12 to 14 indicate reserved. This attribute may be represented by a nonnegative integer in decimal notation. This attribute may be a mandatory field.

The OriginalScanType indicates the scan type of the original video. Among the values of this attribute, 0 indicates reserved, 1 indicates interlaced, 2 indicates progressive, and 3 indicates unspecified. This attribute may be represented by a nonnegative integer in decimal notation. This attribute may be a mandatory field.

The PullDownRecoveryConfiguration element according to an embodiment may be expressed as L23030 in this figure.

According to an embodiment, the term "pull-down" is used in filmmaking and television production for post-processing of converting a film into a video. Thus, the film frame rate should be converted by the broadcasting station to the broadcast frame rate. However, at the system level, the information on the frame rate includes only information on the broadcast frame rate. Thus, in order to more easily recover the original frame rate, the system level signaling may include information on the original frame rate. For example, information on the original frame rate (e.g., 24 p) and/or information on the pull down type (e.g., 3:2 pull down) may be included in the system level signaling. In addition, not only the system level signaling but also video level signaling may include information on the pulled-down video (the original frame rate and/or pull down type).

FIG. 24 shows configuration of Common attributes and elements according to an embodiment of the present invention.

According to an embodiment, one or more pieces of information in the ContentWCGConfiguration element, ContainerWCGConfiguration element, HI-RConfiguration element, pullDownRecoveryConfiguration element and/or pullDownRecoveryConfiguration element may be included in the Common attributes and elements. The Common attributes and elements may be included in the Adaptation-Set element, Representation element and/or SubRepresentation element.

According to an embodiment, the Common attributes and elements may include @profile, @contentWCGFlag, @contentWCGTransition, @contentSCGCompatibility, @containerWCGFlag, @containerWCGTransition, @containerSCGCompatibility, FramePacking, ContentWCGConfiguration and/or ContainerWCGConfiguration.

@profile represents a profile followed by an associated presentation in a list of media presentation profiles. The values of this attribute may be a subset of values for higher level hierarchical documents (Representation (Adaptation Set, MPD).

@contentWCGFlag indicates whether the corresponding video media component supports the WCG of content.

@containerWCGFlag indicates whether the corresponding video media component supports WCG of the container.

FramePacking indicates frame-packing arrangement information of a corresponding video media component type. The number of these elements may be 0 or N.

The other fields have been described above.

FIG. 25 shows configuration of Common attributes and elements according to another embodiment of the present invention.

According to another embodiment, the Common attributes and elements may include @profile, @contentWCGFlag, @contentWCGTransition, @contentSCGCompatibility, @contentColorGamutType, @contentColorPrimaryRx, @contentColorPrimaryRy, @contentColorPrimaryGx, @contentColorPrimaryGy, @contentColorPrimaryBx, @contentColorPrimaryB y, @contentWhitePx, @contentWhitePy, @containerWCGFlag, @containerWCGTransition, @containerSCGCompatibility, @containerColorGamutType, @containerColorPrimaryRx, @containerColorPrimaryRy, @containerColorPrimaryGx, @containerColorPrimaryGy, @containerColorPrimaryBx, @containerColorPrimaryBy, @containerWhitePx and/or @containerWhitePy. Description of the above-mentioned fields has been given above.

FIG. 26 shows configuration of Common attributes and elements according to another embodiment of the present invention According to an embodiment, one or more pieces of information in the HFRConfiguration element, HFRTemporalLayeringConfiguration element, FRTemporalIDConfiguration element, HFRTLConfiguration element and/or pullDownRecoveryConfiguration element may be included in the Common attributes and elements. The common attributes and elements may be included in the AdaptationSet element, the Representation element, and/or the SubRepresentation element.

According to an embodiment, the Common attributes and elements may include @profile, @HFRFlag, @SFRCompatibility, @HFRTransition, @TemporalLayeringFlag, @PullDownFlag, @PullDownTransition, FramePacking, HFRTemporalLayeringConfiguration, FRTemporalIDConfiguration, HFRTLConfiguration and/or PullDownRecoveryConfiguration.

@HFRFlag indicates whether the corresponding video media component supports the HFR.

@TemporalLayeringFlag indicates whether the structure of the corresponding video media component uses temporal layering. According to an embodiment of the present invention, @SFRCompatibility and @TemporaLayeringFlag may play a similar role. However, @TemporalLayeringFlag may signal more specific information. @TemporalLayeringFlag may indicate the number of temporal layers. If @TemporalLayeringFlag is present in this Common attribute and element, @SFRCompatiblity may not be included.

The other fields have been described above.

FIG. 27 shows configuration of Common attributes and elements according to another embodiment of the present invention.

According to an embodiment, the Common attributes and elements may include @profile, @HFRFlag, @SFRCompatibility, @HFRTransition, @TemporalLayeringFlag, @scanType, @numOfTemporalLayers, @maxTemporalID, @frameRateOfTemporalID, @PullDownFlag, @PullDownTransition, @PullDownType, @OriginalFrameRate and/or @OriginalScanType. The above-mentioned fields have been described above.

FIG. 28 shows configuration of an EssentialProperty descriptor and a SupplementaryProperty descriptor according to an embodiment of the present invention.

According to an embodiment, the Content WCG configuration description may be signaled using an EssentialProperty descriptor and/or SupplementaryProperty descriptor.

According to an embodiment, the EssentialProperty descriptor and/or the SupplementaryProperty descriptor may be included in an adaptation set if all the representations in the adaptation set provide the same content WCG capabilities. Otherwise, the EssentialProperty descriptor and/or the SupplementaryProperty descriptor may be included in each representation or sub-representation.

According to one embodiment, the semantics of the EssentialProperty descriptor and/or SupplementaryProperty descriptor may be the same as the semantics of the ContentWCGConfiguration element described above. That is, the EssentialProperty descriptor and/or SupplementaryProperty descriptor include the same fields included in the ContentWCGConfiguration element described above. The EssentialProperty descriptor and/or SupplementaryProperty descriptor may be expressed as L28010 in this figure.

According to another embodiment of the invention, the EssentialProperty descriptor and/or SupplementaryProperty descriptor may include @schemeIdUri, @value, @contentWCGTransition, @contentSCGCompatibility, @contentColorGamutType, @contentColorPrimaryRx, @contentColorPrimaryRy, @contentColorPrimaryGx, @contentColorPrimaryGy, @contentColorPrimaryBx, @contentColorPrimaryB y, @contentWhitePx and/or @contentWhitePy (L28020). @value indicates the version of this descriptor. In this embodiment, @schemeIdUri may have urn:mpeg:dash:wcg:content:201×. The other fields have been described above. According to another embodiment, the EssentialProperty descriptor and/or SupplementaryProperty descriptor may be expressed as L28030 in this figure.

According to an embodiment, a descriptor may have the same meaning as an element in this specification. Further, although only an embodiment of the EssentialProperty descriptor is shown in this figure, the description of the EssentialProperty descriptor in this figure may be similarly applied to the SupplementaryProperty descriptor.

FIG. 29 shows configuration of an EssentialProperty descriptor and a SupplementaryProperty descriptor according to another embodiment of the present invention.

According to an embodiment, Container WCG configuration description may be signaled using an EssentialProperty descriptor and/or a SupplementaryProperty descriptor.

According to an embodiment, the EssentialProperty descriptor and/or the SupplementaryProperty descriptor may be included in an adaptation set if all the representations in the adaptation set provide the same container WCG capabilities. Otherwise, the EssentialProperty descriptor and/or the SupplementaryProperty descriptor may be included in each representation or sub-representation.

According to one embodiment, the semantics of the EssentialProperty descriptor and/or SupplementaryProperty descriptor may be the same as the semantics of the ContentWCGConfiguration element described above. That is, the EssentialProperty descriptor and/or SupplementaryProperty descriptor includes the fields included in the ContentW-CGConfiguration element described above. The EssentialProperty descriptor and/or SupplementaryProperty descriptor may be expressed as L29010 in this figure.

According to another embodiment, the EssentialProperty descriptor and/or SupplementaryProperty descriptor may include @schemeIdUri, @value, @containerWCGTransition, @c ontainerSCGCompatibility, @containerColorGamutType, @containerColorPrimaryRx, @containerColorPrimaryRy, @containerColorPrimaryGx, @containerColorPrimaryGy, @containerColorPrimaryBx, @containerColorPrimaryB y, @containerWhitePx and/or @containerWhitePy (L29020). @value indicates the version of this descriptor. In this embodiment, @schemeIdUri may have urn:mpeg:dash:wcg:container:201x. The other fields have been described above. According to another embodiment, the EssentialProperty descriptor and/or SupplementaryProperty descriptor may be expressed as L29030 in this figure.

According to an embodiment, descriptor may have the same meaning as element in this specification. Further, although only an embodiment of the EssentialProperty descriptor is shown in this figure, the description of the EssentialProperty descriptor in this figure may be similarly applied to the SupplementaryProperty descriptor.

FIG. 30 shows configuration of an EssentialProperty descriptor and a SupplementaryProperty descriptor according to another embodiment of the present invention.

According to an embodiment, the HFR configuration description and/or the pull down recovery configuration description may be signaled using an EssentialProperty descriptor and/or a SupplementaryProperty descriptor.

According to an embodiment, the EssentialProperty descriptor and/or the SupplementaryProperty descriptor may be included in an adaptation set if all the representations in the adaptation set provide the same HFR and/or pull-down capabilities. Otherwise, the EssentialProperty descriptor and/or the SupplementaryProperty descriptor may be included in each representation or sub-representation.

According to an embodiment, the semantics of the EssentialProperty descriptor and/or the SupplementaryProperty descriptor may be the same as the semantics of the HFRConfiguration element and/or the PullDownRecoveryConfiguration element described above. That is, the EssentialProperty descriptor and/or the SupplementaryProperty descriptor include the same fields as included in the HFRConfiguration element and/or PullDownRecoveryConfiguration element described above. The EssentialProperty descriptor and/or the SupplementaryProperty descriptor may be expressed as L30010 and L30030 in this figure.

According to another embodiment, the EssentialProperty descriptor and/or SupplementaryProperty descriptor may include @schemeIdUri, @value, @SFRCompatibility and/or @HFRTransition (L30020). @value indicates the version of this descriptor. In this embodiment, @schemeIdUri may have urn:mpeg:dash:HFR:201x. The other fields have been described above. According to another embodiment, the EssentialProperty descriptor and/or the SupplementaryProperty descriptor may be expressed as the lower part of L30020 in this figure.

According to another embodiment, the EssentialProperty descriptor and/or SupplementaryProperty descriptor may include @schemeIdUri, @value, @PullDownType, @PullDownTransition, @OriginalFrameRate and/or @OriginalScanType (L30040). @value indicates the version of this descriptor. In this embodiment, @schemeIdUri may have urn:mpeg:dash:pulldown:201x. The other fields have been described above. According to another embodiment, the EssentialProperty descriptor and/or the SupplementaryProperty descriptor may be expressed as the lower part of L30040 in this figure.

According to an embodiment, a descriptor may have the same meaning as an element in this specification. Further, although only an embodiment of the EssentialProperty descriptor is shown in this figure, the description of the EssentialProperty descriptor in this figure may be similarly applied to the SupplementaryProperty descriptor.

FIG. 31 shows configuration of an EssentialProperty descriptor and a SupplementaryProperty descriptor according to another embodiment of the present invention.

According to an embodiment, the HFR Temporal Layering configuration description may be signaled using an EssentialProperty descriptor and/or a SupplementaryProperty descriptor.

According to an embodiment, the EssentialProperty descriptor and/or the SupplementaryProperty descriptor may be included in an adaptation set if all the representations in the adaptation set provide the same HFR Temporal Layering capabilities. Otherwise, the EssentialProperty descriptor and/or the SupplementaryProperty descriptor may be included in each representation or sub-representation.

According to an embodiment, the semantics of the EssentialProperty descriptor and/or the SupplementaryProperty descriptor may be the same as the semantics of the HFR-TemporalLayeringConfiguration element described above. That is, the EssentialProperty descriptor and/or the SupplementaryProperty descriptor include the same fields included in the HFRTemporalLayeringConfiguration element described above. The EssentialProperty descriptor and/or the SupplementaryProperty descriptor may be expressed as L31010 in this figure. In this figure, the value of @frameRateOfTemporalID corresponding to the value of @numOfTemporalLayers may be included.

According to another embodiment, the EssentialProperty descriptor and/or SupplementaryProperty descriptor may include @schemeIdUri, @value, @scanType, @numOfTemporalLayers and/or @frameRateOfTemporalID (L31020). @value indicates the version of this descriptor. In this embodiment, @schemeIdUri may have urn:mpeg:dash:hfr-temporal-layering:201x. The other fields have been described above. According to another embodiment, the EssentialProperty descriptor and/or the SupplementaryProperty descriptor may be expressed as the lower part of L31020 in this figure.

According to an embodiment, a descriptor may have the same meaning as an element in this specification. Further, although only an embodiment of the EssentialProperty descriptor is shown in this figure, the description of the EssentialProperty descriptor in this figure may be similarly applied to the SupplementaryProperty descriptor.

According to another embodiment, the FRTemporalID Configuration description may also be signaled using the EssentialProperty descriptor and/or the SupplementaryProperty descriptor. According to an embodiment, the Essential- Property descriptor and/or the SupplementaryProperty descriptor may be included in an adaptation set if all the representations in the adaptation set provide the same FRTemporalID capabilities. Otherwise, the EssentialProperty descriptor and/or SupplementaryProperty descriptor may be included in each representation or sub-representation. According to an embodiment, the semantics of the EssentialProperty descriptor and/or the SupplementaryProperty descriptor may be the same as the semantics of the FRTemporalIDConfiguration element described above. That is, the EssentialProperty descriptor and/or the SupplementaryProperty descriptor include the same fields as the FRTemporalIDConfiguration element.

FIG. 32 shows configuration of an Accessibility Descriptor according to an embodiment of the present invention.

According to an embodiment, the Accessibility Descriptor may be included in an adaptation set if all the representations in the adaptation set provide the same content WCG capabilities. Otherwise, the Accessibility Descriptor may be included in ContentComponent.

According to an embodiment, the Accessibility Descriptor has @schemeIdURI set to urn:mpeg:dash:wcg:content:201x, and includes @value, which is an optional field for describing the content WCG configuration.

According to an embodiment, if @value does not exist, the corresponding representation may support content WCG capabilities. However, if @value exists, @value may include the content WCG configuration.

According to an embodiment, @value may include contentclolrgamut, contentColorGamutType, contentColorPrimaryRx, contentColorPrimaryRy, contentColorPrimaryGx, contentColorPrimaryGy, contentColorPrimaryBx, contentColorPrimaryBy, contentWhitePx, contentWhitePy, contentWCGTransition and/or contentSCGCompatibility. These fields are described above.

According to an embodiment, @value may be in an Augmented Backus-Naur Form (ABNF) and be expressed as L32010 in this figure.

According to an embodiment, the Accessibility Descriptor may be expressed as L32020 in this figure.

FIG. 33 shows configuration of an Accessibility Descriptor according to another embodiment of the present invention.

According to an embodiment, the Accessibility Descriptor may be included in an adaptation set if all the representations in the adaptation set provide the same container WCG capabilities. Otherwise, the Accessibility Descriptor may be included in ContentComponent.

According to an embodiment, the Accessibility Descriptor has an @schemeIdURl set to urn:mpeg:dash:wcg:container:201x, and includes @value, which is an optional field for describing the container WCG configuration.

According to an embodiment, if @value does not exist, the corresponding representation may support content WCG capabilities. However, if @value exists, @value may include the container WCG configuration.

According to an embodiment, @value may include containerclolrgamut, containerColorGamutType, containerColorPrimaryRx, containerColorPrimaryRy, containerColorPrimaryGx, containerColorPrimaryGy, containerColorPrimaryBx, containerColorPrimaryBy, containerWhitePx, containerWhitePy, containerWCGTransition and/or containerSCGCompatibility. These fields are described above.

According to an embodiment, @value may be in an Augmented Backus-Naur Form (ABNF) and be expressed as L33010 in this figure.

According to an embodiment, the Accessibility Descriptor may be expressed as L33020 in this figure.

FIG. 34 shows configuration of an Accessibility Descriptor according to another embodiment of the present invention.

According to an embodiment, the Accessibility Descriptor may be included in an adaptation set if all the representations in the adaptation set provide the same HFR and/or pull down recovery capabilities. Otherwise, the Accessibility Descriptor may be included in the ContentComponent.

According to an embodiment, the Accessibility Descriptor has @schemeIdURI set to urnm:mpeg:dash:HFR:201x and/or urn:mpeg:dash:pulldown:201x, and includes @value, which is an optional field for describing the HFR configuration description and/or an pull down recovery configuration description.

According to an embodiment, if @value does not exist, the corresponding representation may support HFR and/or pull down recovery capabilities. However, if @value exists, @value may include an HFR configuration description and/or pull down recovery configuration description.

According to an embodiment, @value for the HFR configuration description may include SFRCompatibility and/or HFRTransition. The fields are described above. In this case, the @value may be in the Augmented Backus-Naur Form (ABNF) and expressed as L34010 in this figure.

According to an embodiment, the Accessibility Descriptor for the HFR configuration description may be expressed as L34020 in this figure.

According to another embodiment, @value for the pull down recovery configuration description may include PullDownType, PullDownTransition, OriginalFrameRate and/or OriginalScanType. These fields are described above. In this case, @value may be in the Augmented Backus-Naur Form (ABNF) and expressed as L34030 in this figure.

According to an embodiment, the Accessibility Descriptor for the pull down recovery configuration description may be expressed as L34040 in the figure.

FIG. 35 shows configuration of an Accessibility Descriptor according to another embodiment of the present invention.

According to an embodiment, the Accessibility Descriptor may be included in an adaptation set if all the representations in the adaptation set provide the same container HFR Temporal Layering capability. Otherwise, the Accessibility Descriptor may be included in ContentComponent.

According to an embodiment, the Accessibility Descriptor has an @schemeIdURI set to urn:mpeg:dash:hfr-temporal-layering:201x and includes @value, which is an optional field for describing the HFRTemporalLayering configuration.

According to an embodiment, if @value does not exist, the corresponding presentation may support HFR Temporal Layering capability. However, if @value exists, @value may include an HFRTemporalLayering configuration.

According to an embodiment, @value may include scanType, numOfTemporalLayers and/or frameRateOfTemporalID. These fields are described above.

According to an embodiment, @value may be in the Augmented Backus-Naur Form (ABNF) and expressed as L35010.

According to an embodiment, the Accessibility Descriptor may be expressed as L35020 in this figure.

According to another embodiment, the FRTemporalID Configuration description may also be signaled using the Accessibility Descriptor. In this case, the Accessibility Descriptor including the FRTemporalID configuration description may have the same configuration as the configuration in which the HFRTemporalLayering configuration is included in the Accessibility Descriptor.

FIG. 36 shows configuration of a ContentComponent element according to an embodiment of the present invention.

According to an embodiment, one or more pieces of information in the ContentWCGConfiguration element and/or ContainerWCGConfiguration element may be included in a ContentComponent element.

According to an embodiment, the ContentComponent element may include @id, @contentWCGFlag, @contentWCGTransition, @contentSCGCompatibility, @containerWCGFlag, @containerWCGTransition, @containerSCGCompatibility, Accessibility, ContentWCGConfiguration and/or ContainerWCGConfiguration.

The ContnetComponent element is an element that represents description of one content component.

@id represents the identifier of the corresponding media component. This attribute may have a unique value in the corresponding adaptation set.

The Accessibility represents information about the Accessibility schema.

The other fields have been described above.

FIG. 37 shows configuration of a SegmentBase element according to an embodiment of the present invention.

According to an embodiment, one or more pieces of information in the ContentWCGConfiguration element and/or ContainerWCGConfiguration element may be included in the SegmentBase element.

According to an embodiment, the SegmentBase element describes a SegmentBase element, which describes a type for segment base information indicating a base type for other elements.

According to an embodiment, the SegmentBase element may include @timescale, @contentWCGFlag, @contentWCGTransition, @contentSCGCompatibility, @containerWCGFlag, @containerWCGTransition, @containerSCGCompatibility, Accessibility, ContentWCGConfiguration and/or ContainerWCGConfiguration.

@timescale describes a time scale in seconds used to align different real-time duration values within the segment information.

Initialization indicates a URL including a range of possible bytes for the Initialization segment.

The other fields have been described above.

FIG. 38 shows configuration of a ContentComponent element according to another embodiment of the present invention.

According to an embodiment, one or more pieces of information in the HFRTemporalLayeringConfiguraiton element, FRTemporalIDConfiguration element, HFRTLConfiguration element and/or pullDownRecoveryConfiguration element may be included in the ContentComponent element.

According to an embodiment, the ContentComponent element may include ContentComponent element's @id, @HFRFlag, @SFRCompatibility, @HFRTransition, @TemporalLayeringFlag, @PullDownFlag, @PullDownTransition, Accessibility, HFRTemporalLayeringConfiguration, FRTemporalIDConfiguration, HFRTLConfiguration and/or PullDownRecoveryConfiguration. These fields are described above.

FIG. 39 shows configuration of a SegmentBase element according to another embodiment of the present invention.

According to an embodiment, one or more pieces of information in the HFRConfiguration element, HFRTemporalLayeringConfiguraiton element, FRTemporalIDConfiguration element, HFRTLConfiguration element and/or pullDownRecoveryConfiguration element may be included in the SegmentBase element.

According to an embodiment, the SegmentBase element describes a SegmentBase element, which describes a type for segment base information indicating a base type for other elements.

According to an embodiment, the SegmentBase element may include @timescale, @HFRFlag, @SFRCompatibility, @HFRTransition, @TemporalLayeringFlag, @PullDownFlag, @PullDownTransition, Accessibility, HFRTemporalLayeringConfiguration, FRTemporalIDConfiguration, HFRTLConfiguration and/or PullDownRecoveryConfiguration. These fields are described above.

Figure 40:
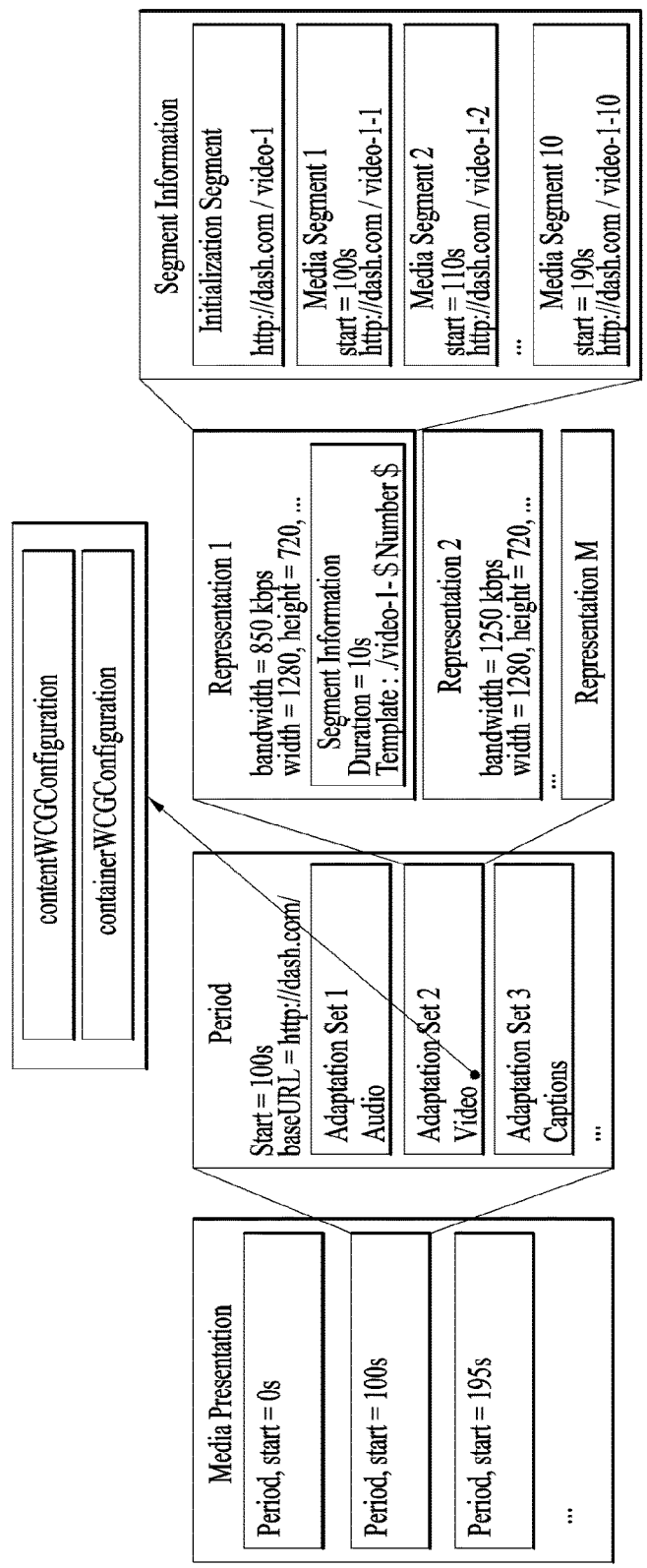
FIG. 40 shows configuration of an MPD according to an embodiment of the present invention.

FIG. 40 shows configuration of an MPD according to an embodiment of the present invention.

According to an embodiment, the AdpatationSet element may include content WCG configuration description and/or container WCG configuration description. Here, the content WCG configuration description and/or the container WCG configuration description may be included in the ContentWCGConfiguraiton descriptor, ContainerWCGConfiguraiton descriptor EssentialProperty descriptor and/or SupplementaryProperty descriptor and thus included in the AdaptationSet element. In this case, the content WCG configuration description and/or the container WCG configuration description may be applied to all the representations in the corresponding adaptation set. Here, the content WCG configuration description and/or the container WCG configuration description may have the same meaning as the content WCG configuration parameters and/or the container WCG configuration parameters.

Referring to this figure, the content WCG configuration description and/or a container WCG configuration description are included in the AdaptationSet (Video), wherein the content WCG configuration description and/or container WCG configuration description may be applied to all representations from Representation 1 to Representation M.

Figure 41:
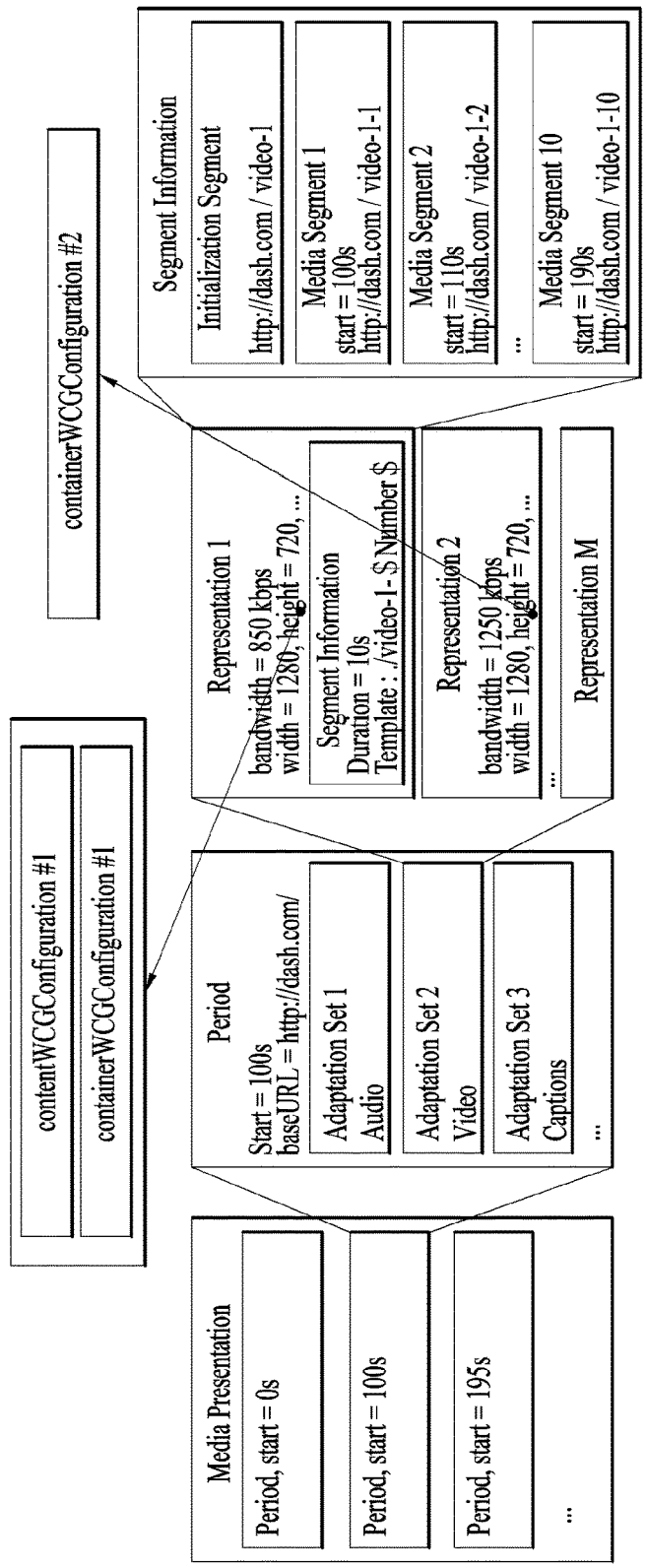
FIG. 41 shows configuration of an MPD according to another embodiment of the present invention.

FIG. 41 shows configuration of an MPD according to another embodiment of the present invention.

According to another embodiment, different content WCG configuration descriptions and/or container WCG configuration descriptions may be included in each Representation element and signaled. That is, unlike the above-described embodiments, the content WCG configuration descriptions and/or container WCG configuration descriptions may be included in the Representation elements rather than in the AdaptationSet element. In this case, the content WCG configuration descriptions and/or the container WCG configuration descriptions may be applied to the corresponding representations.

This figure shows an embodiment in which different content WCG configuration descriptions and/or container WCG configuration descriptions are signaled in different Representation elements. The different content WCG configuration descriptions and/or container WCG configuration descriptions may be applied according to selection of the representation. For example, if Representation 1 is selected, contentWCGConfiguration #1 and/or containerWCGConfiguration #1 may be applied to support WCG rendering. If Representation 2 is selected, only containerWCGConfiguration #2 may be applied to support WCG rendering. According to an embodiment, if there is no content WCG configuration description in the Representation element, this may indicate that the content WCG configuration description is not needed to support WCG rendering.

Figure 42:
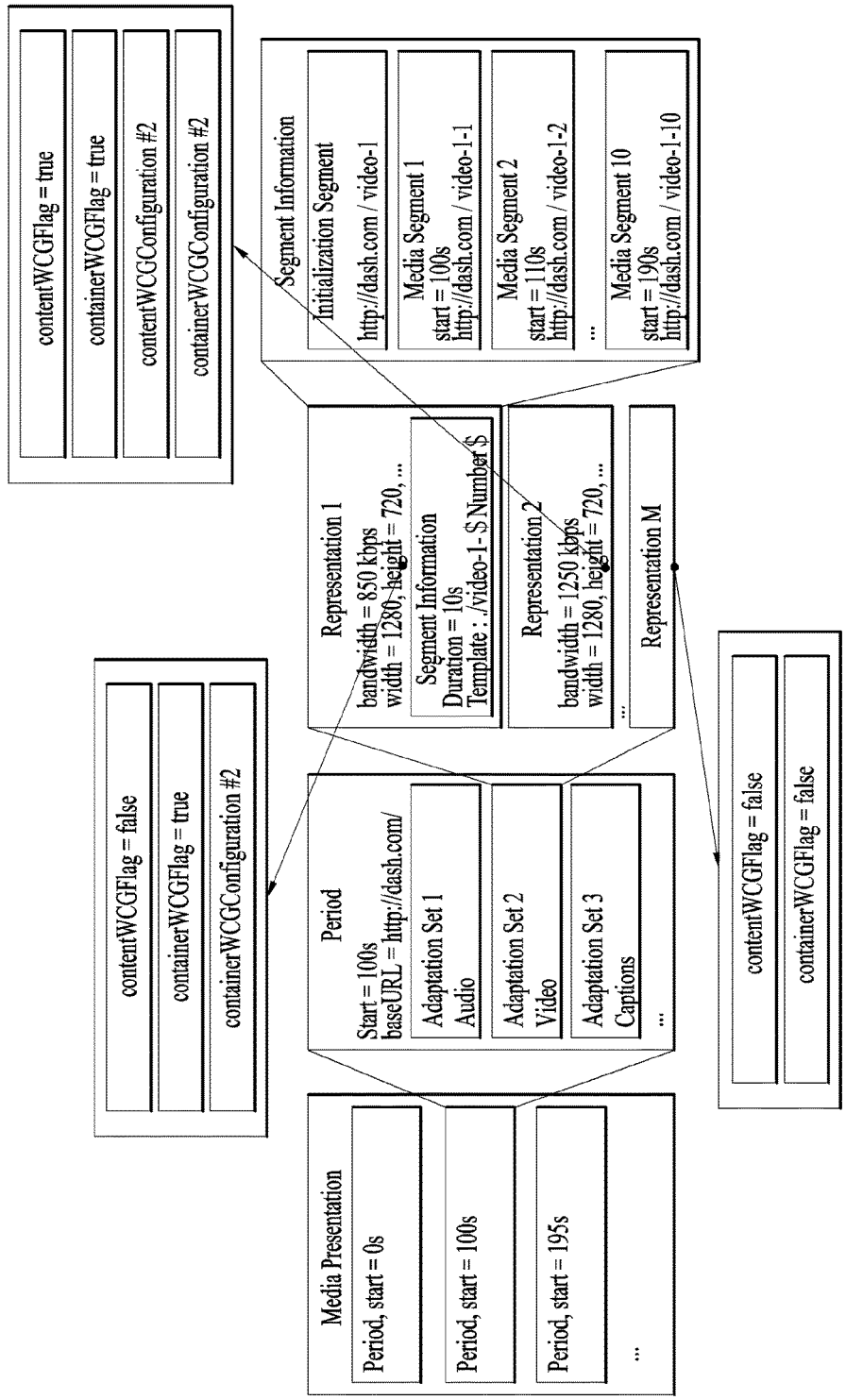
FIG. 42 shows configuration of an MPD according to another embodiment of the present invention.

FIG. 42 shows configuration of an MPD according to another embodiment of the present invention.

According to an embodiment, one adaptation set may include no or one or more representations that do not support WCG rendering and no or one or more representations that support WCG rendering. In this case, the contentWCGFlag and/or containerWCGFlag attributes included in the Representation elements may be used to determine whether the content WCG configuration description and/or container WCG configuration description are included in each Representation element. By setting the contentWCGFlag and/or containerWCGFlag attributes included in the Representation element to false, it may be signaled that the Representation cannot support WCG rendering.

Referring to this figure, the AdaptationSet (Video) includes Representation 1 containing only containerWCG-Configuration #2, Representation 2 containing contentW-CGConfiguration #2 and containerWCGConfiguration #2, and Representation M that does not contain contentWCG-Configuration #2 and containerWCGConfiguration #2.

Figure 43:
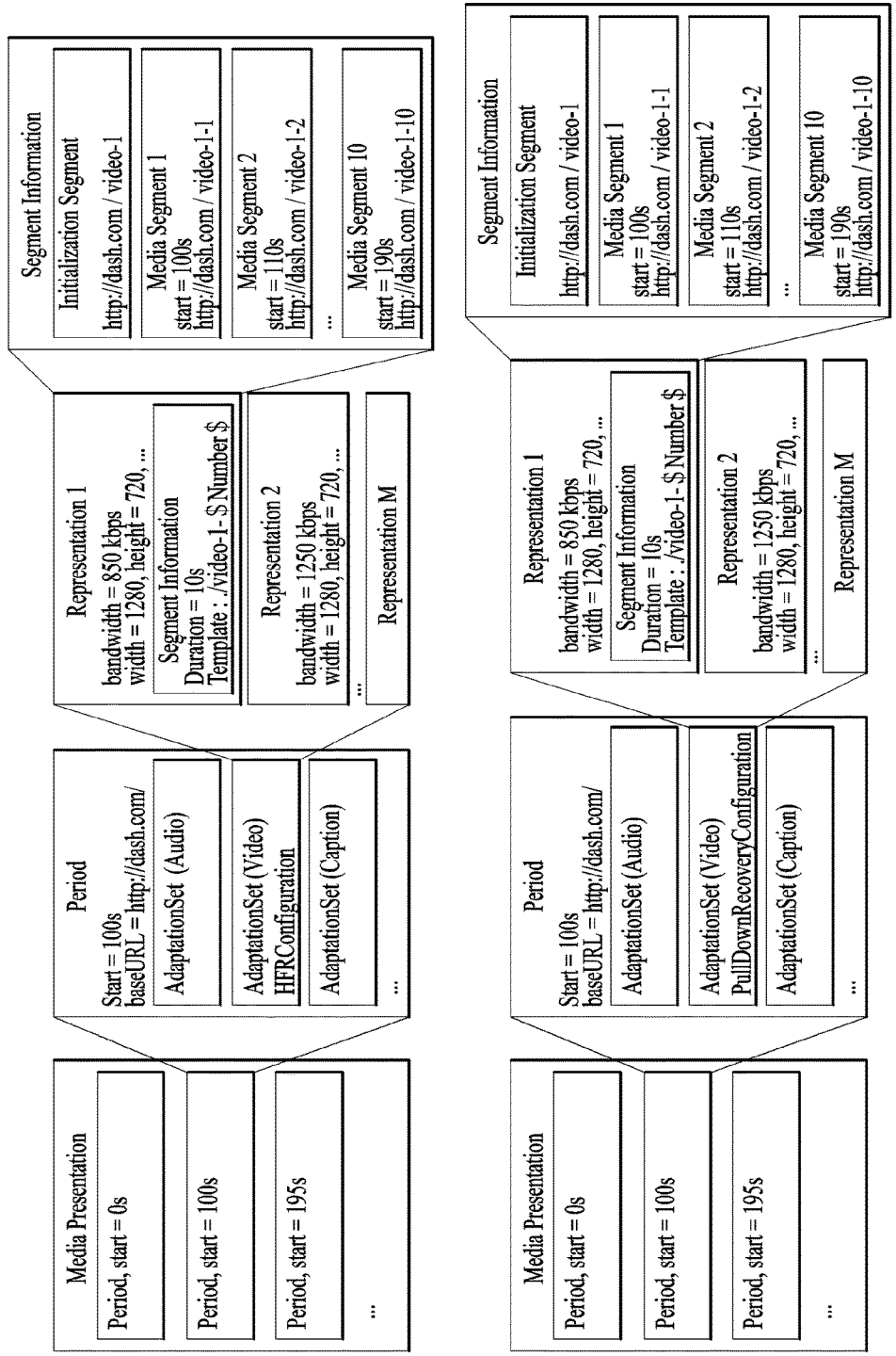
FIG. 43 shows configuration of an MPD according to another embodiment of the present invention.

FIG. 43 shows configuration of an MPD according to another embodiment of the present invention.

According to an embodiment, the AdpatationSet element may include HFR Configuration description and/or Pull-DownRecovery Configuration description. Here, the HFR Configuration description and/or the PullDownRecovery Configuration description may be included in HFRConfiguraiton descriptor, PullDownRecovery descriptor, EssentialProperty descriptor and/or SupplementaryProperty descriptor to be included in the AdaptationSet element. In this case, the HFR Configuration description and/or the PullDownRecovery Configuration description may be applied to all the presentations in the corresponding adaptation set. Here, the HFR Configuration description and/or the PullDownRecovery Configuration description may have the same meaning as the HFR Configuration parameters and/or the PullDown-Recovery Configuration parameters.

Referring to this figure, the HFR Configuration description and/or the PullDownRecovery Configuration description are included in the AdaptationSet (Video), and may be applied to all representations from Representation 1 to Representation M.

Figure 44:
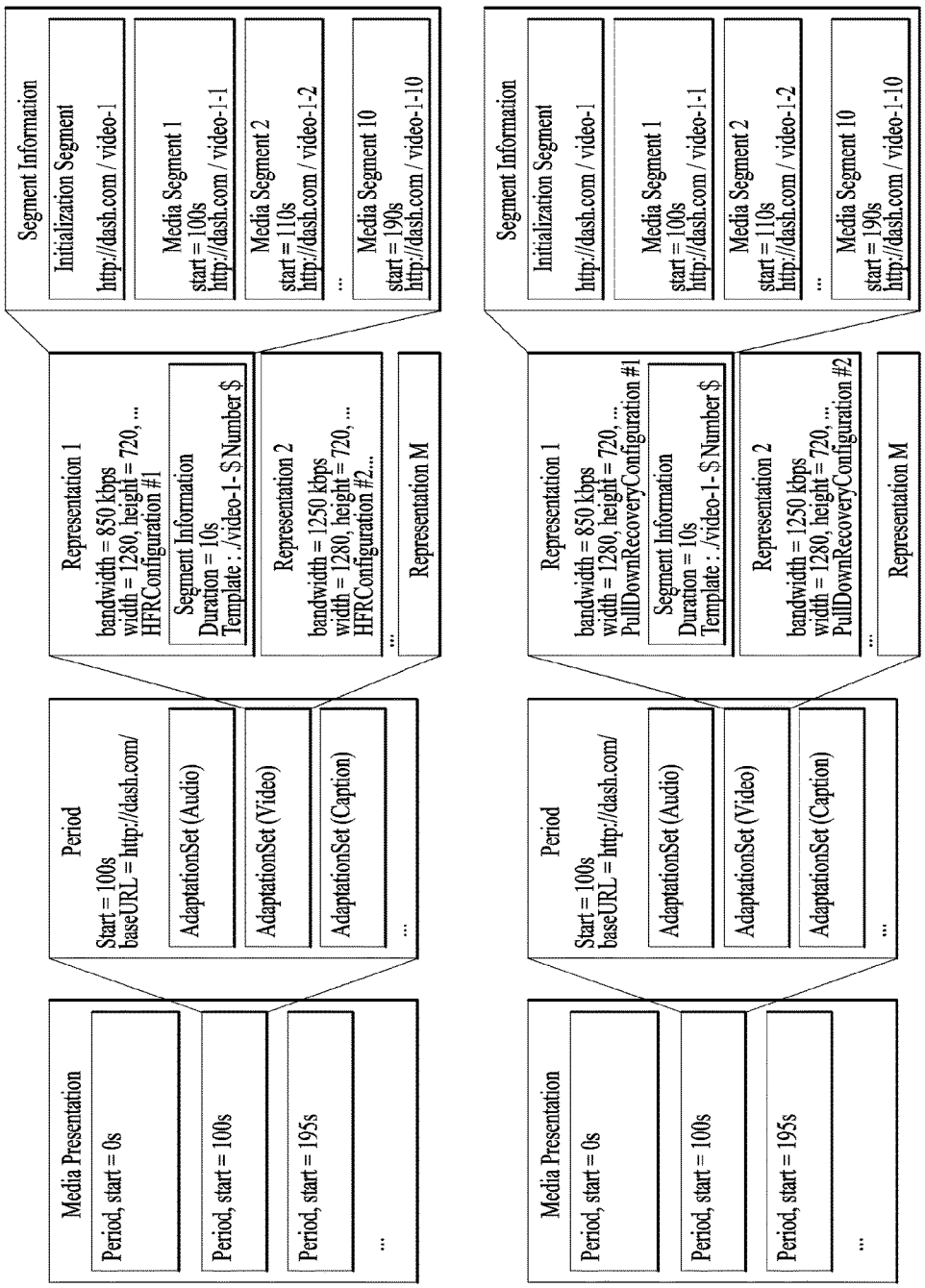
FIG. 44 shows configuration of an MPD according to another embodiment of the present invention.

FIG. 44 shows configuration of an MPD according to another embodiment of the present invention.

According to another embodiment, different HFR configuration descriptions and/or PullDownRecovery configuration descriptions may be included in each Representation element and signaled. That is, unlike the above-described embodiments, the HFR configuration descriptions and/or the PullDownRecovery configuration descriptions may be included in the Representation elements rather than in the AdaptationSet element. In this case, the HFR Configuration descriptions and/or the PullDownRecovery Configuration descriptions may be applied to the corresponding representations.

This figure shows an embodiment in which different HFR Configuration descriptions and/or PullDownRecovery configuration descriptions are signaled in different Representation elements. The different HFR Configuration descriptions and/or PullDownRecovery Configuration descriptions may be applied according to selection of a representation. For example, if Representation 1 is selected, HFRConfiguration #1 and/or PullDownRecoveryConfiguration #1 may be applied to support HFR rendering and/or pull down recovery rendering. If Representation 2 is selected, HFRConfiguration #2 and/or PullDownRecoveryConfiguration #2 may be applied to support HFR rendering and/or pull down recovery rendering.

Figure 45:
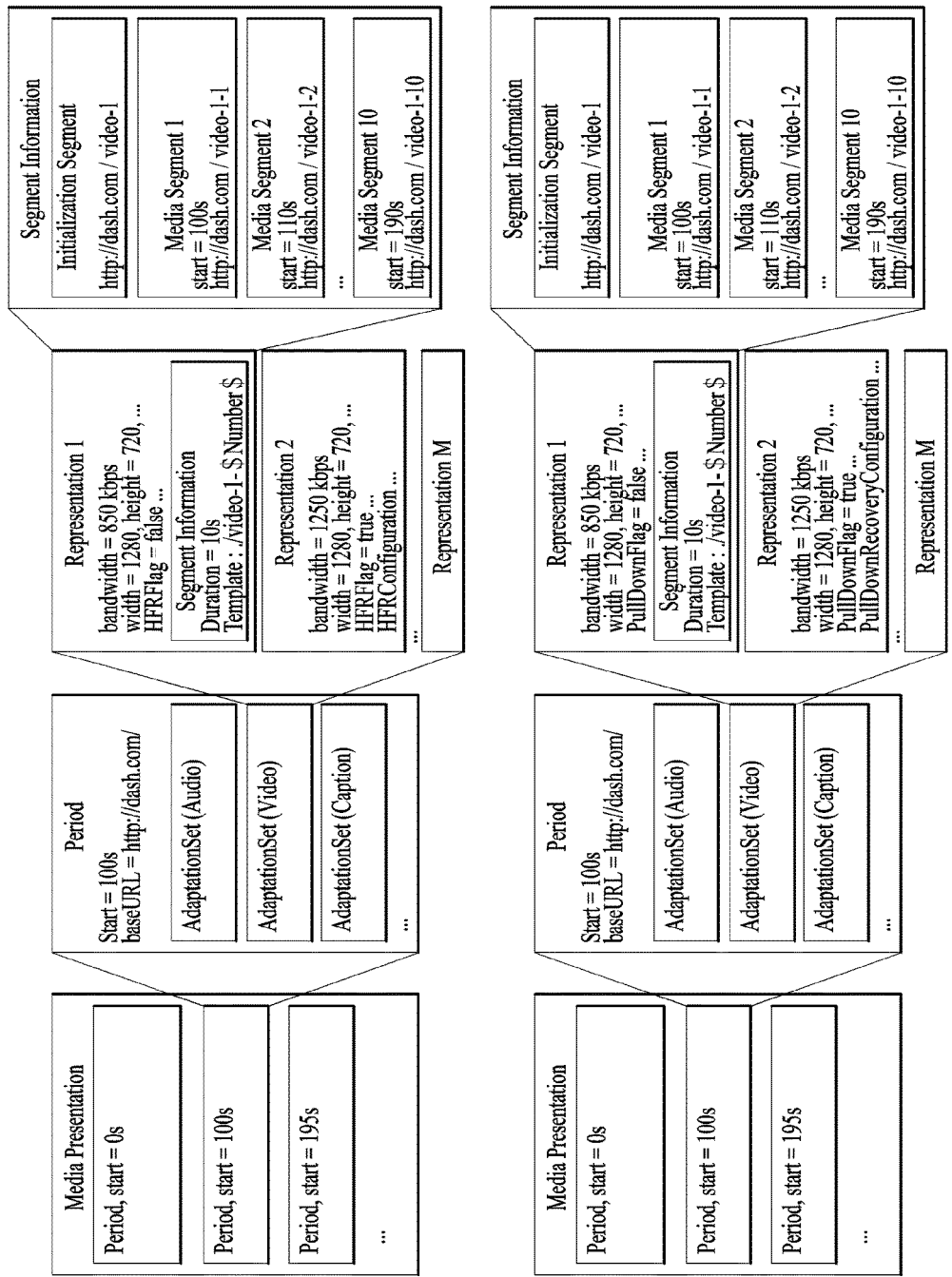
FIG. 45 shows configuration of an MPD according to another embodiment of the present invention.

FIG. 45 shows configuration of an MPD according to another embodiment of the present invention.

According to another embodiment, one adaptation set may include no or one or more representations that do not support HFR rendering and/or pull down recovery rendering, and no or one or more representations that support HFR rendering and/or pull down recovery rendering. In this case, using the HFRFlag and/or PullDownFlag attribute included in the representation elements, it may be determined whether or not the HFR Configuration description and/or PullDownRecovery Configuration description are included in each Representation element. By setting the HFRFlag and/or PullDownFlag attribute contained in the representation element to "false", it may be signaled that the representation cannot support HFR rendering and/or pull down recovery rendering.

Referring to the upper part of this figure, the Adaptation-Set (Video) includes Representation 1 that does not include an HFR Configuration description and Representation 2 that includes an HFR Configuration description.

Referring to the lower part of this figure, the Adaptation-Set (Video) includes Representation 1 that does not include a PullDownRecovery Configuration description and Representation 2 that includes a PullDownRecovery Configuration description.

Figure 46:
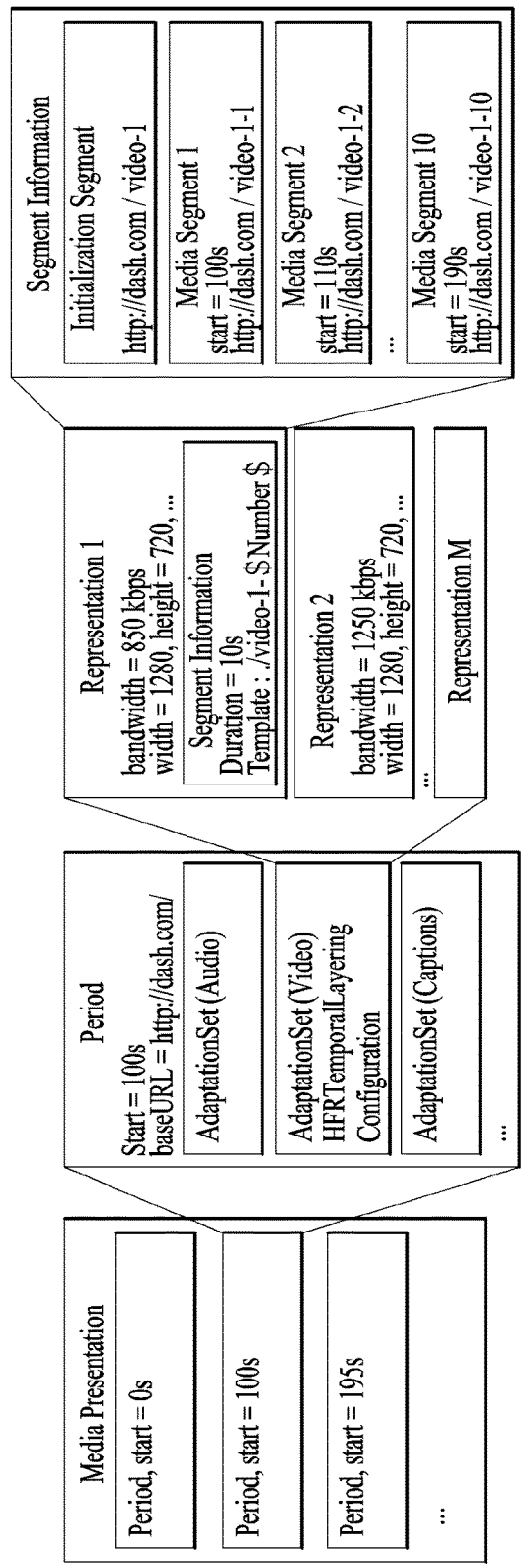
FIG. 46 shows configuration of an MPD according to another embodiment of the present invention.

FIG. 46 shows configuration of an MPD according to another embodiment of the present invention.

According to an embodiment, the AdpatationSet element may include an HFRTemporalLayering Configuration description, an FRTemporalID Configuration description, and/or an HFRTLConfiguration description. Here, the HFR-TemporalLayering Configuration description, the FRTemporalID Configuration description, and/or the HFRTLConfiguration description may be included in the EssentialProperty descriptor and/or the SupplementaryProperty descriptor to be included in the AdaptationSet element. In this case, the HFRTemporalLayering Configuration description, the FRTemporalID Configuration description, and/or the HFRTLConfiguration description may be applied to all the representations in the adaptation set.

Referring to this figure, the HFRTemporalLayering Configuration description, the FRTemporalID Configuration description, and/or the HFRTLConfiguration description are included in the AdaptationSet (Video), wherein the HFR-TemporalLayering Configuration description, and/or the FRTemporalID Configuration description may be applied to all representations from Representation 1 to Representation M.

Figure 47:
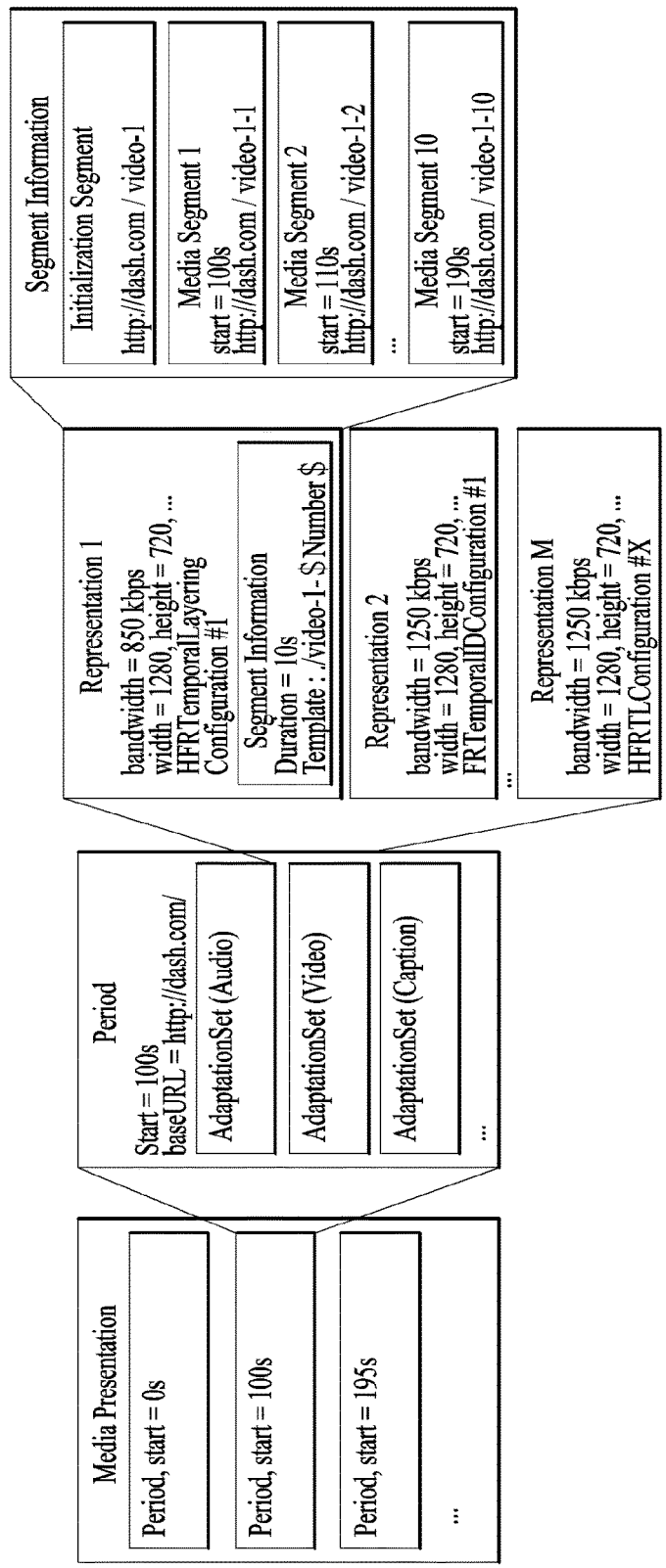
FIG. 47 shows configuration of an MPD according to another embodiment of the present invention.

FIG. 47 shows configuration of an MPD according to another embodiment of the present invention.

According to another embodiment, different HFRTemporalLayering Configuration descriptions, FRTemporalID Configuration descriptions and/or HFRTLConfiguration descriptions may be included in each Representation element and signaled. That is, unlike the above-described embodiment, the HFR HFRTemporalLayering Configuration description, the FRTemporalID Configuration description, and/or the HFRTLConfiguration description may be included in the Representation element but not in the Adaptation Set element. In this case, the HFRTemporalLayering Configuration description, the FRTemporalID Configuration description, and/or the HFRTLConfiguration description may be applied to the corresponding representation.

This figure shows an embodiment in which different HFRTemporalLayering Configuration descriptions, FRTemporalID Configuration descriptions and/or HFRTLConfiguration descriptions are signaled in different Representation elements. The different HFRTemporalLayering Configuration description, FRTemporalID Configuration description and/or HFRTLConfiguration description may be applied depending on selection of a representation. For example, Representation 1 includes HFRTemporalLayeringConfiguration #1, Representation 2 includes FRTemporalIDConfiguration #1, and Representation N includes HFRTLConfiguration #X.

Figure 48:
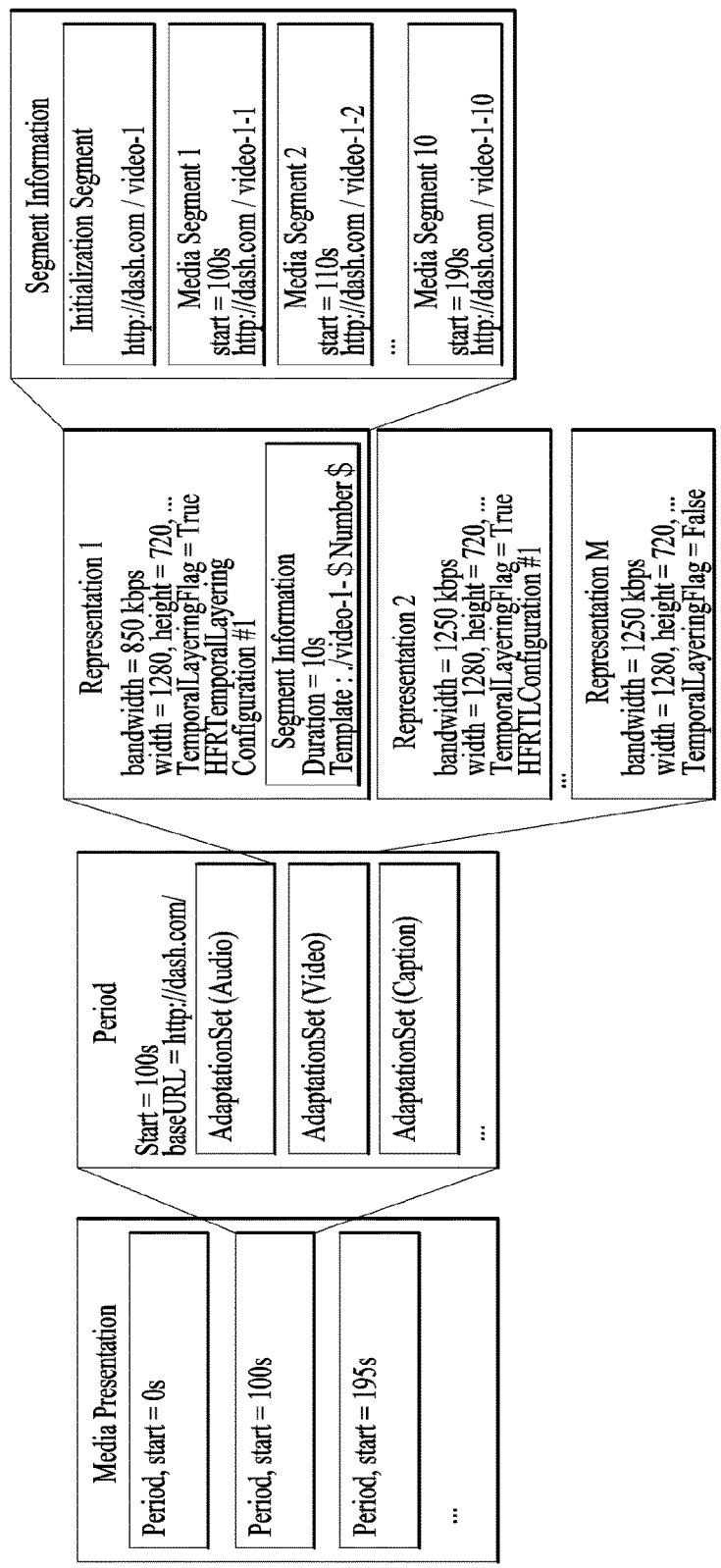
FIG. 48 shows configuration of an MPD according to another embodiment of the present invention.

FIG. 48 shows configuration of an MPD according to another embodiment of the present invention.

According to an embodiment, one adaptation set may include no or one or more representations. In this case, using the TemporalLayeringFlag attribute included in the representation element, it may be determined whether the HFRTemporalLayering Configuration description, the FRTemporalID Configuration description, and/or the HFRTLConfiguration description are included in each Representation element.

Referring to this figure, the AdaptationSet (Video) includes Representation 1, which includes HFRTemporalLayeringConfiguration#1, Representation 2, which includes HFRTLConfiguration #1, and Representation N, which does not include any of the HFRTemporalLayering Configuration description, FRTemporalID Configuration description and HFRTLConfiguration description. According to another embodiment, HFRTemporalLayeringConfiguration and/or FRTemporalIDConfiguration may be included in place of HFRTemporalLayeringConfiguration#1 in this figure.

Figure 49:
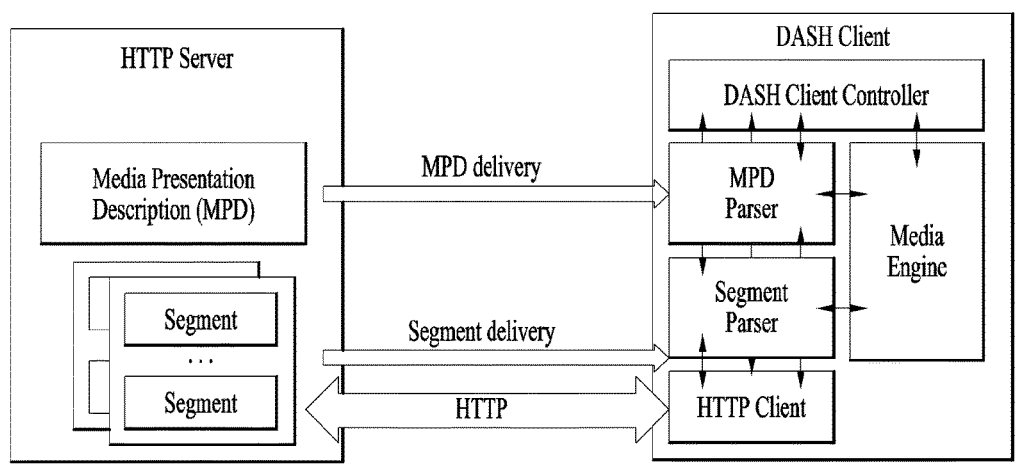
FIG. 49 is a diagram showing configuration of a system including an HTTP server and a DASH client according to an embodiment of the present invention.

FIG. 49 is a diagram showing configuration of a system including an HTTP server and a DASH client according to an embodiment of the present invention.

According to an embodiment, dynamic adaptive streaming over HTTP (DASH), which is a scheme for supporting HTTP-based adaptive streaming, supports dynamic streaming reflecting network conditions such that seamless reproduction of A/V content is supported. This figure shows the overall operation procedure of DASH-based adaptive streaming According to an embodiment, a DASH client includes a DASH client controller, an MPD parser, a segment parser, an HTTP client, and/or a media engine.

The MPD (Media Presentation Description) is a file containing detailed information for allowing the DASH client to dynamically acquire a segment, and may be expressed in XML format.

The DASH client controller dynamically generates a command for requesting an MPD and segment based on the network conditions, and makes the acquired information available to the media engine.

The MPD parser parses the acquired MPD in real time and allows the DASH client controller to generate a command for acquiring a required segment.

The segment parser parses the acquired segment in real time and may perform a specific operation of the media engine according to the content included in the segment.

The HTTP client makes a request for a required segment to the HTTP server and delivers the MPD/segment contained in the HTTP response acquired from the server to the MPD/segment parser.

The media engine displays the media information included in the segment on the screen.

According to an embodiment, the DASH client acquires an MPD first. Then, the DASH client selects an appropriate representation using the information described in the MPD. Then, using the access information about a segment included in the representation, the DASH client makes a request for the segment to the server. After acquiring the segment, the DASH client delivers the segment to the media engine to display the same on the screen. The DASH client reflects the reproduction time and network conditions in real time, adaptively requests and acquires a required segment, and delivers the same to the media engine to support seamless reproduction of content.

Figure 50:
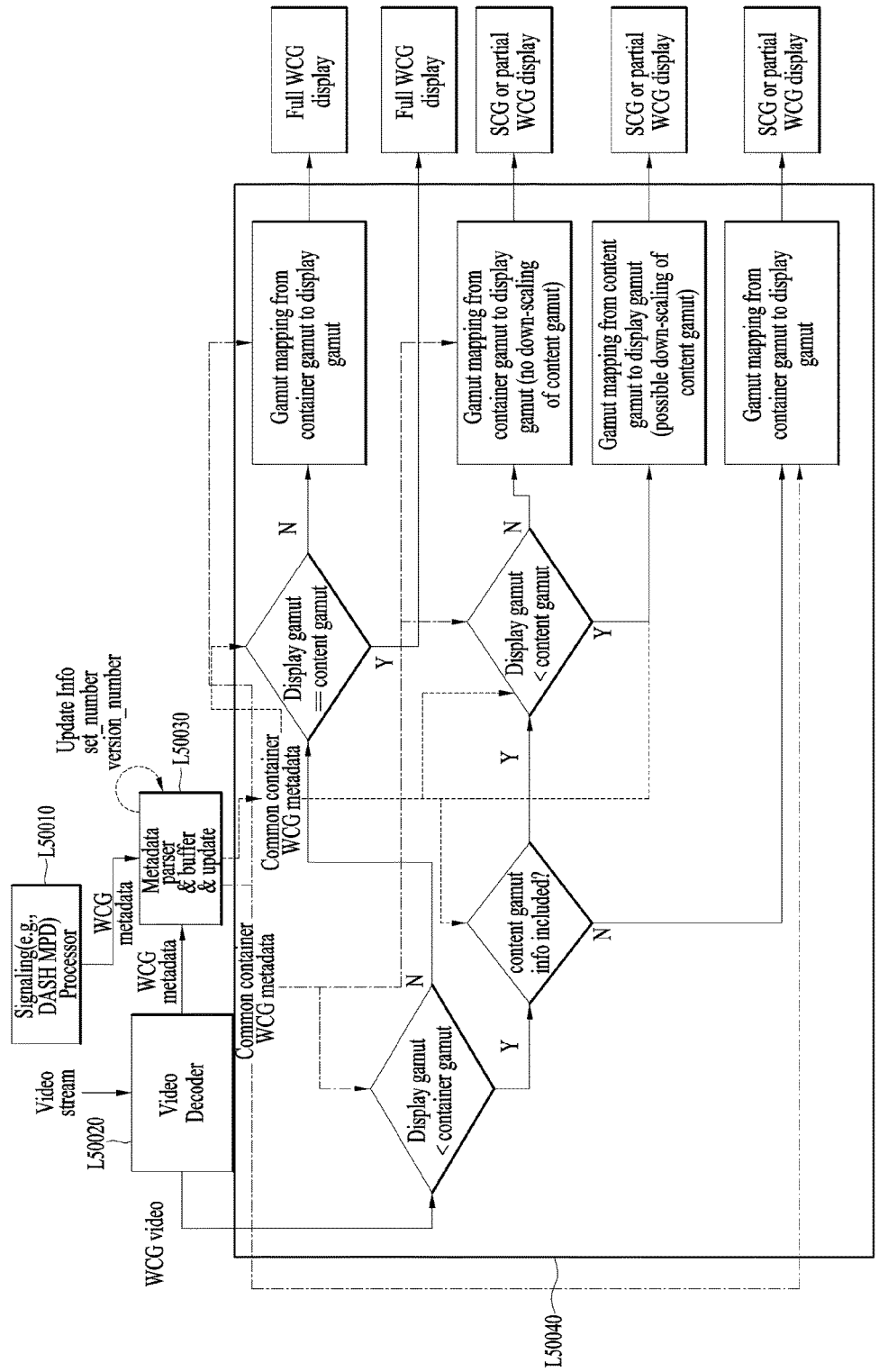
FIG. 50 is a diagram showing configuration of a receiver according to an embodiment of the present invention.

FIG. 50 is a diagram showing configuration of a receiver according to an embodiment of the present invention.

According to an embodiment, a receiver includes a signaling processor L50010, a video decoder L50020, a metadata processor (metadata parser & buffer & update) L50030, and/or a WCG processor L50040.

The signaling processor L50010 processes signaling such as an MPD and transfers the WCG metadata to the metadata processor (metadata parser & buffer & update) L50030.

The video decoder L50020 receives a video stream and transfers the WCG metadata contained in the video stream to the metadata processor (metadata parser & buffer & update) L50030. The video decoder delivers the WCG video to the WCG processor L50040.

The metadata processor (metadata parser & buffer & update) L50030 transfers the common content WCG metadata to the WCG processor L50040. The metadata processor updates information using set_number and/or version_number. The metadata processor transfers common container WCG metadata to the WCG processor L50040.

The WCG processor L50040 uses the common container WCG metadata to compare the gamut of the display with the gamut of the container. If the gamut of the display is wider than the gamut of the container, the WCG processor uses the common content WCG metadata to compare the gamut of the display with the gamut of the content. If the gamut of the display is not identical to the gamut of the content, the WCG processor performs gamut mapping from the gamut of the container to the gamut of the display using the common container WCG metadata. The mapped content is then displayed on the Full WCG display. If the gamut of the display is identical to the gamut of the content, the content is displayed on the Full WCG display without gamut mapping. When the gamut of the display is narrower than the gamut of the container, the WCG processor determines whether or not there is information about the content gamut using the common content WCG metadata. If there is no information about the content gamut, the WCG processor performs gamut mapping from the container gamut to the display gamut using the common container WCG metadata. The mapped content is then displayed on the SCG or partial WCG display. If there is information about the content gamut, the WCG processor compares the display gamut with the content gamut using the common container WCG metadata and the common content WCG metadata. If the display gamut is wider than the content gamut, the WCG processor performs gamut mapping from the container gamut to the display gamut using the common container WCG metadata. In this operation, downscaling of the content gamut is not performed. The mapped content is then displayed on the SCG or partial WCG display. If the display gamut is narrower than the content gamut, the WCG processor performs gamut mapping from the content gamut to the display gamut using the common content WCG metadata. In this operation, downscaling of the content gamut may be performed. The mapped content is then displayed on the SCG or partial WCG display.

According to an embodiment, common container WCG metadata may have the same meaning as container WCG configuration description, and common content WCG metadata may have the same meaning as container WCG configuration description.

Figure 51:
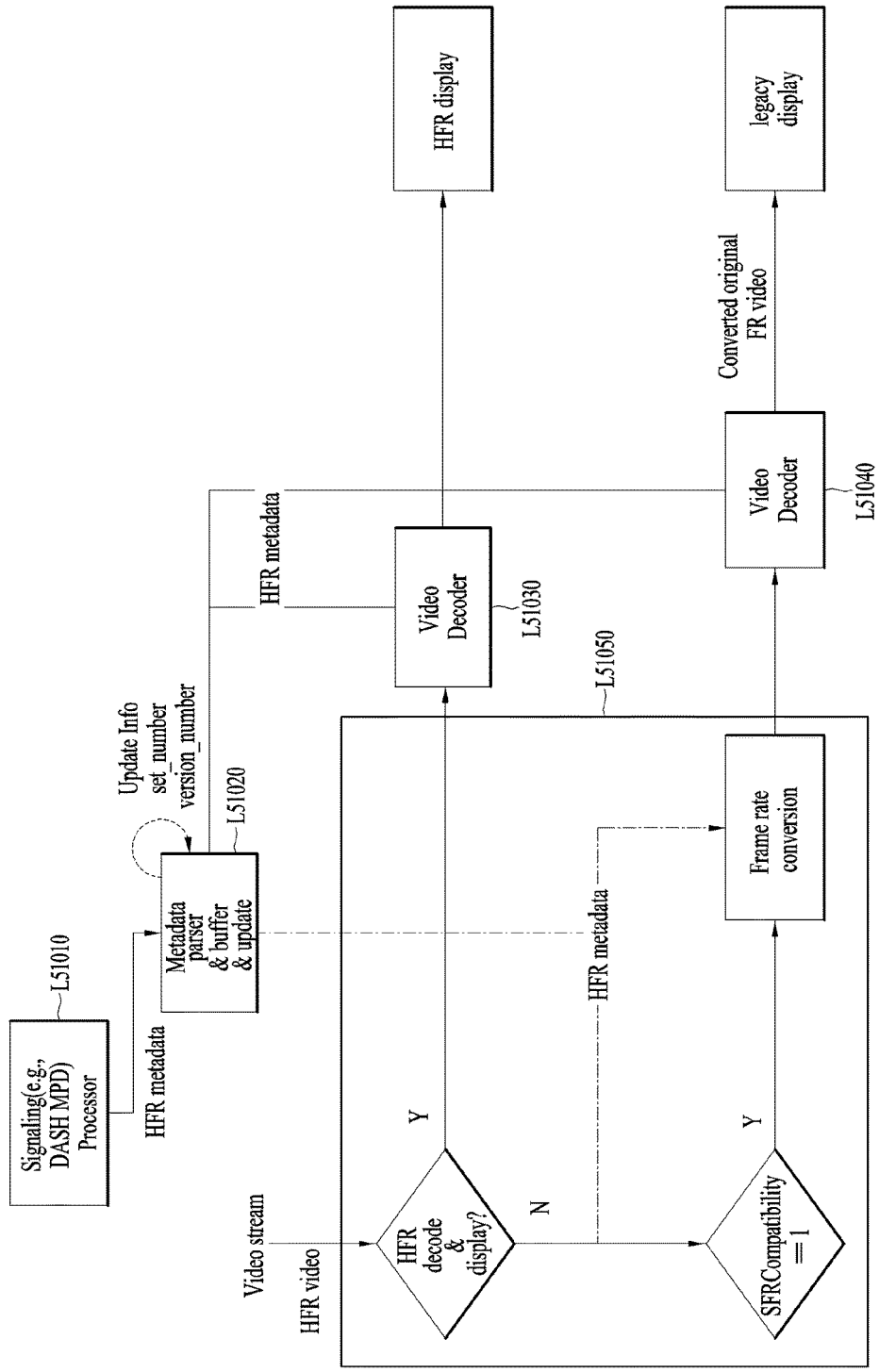
FIG. 51 is a diagram showing configuration of a receiver according to another embodiment of the present invention.

FIG. 51 is a diagram showing configuration of a receiver according to another embodiment of the present invention.

According to an embodiment, a receiver includes a signaling processor L51010, video decoders L51030, L51040, a metadata processor (metadata parser & buffer & update) L51020, and/or an HFR processor L51050.

The signaling processor L51010 processes signaling such as an MPD and transfers the HFR metadata to the metadata processor (metadata parser & buffer & update) L51020.

The metadata processor (metadata parser & buffer & update) L51020 transfers the HFR metadata to the HFR processor L51050. The metadata processor updates information using set_number and/or version_number.

The HFR processor L51050 receives an HFR video and determines whether the decoder and/or display of the receiver support HFR, using the HFR metadata. If the decoder and/or display of the receiver support HFR, the video decoder L51030 decodes the HFR video and the decoded HFR video is displayed on the HFR display. If the decoder and/or display of the receiver do not support HFR, the HFR processor uses HFR metadata (SFRCompatibility) to determine whether the HFR video is SFR compatible. If the HFR video is SFR compatible, the HFR processor performs frame rate conversion using the HFR metadata. The converted video is decoded by the video decoder L51040 and displayed on the existing display.

According to an embodiment, HFR metadata, as used in this specification, may have the same meaning as the HFR configuration description.

Figure 52:
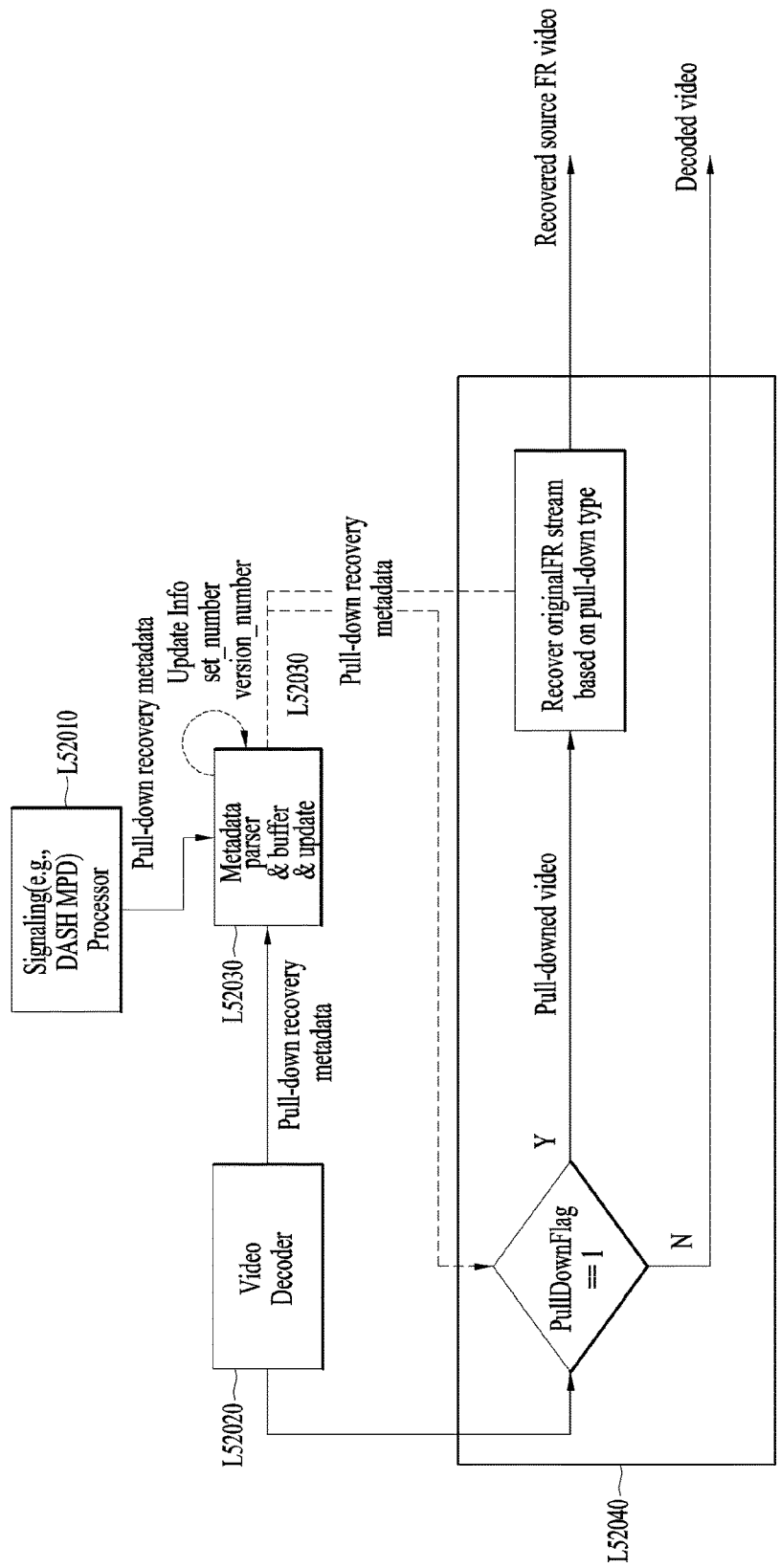
FIG. 52 is a diagram showing configuration of a receiver according to another embodiment of the present invention.

FIG. 52 is a diagram showing configuration of a receiver according to another embodiment of the present invention.

A receiver according to an embodiment includes a signaling processor L52010, a video decoder L52020, a metadata processor (metadata parser & buffer & update) L52030, and/or a pull down processor L52040.

The signaling processor L52010 processes the signaling such as MPD and transfers pull down recovery metadata to the metadata processor (metadata parser & buffer & update) L52030.

The video decoder L52020 receives a video stream and transfers the pull down recovery metadata included in the video stream to the metadata processor (metadata parser & buffer & update) L52030. The video decoder transfers the received video to the pull down processor L52040.

The metadata processor (metadata parser & buffer & update) L52030 transfers the pull down recovery metadata to the pull down processor L52040. The metadata processor updates information using set_number and/or version_number.

The pull down processor L52040 uses the pull down recovery metadata (PullDownFlag) to determine whether the video received from the video decoder is pulled down. If the video is not pulled down, the pull down processor displays the decoded video. If the video is pulled down, the pull down processor uses the pull down type of the pull down recovery metadata to recover the video with the original frame rate from the pulled down video. Then, the recovered video is displayed.

According to an embodiment, pull down recovery metadata, as used in this specification, may have the same meaning as PullDownRecovery configuration description.

Figure 53:
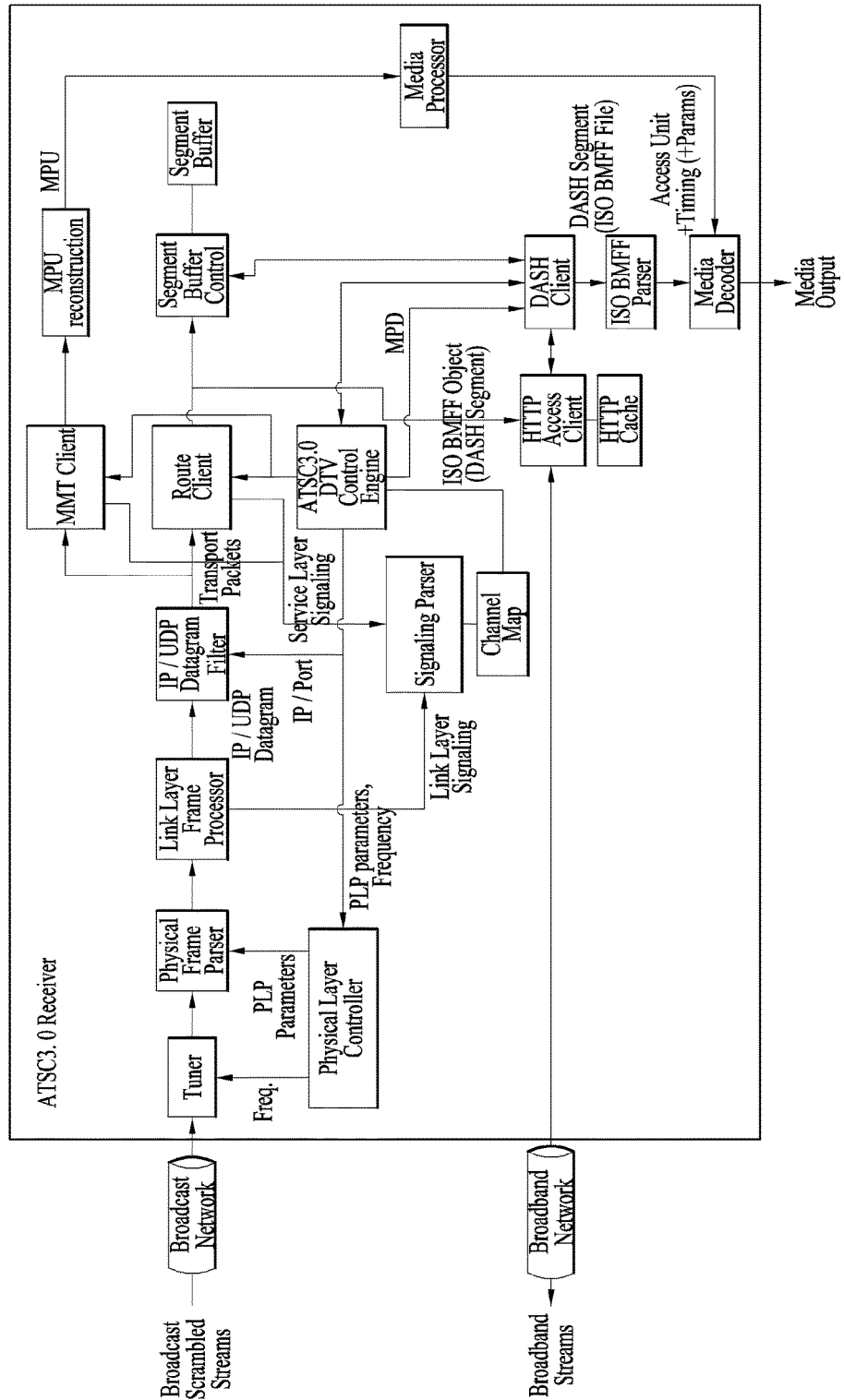
FIG. 53 is a block diagram illustrating a hybrid broadcast receiver according to an embodiment of the present invention.

FIG. 53 is a block diagram illustrating a hybrid broadcast receiver according to an embodiment of the present invention.

A receiver according to an embodiment of the present invention may include a tuner, a physical layer controller, a physical frame parser, a link layer frame processor, an IP/UDP datagram filter, an ATSC 3.0 DTV control engine, a route client, a segment buffer control, an MMT client, an MPU reconstruction, a media processor, a signaling parser, a DASH client, an ISO BMFF parser, a media decoder, and/or an HTTP access client. Each of the elements constituting the receiver may be a hardware processor performing a corresponding function.

The tuner receives and processes a broadcast signal on a terrestrial broadcast channel, and may convert the same into a proper form (physical frame, etc.).

The physical layer controller may control operations of the tuner, the physical frame parser, and the like using RF information of the broadcast channel to be received.

The physical frame parser may parse a received physical frame and acquire a link layer frame through relevant processing.

The link layer frame processor may acquire link layer signaling or IP/UDP datagrams from the link layer frame and perform relevant computational operation.

The IP/UDP datagram filter may filter certain IP/UDP datagrams from the received IP/UDP datagrams.

The ATSC 3.0 DTV control engine is responsible for the interface between the respective elements and may control the operation of each element by delivering parameters.

The Route client may process a Real-Time Object Delivery over Unidirectional Transport (ROUTE) packet that supports real-time object transmission and may collect and process several packets to create one or more ISO Base Media File Format (ISOBMFF) objects.

The segment buffer control may control a buffer related to segment transmission between the Route client and the Dash client.

The MMT client may process an MMT (MPEG Media Transport) transmission protocol packet that supports real-time object transmission and may collect and process several packets.

The MPU reconstruction may reconstruct the MPU (media processing unit) from the MMTP packet.

The media processor may collect and process reconstructed MPUs.

The signaling parser may acquire and parse DTV broadcasting service related signaling (link layer/service layer signaling), and generate and/or manage a channel map based on the parsing. This element may process low-level signaling and service-level signaling.

The DASH client may perform a real-time streaming or adaptive streaming-related computational operation and process acquired DASH segments.

The ISO BMFF parser may extract audio/video data and related parameters from the ISO BMFF object.

The media decoder may decode and/or present the received audio and video data.

The HTTP access client may make a request for specific information to the HTTP server and process a response to the request.

Figure 54:
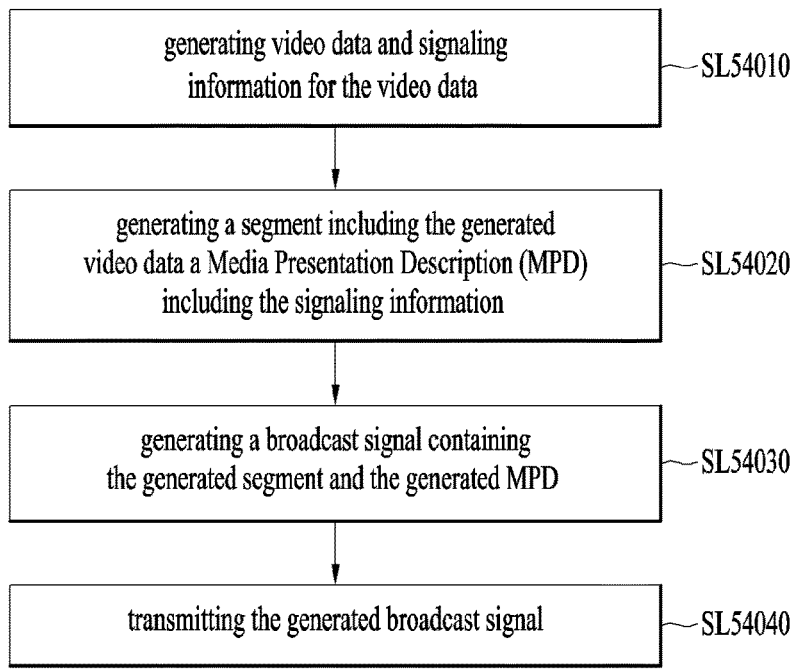
FIG. 54 is a diagram illustrating a method for transmitting a broadcast signal according to an embodiment of the present invention.

FIG. 54 is a diagram illustrating a method for transmitting a broadcast signal according to an embodiment of the present invention.

The method for transmitting a broadcast signal according to an embodiment of the present invention includes generating video data and signaling information for the video data (SL54010), generating a segment including the generated video data a Media Presentation Description (MPD) including the signaling information (SL54020), generating a broadcast signal containing the generated segment and the generated MPD (SL54030), and/or transmitting the generated broadcast signal.

According to another embodiment, the signaling information may include a content WCG (wide color gamut) configuration information indicating the color gamut related information on the video data, and the content WCG configuration information may include at least one of information indicating a type of a color gamut applied to the video data, coordinate information on primaries on the color gamut applied to the video data, information indicating whether the color gamut applied to the video data has been changed from the WCG to a standard color gamut (SCG), and information indicating whether or not the video data is compatible with the SCG.

According to another embodiment, the signaling information may include container WCG configuration information indicating color gamut related information on a container for transporting the video data, and the container WCG configuration information may include at least one of information indicating a type of a color gamut applied to the container, coordinate information on primaries on the color gamut applied to the container, information indicating whether the color gamut applied to the container has been changed from the WCG to the standard color gamut (SCG), and information indicating whether or not the container is compatible with the SCG.

According to another embodiment, the signaling information may include high frame rate (HFR) configuration information indicating frame rate related information on the video data, the HFR configuration information may include at least one of information indicating whether the video data is compatible with the standard frame rate (SFR) and information indicating whether a frame rate of the video data has been changed from the HFR to the SFR.

According to another embodiment, the signaling information may include HFR temporal layering information indicating frame rate related information per temporal layer of the video data, and the HFR temporal layering information may include at least one of information indicating a scan type of the video data, information indicating the number of temporal layers in the video data, frame rate information indicating a frame rate according to a temporal layer, and identifier information on the temporal layer for outputting a frame rate indicated by the frame rate information.

According to another embodiment, the signaling information may include pull down recovery configuration information indicating pull down related information on the video data, and the pull down recovery configuration information may include at least one of information indicating the type of pull down applied to the video data, information indicating whether or not the frame rate of the video data has been changed from a pulled-down frame rate to an original frame rate, information indicating the original frame rate of the video data, and information indicating an original scan type of the video data.

According to another embodiment, the signaling information may be contained in at least one of the Period element, AdaptationSet element, Representation element, SubRepresentation element, ContentComponent element, SegmentBase element, EssentialProperty element, SupplementaryProperty element, Accessibility element and Subset element, which are in the MPD.

Figure 55:
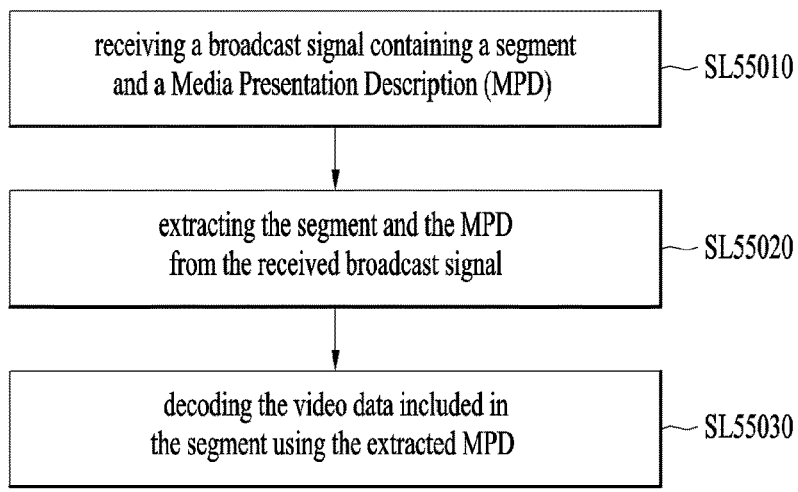
FIG. 55 is a diagram illustrating a method for receiving a broadcast signal according to an embodiment of the present invention.

FIG. 55 is a diagram illustrating a method for receiving a broadcast signal according to an embodiment of the present invention.

The method for receiving a broadcast signal according to an embodiment may include receiving a broadcast signal containing a segment and a Media Presentation Description (MPD) (SL55010), extracting the segment and the MPD from the received broadcast signal (SL55020), and/or decoding the video data included in the segment using the extracted MPD (SL55030). Here, the segment may include video data, and the MPD may include signaling information for the video data.

According to another embodiment, the signaling information may include a content WCG (wide color gamut) configuration information indicating the color gamut related information on the video data, and the content WCG configuration information may include at least one of information indicating a type of a color gamut applied to the video data, coordinate information on the primaries on the color gamut applied to the video data, information indicating whether the color gamut applied to the video data has been changed from the WCG to the standard color gamut (SCG), and information indicating whether or not the video data is compatible with the SCG.

According to another embodiment, the signaling information may include a container WCG configuration information indicating the color gamut related information on a container for transporting the video data, and the container WCG configuration information may include at least one of information indicating a type of a color gamut applied to the container, coordinate information on the primaries on the color gamut applied to the container, information indicating whether the color gamut applied to the container has been changed from the WCG to the standard color gamut (SCG), and information indicating whether or not the container is compatible with the SCG.

According to another embodiment, the signaling information may include high frame rate (HFR) configuration information indicating frame rate related information on the video data, the HFR configuration information may include at least one of information indicating whether the video data is compatible with the standard frame rate (SFR) and information indicating whether the frame rate of the video data has been changed from the HFR to the SFR.

According to another embodiment, the signaling information may include HFR temporal layering information indicating frame rate related information per temporal layer of the video data, and the HFR temporal layering information may include at least one of information indicating a scan type of the video data, information indicating the number of temporal layers in the video data, frame rate information indicating a frame rate according to a temporal layer, and identifier information on a temporal layer for outputting a frame rate indicated by the frame rate information.

According to another embodiment, the signaling information may include pull down recovery configuration information indicating information related to pull down of the video data, and the pull down recovery configuration information may include at least one of information indicating the type of pull down applied to the video data, information indicating whether or not the frame rate of the video data has been changed from the pulled-down frame rate to the original frame rate, information indicating the original frame rate of the video data, and information indicating the original scan type of the video data.

According to another embodiment, the signaling information may be contained in at least one of the Period element, AdaptationSet element, Representation element, SubRepresentation element, ContentComponent element, SegmentBase element, EssentialProperty element, SupplementaryProperty element, Accessibility element and Subset element, which are in the MPD.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing a computer-readable recording medium which stores programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

[Mode for Invention]

Various embodiments have been described in the best mode for carrying out the invention.

INDUSTRIAL APPLICABILITY

The present invention is usable in a broadcast signal providing field.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

The invention claimed is:

1. A method for transmitting a broadcast signal by a server, comprising:
generating video data;
generating a segment containing the generated video data and a media presentation description (MPD) for signaling the generated video data,
wherein the MPD includes color space information for identifying whether a color space of the video data corresponds to a first color space and compatibility information for identifying whether the color space of the video data is compatible with a second color space, and
wherein the MPD further includes temporal sub layering information describing a temporal sub layering which layers a video stream carrying the video data into one or more layers;
generating a broadcast signal containing the generated segment and the generated MPD; and
transmitting the generated broadcast signal.

2. The method according to claim 1, wherein the MPD further includes content WCG (wide color gamut) configuration information for identifying color gamut related information on the video data, and
wherein the content WCG configuration information comprises at least one of coordinate information on primaries on a color gamut applied to the video data and information for identifying whether the color gamut applied to the video data has been changed from the WCG to a standard color gamut (SCG).

3. The method according to claim 1, wherein the MPD further includes container WCG configuration information for identifying color gamut related information on a container for transporting the video data, and
wherein the container WCG configuration information comprises at least one of information for identifying a type of a color gamut applied to the container, coordinate information on primaries on the color gamut applied to the container, information for identifying whether the color gamut applied to the container has been changed from the WCG to a standard color gamut (SCG), and information for identifying whether or not the container is compatible with the SCG.

4. The method according to claim 1, wherein the MPD further includes high frame rate (HFR) configuration information for identifying frame rate related information on the video data, and
wherein the HFR configuration information comprises at least one of information for identifying whether the video data is compatible with a standard frame rate (SFR) and information for identifying whether a frame rate of the video data has been changed from the HFR to the SFR.

5. The method according to claim 1, wherein the MPD further includes pull down recovery configuration information for identifying pull down related information on the video data, and wherein the pull down recovery configuration information comprises at least one of information for identifying a type of pull down applied to the video data, information for identifying whether or not a frame rate of the video data has been changed from a pulled-down frame rate to an original frame rate, information for identifying the original frame rate of the video data, and information for identifying an original scan type of the video data.

6. A method processing a broadcast signal by a receiver, comprising:

receiving a broadcast signal containing a segment and a media presentation description (MPD), wherein the segment contains video data and the MPD is for signaling the video data, wherein the MPD includes color space information for identifying whether a color space of the video data corresponds to a first color space and compatibility information for identifying whether the color space of the video data is compatible with a second color space, and wherein the MPD further includes temporal sub layering information describing a temporal sub layering which layers a video stream carrying the video data into one or more layers;

extracting the segment and the MPD from the received broadcast signal; and decoding the video data contained in the segment using the extracted MPD.

7. The method according to claim 6, wherein the MPD further includes content WCG (wide color gamut) configuration information for identifying color gamut related information on the video data, and wherein the content WCG configuration information comprises at least one of coordinate information on primaries on a color gamut applied to the video data and information for identifying whether the color gamut applied to the video data has been changed from the WCG to a standard color gamut (SCG).

8. The method according to claim 6, wherein the MPD further includes container WCG configuration information for identifying color gamut related information on a container for transporting the video data, and wherein the container WCG configuration information comprises at least one of information for identifying a type of a color gamut applied to the container, coordinate information on primaries on the color gamut applied to the container, information for identifying whether the color gamut applied to the container has been changed from the WCG to a standard color gamut (SCG), and information for identifying whether or not the container is compatible with the SCG.

9. The method according to claim 6, wherein the MPD further includes high frame rate (HFR) configuration information for identifying frame rate related information on the video data, and wherein the HFR configuration information comprises at least one of information for identifying whether the video data is compatible with a standard frame rate (SFR) and information for identifying whether a frame rate of the video data has been changed from the HFR to the SFR.

10. The method according to claim 6, wherein the MPD further includes pull down recovery configuration information for identifying pull down related information on the video data, and wherein the pull down recovery configuration information comprises at least one of information for identifying a type of pull down applied to the video data, information for identifying whether or not a frame rate of the video data has been changed from a pulled-down frame rate to an original frame rate, information for identifying the original frame rate of the video data, and information for identifying an original scan type of the video data.

11. A transmitting system for transmitting a broadcast signal, the transmitting system comprising:

a server to generate video data and generate a segment containing the generated video data and a media presentation description (MPD) for signaling the generated video data, wherein the MPD includes color space information for identifying whether a color space of the video data corresponds to a first color space and compatibility information for identifying whether the color space of the video data is compatible with a second color space, and wherein the MPD further includes temporal sub layering information describing a temporal sub layering which layers a video stream carrying the video data into one or more layers; and a transmitting unit to transmit a broadcast signal containing the generated segment and the generated MPD.

12. The transmitting system according to claim 11, wherein the MPD further includes content WCG (wide color gamut) configuration information for identifying color gamut related information on the video data, and wherein the content WCG configuration information comprises at least one of coordinate information on primaries on a color gamut applied to the video data and information for identifying whether the color gamut applied to the video data has been changed from the WCG to a standard color gamut (SCG).

13. The transmitting system according to claim 11, wherein the MPD further includes container WCG configuration information for identifying color gamut related information on a container for transporting the video data, and wherein the container WCG configuration information comprises at least one of information for identifying a type of a color gamut applied to the container, coordinate information on primaries on the color gamut applied to the container, information for identifying whether the color gamut applied to the container has been changed from the WCG to a standard color gamut (SCG), and information for identifying whether or not the container is compatible with the SCG.

14. The transmitting system according to claim 11, wherein the MPD further includes high frame rate (HFR) configuration information for identifying frame rate related information on the video data, and wherein the HFR configuration information comprises at least one of information for identifying whether the video data is compatible with a standard frame rate (SFR) and information for identifying whether a frame rate of the video data has been changed from the HFR to the SFR.

15. The transmitting system according to claim 11, wherein the MPD further includes pull down recovery configuration information for identifying pull down related information on the video data, and wherein the pull down recovery configuration information comprises at least one of information for identifying a type of pull down applied to the video data, information for identifying whether or not a frame rate of the video data has been changed from a pulled-down frame rate to an original frame rate, information for identifying the original frame rate of the video data, and information for identifying an original scan type of the video data.

16. A receiving system for receiving a broadcast signal, the receiving system comprising:

a tuner to receive a broadcast signal containing a segment and a media presentation description (MPD), wherein the segment contains video data and the MPD is for signaling the video data, wherein the MPD includes color space information for identifying whether a color space of the video data corresponds to a first color space and compatibility information for identifying whether the color space of the video data is compatible with a second color space, and wherein the MPD further includes temporal sub layering information describing a temporal sub layering which layers a video stream carrying the video data into one or more layers;

a parser to extract the segment and the MPD from the received broadcast signal; and a decoder to decode the video data contained in the segment using the extracted MPD.

17. The receiving system according to claim 16, wherein the MPD further includes content WCG (wide color gamut) configuration information for identifying color gamut related information on the video data, and wherein the content WCG configuration information comprises at least one of coordinate information on primaries on a color gamut applied to the video data and information for identifying whether the color gamut applied to the video data has been changed from the WCG to a standard color gamut (SCG).

18. The receiving system according to claim 16, wherein the MPD further includes container WCG configuration information for identifying color gamut related information on a container for transporting the video data, and wherein the container WCG configuration information comprises at least one of information for identifying a type of a color gamut applied to the container, coordinate information on primaries on the color gamut applied to the container, information for identifying whether the color gamut applied to the container has been changed from the WCG to a standard color gamut (SCG), and information for identifying whether or not the container is compatible with the SCG.

19. The receiving system according to claim 16, wherein the MPD further includes high frame rate (HFR) configuration information for identifying frame rate related information on the video data, and wherein the HFR configuration information comprises at least one of information for identifying whether the video data is compatible with a standard frame rate (SFR) and information for identifying whether a frame rate of the video data has been changed from the HFR to the SFR.

20. The receiving system according to claim 16, wherein the MPD further includes pull down recovery configuration information for identifying pull down related information on the video data, and wherein the pull down recovery configuration information comprises at least one of information for identifying a type of pull down applied to the video data, information for identifying whether or not a frame rate of the video data has been changed from a pulled-down frame rate to an original frame rate, information for identifying the original frame rate of the video data, and information for identifying an original scan type of the video data.

* * * * *